US011700624B2

(12) United States Patent
Luo et al.

(10) Patent No.: US 11,700,624 B2
(45) Date of Patent: Jul. 11, 2023

(54) SYSTEM AND METHOD FOR PROVIDING GUARD SYMBOLS IN NETWORKS WITH INTEGRATED ACCESS AND BACKHAUL (IAB)

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Karl Georg Hampel, Hoboken, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/142,124

(22) Filed: Jan. 5, 2021

(65) Prior Publication Data

US 2021/0212070 A1 Jul. 8, 2021

Related U.S. Application Data

(60) Provisional application No. 63/013,374, filed on Apr. 21, 2020, provisional application No. 62/958,188, filed on Jan. 7, 2020.

(51) Int. Cl.
*H04W 72/53* (2023.01)
*H04W 72/0446* (2023.01)
(Continued)

(52) U.S. Cl.
CPC ......... *H04W 72/53* (2023.01); *H04L 27/2607* (2013.01); *H04W 72/0446* (2013.01);
(Continued)

(58) Field of Classification Search
CPC ......... H04W 72/0493; H04W 72/0426; H04W 72/0446; H04W 72/1263; H04W 72/14; H04L 27/2607
See application file for complete search history.

(56) References Cited

U.S. PATENT DOCUMENTS

| 2020/0382250 | A1* | 12/2020 | Choi | ............... | H04L 5/0091 |
| 2021/0144705 | A1* | 5/2021 | Li | ............... | H04W 28/0215 |
| 2022/0141074 | A1* | 5/2022 | You | ............... | H04L 27/2666 |
| | | | | | 375/262 |

FOREIGN PATENT DOCUMENTS

WO WO-2020202190 A1 * 10/2020

* cited by examiner

*Primary Examiner* — Chae S Lee
(74) *Attorney, Agent, or Firm* — Arent Fox, LLP

(57) ABSTRACT

A first apparatus may determine that a DU function of a child IAB node is to transition between a first set of resources associated with an MT function of the child IAB node and a second set of resources associated with the DU function. The first apparatus may further configure a guard period associated with the transition time based on the first set of resources and based on the second set resources. A second apparatus determine to transition between a first set of resources associated with an MT function of the second apparatus and a second set of resources associated with a DU function of the second apparatus at a transition time. The second apparatus may further transmit, to a parent IAB apparatus, information requesting a guard period associated with the transition time based on the transition between the first set of resources and the second set resources.

30 Claims, 19 Drawing Sheets

(51) Int. Cl.
*H04L 27/26* (2006.01)
*H04W 72/1263* (2023.01)
*H04W 88/14* (2009.01)
*H04W 72/23* (2023.01)
*H04W 72/27* (2023.01)

(52) U.S. Cl.
CPC ....... *H04W 72/1263* (2013.01); *H04W 72/23* (2023.01); *H04W 72/27* (2023.01); *H04W 88/14* (2013.01)

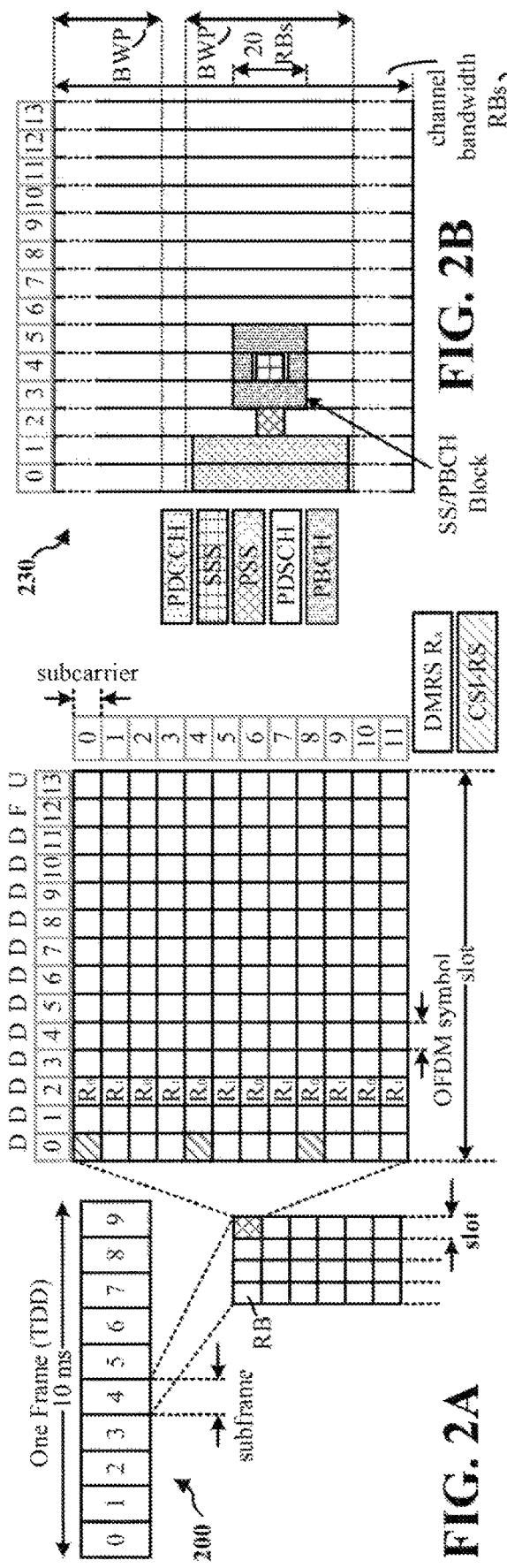
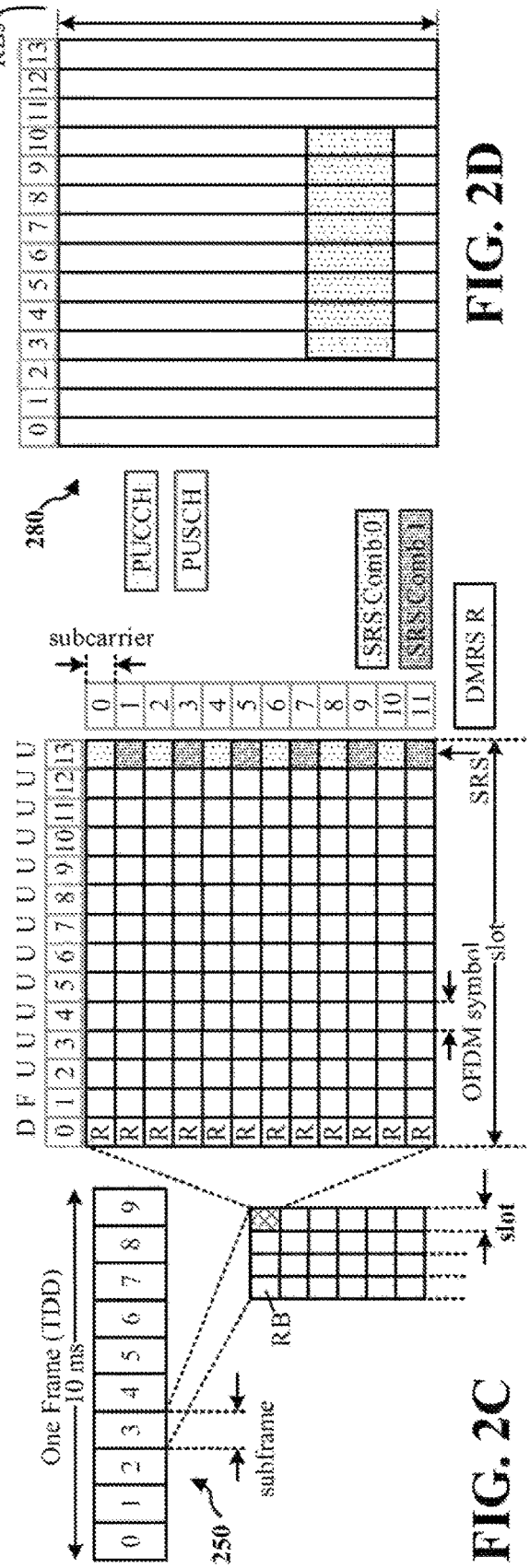

MT to DU TRANSITIONS

| Before (MT) \ After (DU) | DL Tx | UL Rx |
|---|---|---|
| DL Rx | Type 1 | Type 2 |
| UL Tx | Type 3 | Type 4 |

DU to MT TRANSITIONS

| Before (DU) \ After (MT) | DL Rx | UL Tx |
|---|---|---|
| DL Tx | Type 5 | Type 6 |
| UL Rx | Type 7 | Type 8 |

SYSTEM AND METHOD FOR PROVIDING GUARD SYMBOLS IN NETWORKS WITH INTEGRATED ACCESS AND BACKHAUL (IAB)

CROSS REFERENCE TO RELATED APPLICATION(S)

This application claims the benefit of U.S. Provisional Application Ser. No. 62/958,188, entitled "ENHANCEMENTS FOR PROVIDED GUARD SIGNALS IN IAB NETWORK" and filed on Jan. 7, 2020, and U.S. Provisional Application Ser. No. 63/013,374, entitled "ENHANCEMENTS FOR PROVIDED GUARD SIGNALS IN IAB NETWORK" and filed on Apr. 21, 2020, the disclosures of which are expressly incorporated by reference herein in their entireties.

BACKGROUND

Technical Field

The present disclosure generally relates to communication systems, and more particularly, to guard signals in networks with integrated access and backhaul (IAB).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example radio access network (RAN), such as a 5G New Radio (NR) RAN, communication may be carried in a millimeter wave (mmW) spectrum (potentially including a near-mmW spectrum). In such an example RAN, the mmW spectrum may be used to support communication both in the access network—e.g., including between access nodes (ANs) and user equipments (UEs)—and the backhaul network between ANs.

In some aspects, mmW communication in the backhaul network may involve integrated access and backhaul (IAB) ANs. In order to accommodate wireless signaling for both access network communication (e.g., including signaling between ANs and UEs) and backhaul communication, the access network may share the same mmW spectrum with the IAB ANs for backhaul. Thus, IAB ANs may use shared resources for both the access network and the backhaul. As the mmW spectrum may be finite, IAB communication may benefit (e.g., in terms of efficiency and resource allocation) from reuse of the access network framework to the extent such reuse is possible.

For wireless backhaul, IAB ANs may include IAB donors (also referred to as "anchors" or "anchor nodes") and IAB nodes. IAB donors may include ANs with wireline connections to the core network, whereas IAB nodes may include ANs that relay traffic from and/or to IAB donors through one or multiple hops.

More specifically, each IAB AN may include at least two units configured for different functionality. Illustratively, an example IAB donor may be implemented as an enhanced gNodeB (gNB) node having functionality for controlling an IAB network. The example IAB donor may include a central unit (CU) function and a distributed unit (DU) function, which also may be referred to as simply "CU" and "DU," respectively.

The CU may operate as a central entity that controls an entire IAB network, such as by configuring other entities in the IAB network. In the context of a radio protocol stack, the CU may be responsible for functionality at the radio resource control (RRC) and/or packet data convergence protocol (PDCP) layers.

The DU, however, may act as a scheduling node that schedules child nodes connected to the IAB network through the example IAB donor. In the context of a radio protocol stack, the DU may be responsible for functionality at the radio link control (RLC), medium access control (MAC), and/or physical (PHY) layers.

Referring to an example IAB node, a DU similar to that described for the example IAB donor may be included—that is, the DU may provide functionality of a scheduling node that schedules child nodes of the example IAB node. A CU, however, may be absent from the example IAB node; rather, the example IAB node may include a mobile termination (MT) function (or simply, "MT") that acts as a scheduled node, e.g., similar to a UE, scheduled by the parent IAB node or IAB donor of the example IAB node.

As the respective operations and related signaling of the functions included in IAB ANs may be different, IAB ANs may be configured to transition from one unit to another (and back again). For example, an IAB node may transition between DU and MT, e.g., for transmission or reception and/or for uplink or downlink, depending upon whether the IAB node is acting as a parent or a child node.

In some aspects, a switch between one of DU or MT to the other of DU or MT may incur some overhead in terms of time, which may be unavoidable. For example, when an IAB node switches between one of DU or MT to the other of DU or MT, some (relatively short) period of time may be consumed in order for the IAB node to switch between one of transmit or receive circuitry to the other of transmit or receive circuitry, perform (analog) beam switching, and/or perform other component switching commensurate with transitioning between DU and MT configurations.

Accordingly, a guard period, which may include one or more guard symbols, may be inserted to allow an IAB node to switch between MT and DU, e.g., while still adhering to some scheduling and/or other synchronization established for the IAB network in which the IAB node is included. Additionally, guard periods may mitigate (or potentially even avoid) conflicts that may result from propagation latency, timing advances, and the like in which resources allocated for MT communication overlap with resources allocated for DU communication.

Guard periods may be requested by child IAB nodes, and may be configured and provided by parent IAB nodes (or the IAB donor, e.g., for one-hop nodes). In some aspects, two IAB ANs having a direct link in an IAB network (e.g., with one IAB AN functioning as parent and the other IAB AN functioning as the child) may use some fields of messages (e.g., message header fields), such as MAC control elements (CEs), to both request and provide guard periods. For example, MAC CEs may be defined for different types of transitions or switches: downlink receptions to downlink transmissions, downlink receptions to uplink receptions, uplink transmissions to downlink transmissions, and uplink transmissions to uplink receptions for MT-to-DU transitions; and downlink transmissions to downlink receptions, downlink transmissions to uplink transmissions, uplink receptions to downlink receptions, and uplink receptions to uplink transmissions for DU-to-MT transitions.

By way of illustration, a child IAB AN may request a guard period from a parent IAB AN by including, in a message, an indication of a number of guard symbols desired and a corresponding subcarrier spacing. A parent IAB AN respond to a request from the child with a message that includes an indication of a number of guard symbols provided and a corresponding subcarrier spacing.

Potentially, the number of guard symbols provided may be less than the number of guard symbols requested. In such instances, the guard period configured by the parent may be insufficient for the child to perform operations commensurate with transitioning. For example, the parent may provide a number of guard symbols that possibly could cause resources allocated for MT communication to overlap with resources allocated for DU communication and/or some other conflict(s) related to transitioning between MT and DU (e.g., including transitioning between transmit and receive circuitry and/or transitioning between uplink and downlink communication).

As such conflicts and overlap may occur at the child, the child may be responsible for resolving and avoiding potential conflicts that may result if resources allocated for MT communication were to overlap with resources allocated for DU communication. Such resolution and avoidance may be addressed according to the specific implementation of a child, and therefore, resolution and avoidance of conflicts due to insufficient provision of guard periods may be differently addressed by different child IAB nodes. However, signaling of the guard period by the parent to the child may be ambiguous, which may result in some issues at the child, e.g., when the child transitions between MT and DU.

In some aspects, a child IAB node having the MT function active may be provided a number of guard symbols (e.g., using a MAC CE indicating guard symbols provided by the parent), and accordingly, the child IAB node with the active MT function may be configured to refrain from using that number of guard symbols for signaling in slots in which the child IAB node transitions between the MT signaling and DU signaling. However, DU signaling by the child IAB node, which may or may not occur, may be unknown by the parent, e.g., even though MT signaling by the child IAB node may be known by both the child and the parent.

Thus, the parent may be unable to unambiguously determine where to apply guard symbols, and further, the parent may be uncertain of the behavior of the child with respect to MT signaling on the provided guard symbols. Consequently, the parent may experience difficulty in providing a number of guard symbols that is defined based on the actual transition at the child between MT and DU signaling, e.g., due to the parent being uninformed regarding the DU signaling by the child and/or regarding the MT signaling behavior of the child during guard symbols.

The present disclosure describes various techniques and solutions for addressing some ambiguities that might otherwise arise when a parent IAB AN provides a guard period (e.g., a set of guard symbols) to be applied when a child IAB node transitions, such as between MT and DU. For example, parent IAB ANs may provide guard symbols to child IAB nodes using MT resource sets and DU resource sets, and such guard symbols may be applied for transitions between MT and DU functions based on such MT resource sets and DU resource sets. The parent IAB AN may provide guard symbols for different types of transitions. Potentially, the some rules and/or exceptions may be configured and/or defined transitions between MT and DU, such as rules and/or exceptions associated with transitioning between MT resource sets and DU resource sets. Accordingly, the present disclosure provides some benefits to IAB networks by reducing ambiguities associated with transitions between MT and DU functions.

In a first aspect of the disclosure, a first method, a first computer-readable medium, and a first apparatus are provided. The first apparatus may be an IAB apparatus, such as an IAB donor or IAB node that is a parent to at least one child IAB node. The first apparatus may be configured to determine that a DU function of a child IAB node is to transition between a first set of resources and a second set of resources at a transition time, the first set of resources being associated with an MT function of the child IAB node, and the second set of resources being associated with the DU function. The first apparatus may be further configured to configure a guard period associated with the transition time based on the first set of resources and based on the second set resources.

In a second aspect of the disclosure, a second method, a second computer-readable medium, and a second apparatus are provided. The second apparatus may be an IAB node, such as an IAB node that is a child to a parent IAB apparatus, which may be an IAB donor or another IAB node. The second apparatus may be configured to determine to transition between a first set of resources and a second set of resources at a transition time, the first set of resources being associated with an MT function of the IAB node, and the second set of resources being associated with a DU function of the IAB node. The second apparatus may be further configured to transmit, to a parent IAB apparatus, information requesting a guard period associated with the transition time based on the transition between the first set of resources and the second set resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 8 is an example table illustrating some types of transitions by an IAB node, in accordance with various aspects of the present disclosure.

DETAILED DESCRIPTION

Figure 1:
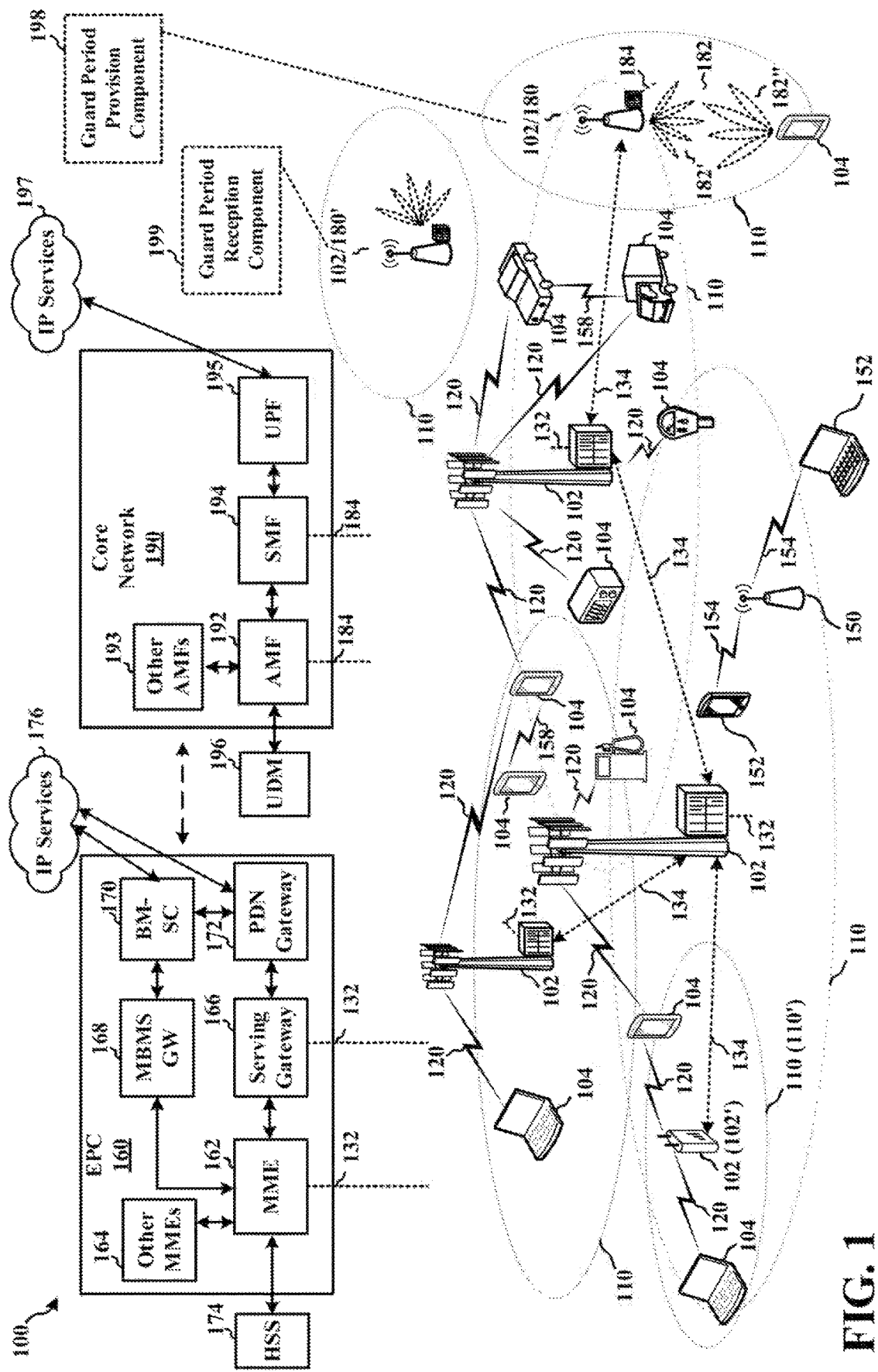
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100, in accordance with various aspects of the present disclosure. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

According to various aspects, the wireless communications system and an access network 100 may include various apparatuses configured for communication in a mmW spectrum (potentially including a near-mmW spectrum). The mmW spectrum may be used to support communication both in the access network—e.g., including between access nodes (ANs) and UEs 104—and the backhaul network between ANs.

According to the example illustrated by FIG. 1, the ANs may be implemented as base stations 102/180, e.g., including gNBs, eNBs, and the like, and may include enhanced base stations, such as enhanced gNBs. Some of the base stations may be configured for backhaul communication using integrated access and backhaul (IAB). For example, a first base station 102/180 and a second base station 102/180' may each be configured as IAB ANs.

In order to accommodate wireless signaling for both access network communication (e.g., including signaling between ANs and UEs) and backhaul communication, the access network may share the same mmW spectrum with the IAB ANs for backhaul. Thus, IAB ANs, including the first base station 102/180 and the second base station 102/180', may use shared resources for both the access network and the backhaul. As the mmW spectrum may be finite, IAB networks, which may include IAB ANs such as the first base station 102/180 and the second base station 102/180, may benefit (e.g., in terms of efficiency and resource allocation) from reuse of the access network framework to the extent such reuse is possible.

For wireless backhaul, IAB ANs may include IAB donors (also referred to as "anchors" or "anchor nodes") and IAB nodes; thus, the terminology "IAB AN" may refer to either an IAB donor or an IAB node. IAB donors may include ANs with wireline connections to the core network 190 (and/or EPC 160)—for example, the first base station 102/180 may be an IAB donor having a wireless connection to the core network 190. IAB nodes may include ANs that relay traffic from and/or to IAB donors through one or multiple hops—for example, the second base station 102/180' may be an IAB node configured to relay traffic to and/or from the first base station 102/180, acting as an IAB donor.

According to an implementation as an IAB donor, the first base station 102/180 may include functionality for controlling an IAB network, e.g., including connecting other IAB nodes with the core network 190 (and/or EPC 160). To that end, the first base station 102/180 may include a central unit (CU) function and a distributed unit (DU) function, which also may be referred to as simply "CU" and "DU," respectively. The CU may operate as a central entity that controls an entire IAB network, such as by configuring other entities in the IAB network (e.g., including the second base station 102/180'). In the context of a radio protocol stack, the CU may be responsible for functionality at the radio resource control (RRC) and/or packet data convergence protocol (PDCP) layers.

The DU may act as a scheduling node that schedules child nodes connected to the IAB network through the first base station 102/180. In the context of a radio protocol stack, the DU of the first base station 102/180 may be responsible for functionality at the radio link control (RLC), medium access control (MAC), and/or physical (PHY) layers.

Referring to an implementation as an IAB node, the second base station 102/180' may include a DU similar to that described for the first base station 102/180—that is, the DU of the second base station 102/180' may provide functionality of a scheduling node that schedules child nodes of the second base station 102/180'. However, the second base station 102/180' may not include a CU; rather, the second base station 102/180' may include a mobile termination (MT) function (or simply, "MT") that acts as a scheduled node. In example operation, the MT of the second base station 102/180' may operate similarly to a UE 104, e.g., in that the MT may be scheduled by a base station (e.g., the first base station 102/180) for uplink and/or downlink communication with the scheduling base station, and/or the MT may be the terminal point for some downlink data and/or control information and the origination point for some uplink data and/or control information.

According to such an implementation, the first base station 102/180 may be a parent of the second base station 102/180', with the second base station 102/180' therefore being a child of the first base station 102/180 (i.e., the MT of the second base station 102/180' is a child of the DU of the first base station 102/180). Potentially, the second base station 102/180' may also act as a parent, e.g., to another IAB node of the IAB network. For example, another IAB node may be a child of the second base station 102/180', with the DU of the second base station 102/180' acting as a parent of an MT of the other base station.

As the respective operations and related signaling of the functions included in IAB ANs may be different, IAB ANs may be configured to transition from one function to another (and back again). For example, an IAB node may transition between DU and MT, e.g., for transmission or reception and/or for uplink or downlink, depending upon whether the IAB node is acting as a parent or a child node. In order to facilitate such transitions, guard periods may be provided in order to avoid signaling (including scheduling thereof) at times of transitions.

Referring again to FIG. 1, in certain aspects, the first base station 102/180 may include, inter alia, a guard period provision component 198. The guard period provision component 198 may be configured to determine that a DU function of a child IAB node (e.g., the second base station 102/180') is to transition between a first set of resources and a second set of resources at a transition time. The first set of resources may be associated with an MT function of the child IAB node, and the second set of resources may be associated with the DU function. The guard period provision component 198 may be further configured to configure a guard period associated with the transition time based on the first set of resources and based on the second set resources.

In some aspects, the guard period provision component 198 may be further configured to transmit information indicating the guard period to the child IAB node, and apply the guard period based on the transition time, with the guard period being a time period of no communication with the child IAB node.

Correspondingly, the second base station 102/180' may include, inter alia, a guard period reception component 199. The guard period reception component 199 may be configured to determine to transition between a first set of resources and a second set of resources at a transition time. The first set of resources may be associated with an MT function of the second base station 102/180', and the second set of resources may be associated with a DU function of the second base station 102/180'. The guard period reception component 199 may be further configured to transmit, to a parent IAB apparatus (e.g., the first base station 102/180), information requesting a guard period associated with the transition time based on the transition between the first set of resources and the second set resources.

In some aspects, the guard period reception component 199 may be further configured to receive information providing the guard period from the parent IAB apparatus based on the information requesting the guard period. The guard period reception component 199 may be configured to then apply the provided guard period based on the transition time, with the provided guard period being a time period of no communication with the parent IAB apparatus, and transition between the MT function and the DU function contemporaneously with the transition time.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. Further, while the present disclosure uses IAB networks sharing mmW spectrum with access networks for various contexts, the concepts and aspects described herein may be applicable to other networks, such as Wi-Fi, wireless local area networks (WLANs), and the like, and/or other spectrums, whether shared or common.

FIG. 2A is a diagram 200 illustrating an example of a first subframe within a 5G NR frame structure, in accordance with various aspects of the present disclosure. FIG. 2B is a diagram 230 illustrating an example of DL channels within a 5G NR subframe, in accordance with various aspects of the present disclosure. FIG. 2C is a diagram 250 illustrating an example of a second subframe within a 5G NR frame structure, in accordance with various aspects of the present disclosure. FIG. 2D is a diagram 280 illustrating an example of UL channels within a 5G NR subframe, in accordance with various aspects of the present disclosure. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \ast 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
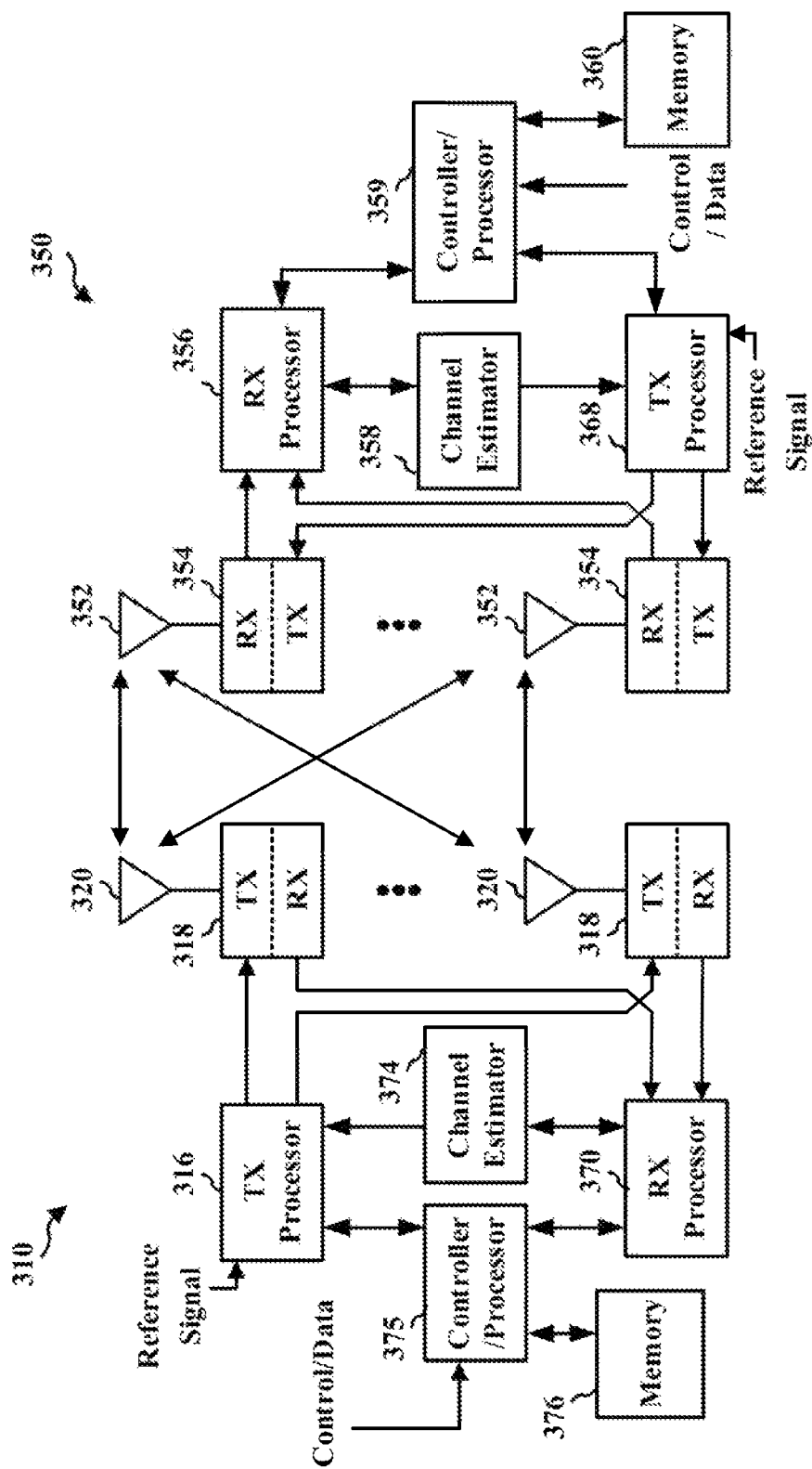
FIG. 3 is a diagram illustrating an example of a base station and user equipment (UE) in an access network, in accordance with various aspects of the present disclosure.

FIG. 3 is a block diagram of a base station 310 in communication with a UE 350 in an access network, in accordance with various aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a PDCP layer, a RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a PHY layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

According to some aspects of the present disclosure, at least one of the TX processor 316, the RX processor 370, and the controller/processor 375 may be configured to perform aspects in connection with the guard period provision component 198 of FIG. 1. For example, in such aspects, the base station 310 may be implemented as an IAB donor, which may be a parent that connects a child IAB node to a core network.

According to some other aspects of the present disclosure, at least one of the TX processor 316, the RX processor 370, and the controller/processor 375 may be configured to perform aspects in connection with the guard period reception component 199 of FIG. 1. For example, in such other aspects, the base station 310 may be implemented as an IAB node, which may be a child of a parent IAB AN (e.g., another IAB node or an IAB donor) that connects the base station 310 to a core network via one or more hops.

Now with reference to FIG. 4 through FIG. 19, various aspects and further details are described in relation to parent IAB ANs providing guard periods to child IAB nodes in IAB networks. As described, supra, the respective operations and related signaling of the functions included in IAB ANs may be different, and therefore, IAB ANs may be configured to transition from one unit to another (and back again). For example, an IAB node may transition between DU and MT, e.g., for transmission or reception and/or for uplink or downlink, depending upon whether the IAB node is acting as a parent or a child node.

Such transitions may not be instantaneous, and therefore, a switch between one of DU or MT to the other of DU or MT may incur some overhead in terms of time. For example, when an IAB node switches between one of DU or MT to the other of DU or MT, some (relatively short) period of time may be consumed in order for the IAB node to switch between one of transmit or receive circuitry to the other of transmit or receive circuitry, perform (analog) beam switching, and/or perform other component switching commensurate with transitioning between DU and MT configurations.

Accordingly, a guard period may be inserted to allow an IAB node to switch between MT and DU, e.g., while still adhering to some scheduling and/or other synchronization established for the IAB network in which the IAB node is included. For example, a guard period may include a set of guard symbols on which no communication occurs and/or is scheduled to occur. Additionally, guard periods may mitigate (or potentially even avoid) conflicts that may result from propagation latency, timing advances, and the like in which resources allocated for MT communication overlap with resources allocated for DU communication.

Guard periods may be requested by child IAB nodes, and may be configured and provided by parent IAB nodes (or the IAB donor, e.g., for one-hop nodes). In some aspects, two IAB ANs having a direct link in an IAB network (e.g., with one IAB AN functioning as parent and the other IAB AN functioning as the child) may use some fields of messages (e.g., message header fields), such as MAC control elements (CEs), to both request and provide guard periods. For example, MAC CEs may be defined for different types of transitions or switches: downlink receptions to downlink transmissions, downlink receptions to uplink receptions, uplink transmissions to downlink transmissions, and uplink transmissions to uplink receptions for MT-to-DU transitions; and downlink transmissions to downlink receptions, downlink transmissions to uplink transmissions, uplink receptions to downlink receptions, and uplink receptions to uplink transmissions for DU-to-MT transitions.

By way of illustration, a child IAB node may request a guard period from a parent IAB AN by including, in a message, an indication of a number of guard symbols desired and a corresponding subcarrier spacing. A parent IAB AN respond to a request from the child IAB node with a message that includes an indication of a number of guard symbols provided and a corresponding subcarrier spacing. However, the number of guard symbols provided by the parent IAB AN may not necessarily be equal to the number of guard symbols requested by the child IAB node.

Potentially, the number of guard symbols provided may be less than the number of guard symbols requested. In such instances, the guard period configured by the parent IAB AN may be insufficient for the child IAB node to perform operations commensurate with transitioning. For example, the parent IAB AN may provide a number of guard symbols that could possibly cause resources allocated for MT communication to overlap with resources allocated for DU communication and/or some other conflict(s) related to transitioning between MT and DU (e.g., including transitioning between transmit and receive circuitry and/or transitioning between uplink and downlink communication).

As such conflicts and overlap may occur at the child IAB node, the child IAB node may be responsible for resolving and avoiding potential conflicts that may result if resources allocated for MT communication were to overlap with resources allocated for DU communication. Such resolution and avoidance may be addressed according to the specific implementation of a child IAB node, and therefore, resolution and avoidance of conflicts due to insufficient provision of guard periods may be differently addressed by different implementations of child IAB nodes. However, signaling of a guard period by a parent IAB AN to a child IAB node may be ambiguous, which may result in some issues at the child IAB node, such as when the child IAB node transitions between MT and DU.

In some aspects, a child IAB node having the MT function active may be provided a number of guard symbols (e.g., using a MAC CE indicating guard symbols provided by the parent), and accordingly, the child IAB node with the active MT function may be configured to refrain from using that number of guard symbols for signaling in slots in which the child IAB node transitions between the MT signaling and DU signaling. However, DU signaling by the child IAB node, which may or may not occur, may be unknown by the parent IAB AN, e.g., even though MT signaling by the child IAB node may be known by both the child IAB node and the parent IAB AN.

Thus, the parent IAB AN may be unable to unambiguously determine where to apply guard symbols, and further, the parent IAB AN may be uncertain of the behavior of the child IAB node with respect to MT signaling on the provided guard symbols. Consequently, the parent IAB AN may experience difficulty in providing a number of guard symbols that is defined based on the actual transition at the child IAB node between MT and DU signaling, e.g., due to the parent IAB AN being uninformed regarding the DU signaling by the child IAB node and/or regarding the MT signaling behavior of the child IAB node during guard symbols.

The present disclosure describes various techniques and solutions for addressing some ambiguities that might otherwise arise when a parent IAB AN provides a guard period (e.g., a set of guard symbols) to be applied when a child IAB node transitions, such as between MT and DU. For example, parent IAB ANs may provide guard symbols to child IAB nodes using MT resource sets and DU resource sets, and such guard symbols may be applied for transitions between MT and DU functions based on such MT resource sets and DU resource sets. The parent IAB AN may provide guard symbols for different types of transitions. Potentially, the some rules and/or exceptions may be configured and/or defined transitions between MT and DU, such as rules and/or exceptions associated with transitioning between MT resource sets and DU resource sets. Accordingly, the present disclosure provides some benefits to IAB networks by reducing ambiguities associated with transitions between MT and DU functions.

Figure 4:
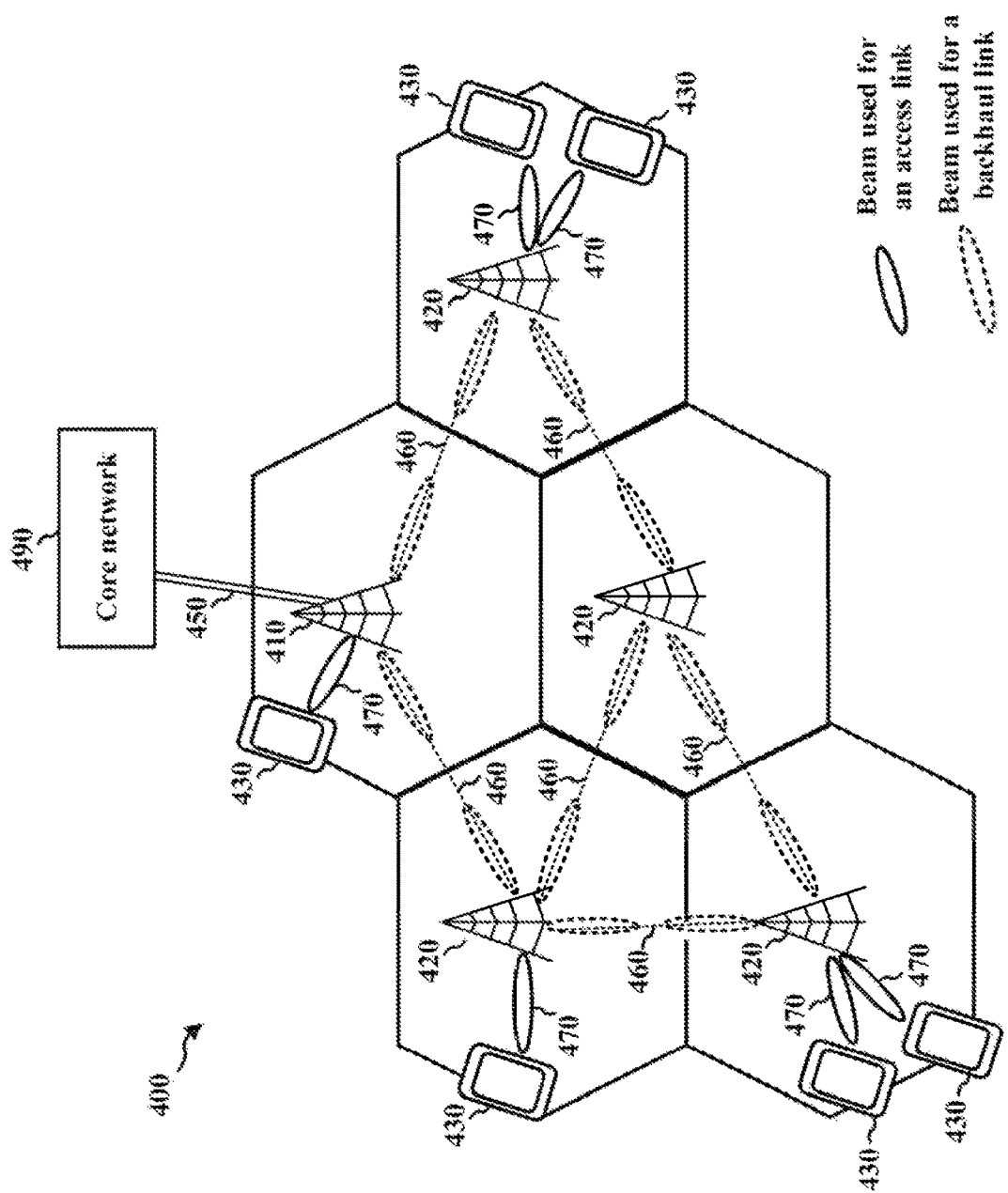
FIG. 4 is a diagram illustrating an example integrated access and backhaul (IAB) network connected with a core network, in accordance with various aspects of the present disclosure.

FIG. 4 is a diagram illustrating an example IAB network 400 connected with a core network 490, in accordance with various aspects of the present disclosure. The IAB network 400 may include multiple IAB ANs, including an IAB donor 410 and a set of IAB nodes 420, and multiple UEs 430. The IAB donor 410 may connect the IAB network 400 with the core network 490.

The IAB donor 410, which may also be referred to as an IAB donor node or simply IAB donor, may be implemented as an enhanced gNB, eNB, or other similar base station having functionality for controlling the IAB network 400. In particular, the IAB donor 410 may connect the IAB nodes 420 and UEs 430 of the IAB network 400 to the core network 490, e.g., via one or multi-hops. The IAB nodes 420 may be implemented as L2 relay nodes, etc. Together, the IAB donor 410 and the IAB nodes 420 share resources to provide an access network and a backhaul network to core network 490. For example, resources may be shared between access links and backhaul links in the IAB network.

According to various aspects, the UEs 430 may interface with the IAB nodes 420 and/or the IAB donor 410 through access links 470. Each of the IAB nodes 420 may communicate with one or more other IAB nodes 420 and with the IAB donor 410 through backhaul links 460. The IAB donor 410 is connected to the core network 490 via a wireline backhaul link 450.

UEs 430 communicate with the core network 490 by relaying messages through their respective access link 470 to the IAB network 400, which then may relay the message through backhaul links 460 to the IAB donor 410 to communicate to the core network 490 through the wireline backhaul link 450. Similarly, the core network 490 may communicate with each of the UEs 430 by sending a message to the IAB donor 410 through the wireline backhaul link 450. The IAB donor 410 sends the message through the IAB network 400 via backhaul links 460 to the relevant IAB node 420 connected to a respective one of the UEs 430, and the relevant IAB node 420 sends the message to the respective UE 430 via the access link 470.

While the wireline backhaul link 450 may be a wired connection, the backhaul links 460 and the access link 470 may be wireless links, e.g., in a mmW spectrum, such as FR2 of 5G NR, and/or in a sub-6 GHz spectrum, such as FR1 of 5G NR. Therefore, the IAB network 400 may include both access links 470 and backhaul links 460 that share the same frequency band(s), and so resources may also be shared between the access link 470 and backhaul links 460. As the frequency band(s) are finite, at least some of the framework for the access links 470 may be also be used by the framework for the backhaul links 460, e.g., with respect to some signaling, scheduling, and/or resource allocation.

Figure 5:
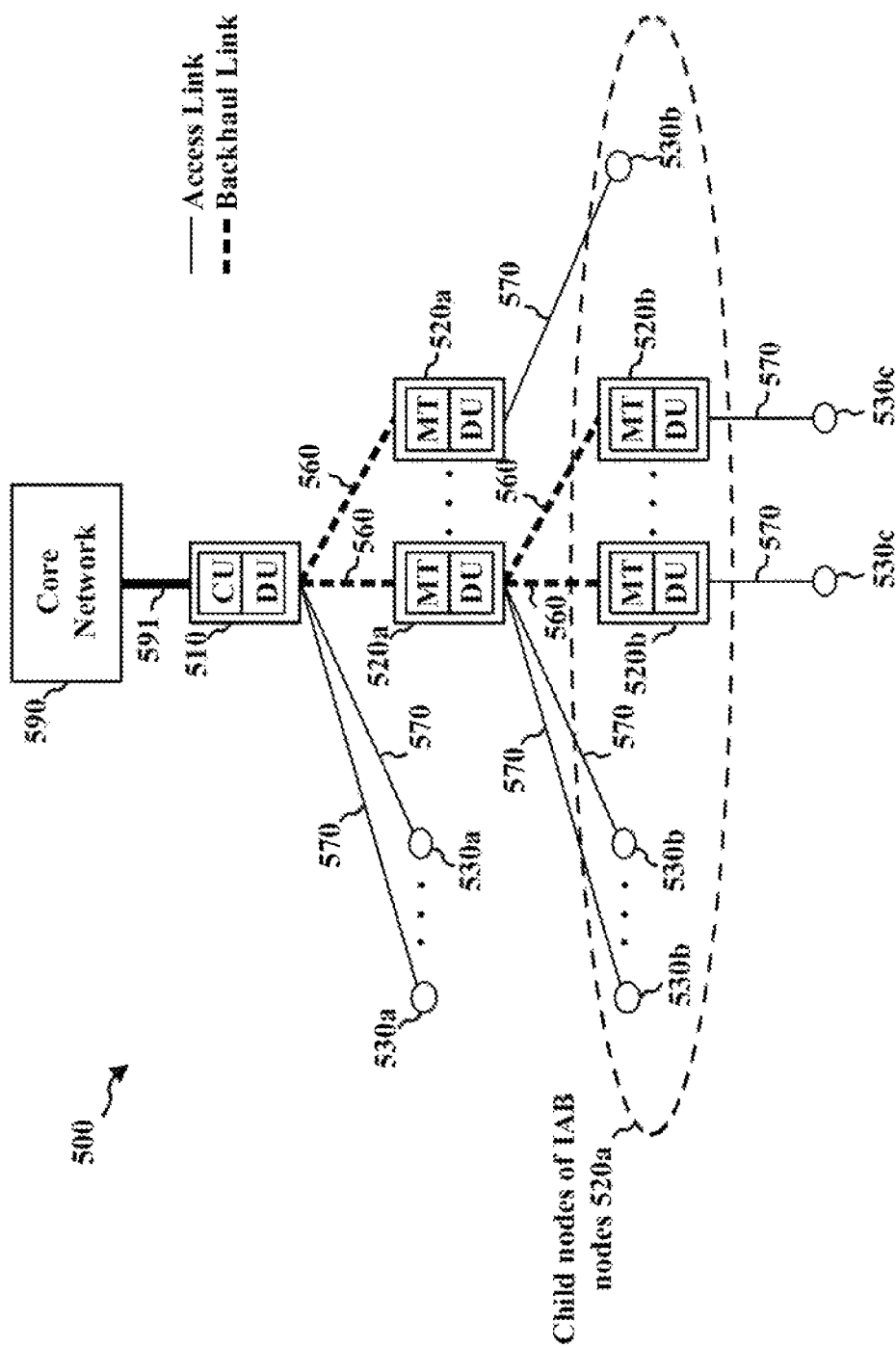
FIG. 5 is a diagram illustrating an IAB network connected to a core network via a wired connection, in accordance with various aspects of the present disclosure.

FIG. 5 is a diagram illustrating an IAB network 500 connected to a core network 590 via a wired connection 591, in accordance with various aspects of the present disclosure. The IAB network 500 includes an IAB donor 510 and IAB nodes 520a-b. The IAB nodes 520a-b, as well as the IAB donor 510, may provide wireless access links to UEs 530a-c. Further, some of the IAB nodes 520a, as well as the IAB donor 510, may provide wireless backhaul links 560 to some others of the IAB nodes 520a-b.

In some aspects, the IAB network 500 may follow a hierarchical arrangement, for example, in which the IAB donor 510 is considered a root node of the tree structure of the IAB network 500. The IAB donor 510 may be connected to the core network 590 via a wired connection 591. The wired connection 591 may include, e.g., a wireline fiber or other similar wired connection. The IAB donor 510 may provide a connection to one or more IAB nodes 520a. Therefore, the IAB donor 510 may be referred to as a parent, whereas the IAB nodes 520a may each be referred to as a child of the IAB donor 510.

The IAB donor 510 may also provide a connection to one or more UEs 530a, each of which may be referred to as a child UE of IAB donor 510. The IAB donor 510 may be connected to the child UEs 530a via access links 570. However, the IAB donor 510 may be connected to the child IAB nodes 520a via backhaul links 560.

At least one of the IAB nodes 520a that is a child of the IAB donor 510 may also be a parent to other IAB nodes 520b. Each of the IAB nodes 520b that is a child of one of the IAB nodes 520a may be provided a backhaul link 560 to the IAB donor donor 510 in order to connect to the core network 590 via the wired connection 591 at the IAB donor 510.

The IAB nodes 520a-b may each be connected to the UEs 530b-c (excluding the UEs 530a that are children of the IAB donor 510). Similar to the IAB donor 510, the IAB nodes 520a-b may provide access links 570 to one or more of the UEs 530b-c. Thus, each of the UEs 530b-c may be a child of a respective corresponding one of the IAB nodes 520a-b.

As illustrated by FIG. 5, the IAB donor 510 may include two functions: a CU and a DU. The CU may control and manage the IAB nodes 520a-b in the IAB network 500. For example, the CU may be responsible for configuration and/or organization of the IAB network 500. In the context of a radio or network stack, the CU may perform some or all RRC layer and/or PDCP layer functions.

Separate from the CU, the DU of the IAB donor 510 may perform scheduling of the various children connected to the IAB donor 510, including the child IAB nodes 520a and/or child UEs 530a. For example, the DU of the IAB donor 510 may allocate and schedule resources for communication with and/or by the IAB nodes 520a and the UEs 530a that are children of the IAB donor 510. Further, the DU may be perform some or all of the respective functions for each of the RLC, MAC, and/or PHY layers including in the radio or network stack.

Similar to the IAB donor 510, each of the IAB nodes 520a-b may have a DU as one of two functions included therein associated with operation in the IAB network 500. As described with respect to the IAB donor 510, a respective DU of each of the IAB nodes 520a-b may be responsible for scheduling respective ones of the child UEs 530b-c and, if applicable, scheduling respective ones of the child IAB nodes 520b, which may be multi-hop nodes with respect to the IAB donor 510 and wired connection 591 to the core network 590.

Dissimilar from the IAB donor 510, each of the IAB nodes 520a-b may have a respective MT function as the second function included therein associated with operation in the IAB network 500. Therefore, the IAB nodes 520a-b not having a wired connection 521 to the core network 590 may lack a respective CU function. An MT function may serve as the terminal point for some data and/or control information, e.g., on the DL, from the core network 590 and/or from one of the parent IAB ANs, such as the IAB donor 510 or the parent one of the IAB nodes 520a. Further, the MT function may serve as the origination point for some other data and/or control information, e.g., on the UL, to the core network 590 and/or to one of the parent ANs, such as the IAB donor 510 or the parent one of the IAB nodes 520a.

For each of the IAB nodes 520a-b, a respective MT may act as a scheduled node, e.g., similar to each of the UEs 530a-c, scheduled by a respectively corresponding one of the parent IAB donor 510 or IAB nodes 520a-b. Illustratively, each MT of the IAB nodes 520b may operate as a scheduled node of the parent one of the IAB nodes 520a; correspondingly, the DU of the parent one of the IAB nodes 520a may schedule each of the child IAB nodes 520b and associated ones of the child UEs 530b.

As each IAB node may include a DU and may provide a connection to a hierarchically higher parent IAB AN for one or more other child IAB nodes, an IAB network may include multi-hop connections for IAB nodes that are relatively distant from an IAB donor to communicate with the core network, assuming sufficient hops via wireless backhaul links through a hierarchy of IAB nodes. Accordingly, increasingly disparate and geographically distant IAB networks may be configured based on the flexibility and functionality accorded by wireless backhaul shared on access networks.

Figure 6:
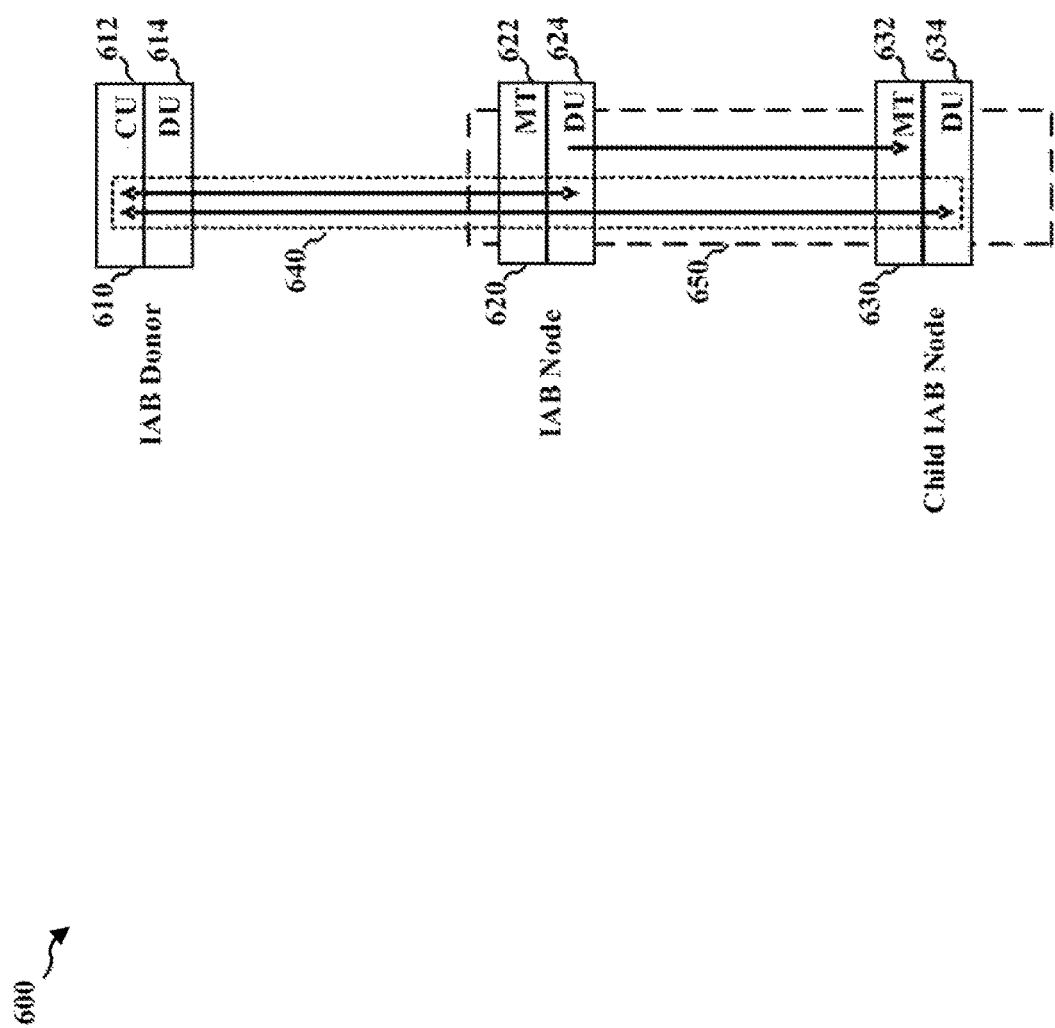
FIG. 6 is a diagram illustrating an example communication flow between an IAB donor, a first IAB node, and a second IAB node, in accordance with various aspects of the present disclosure.

Referring now to FIG. 6, a diagram illustrates an example communication flow 600 between an IAB donor 610, a first IAB node 620, and a second IAB node 630, in accordance with various aspects of the present disclosure. The IAB donor 610 may be connected to a core network, e.g., via a wireline fiber or other wired connection. Thus, the IAB donor 610 may configure and organize an IAB network that includes at least the first IAB node 620 and the second IAB node 630. To that end, the IAB donor 610 may be a parent of the first IAB node 620, and therefore, the first IAB node 620 may be a child of the IAB donor 610. However, the first IAB node 620 may also be a parent, as the second IAB node 630 may be a child of the first IAB node 620.

In some aspects, The DU 614 of the IAB donor 610 may communicate with the MT 622 of the IAB node 620, e.g., over a Uu air interface, such as by scheduling communication that terminates and/or originates with the MT 622 of the IAB node 620. Further, the CU 612 of the IAB donor 610 may communicate with the DU 624 of the IAB node 620 and the DU 634 of the child IAB node 630 over an F1 interface 640. The F1 interface 640 may support exchanging information with or transferring encapsulated RRC messages to a child IAB node (e.g., the MT of a child of the receiving IAB node) (e.g., transferring an encapsulated RRC message for the child IAB node 630 to the DU 624 of the IAB node 620). In some aspects, the CU 612 may configure the resource pattern of the DU 624 of the IAB node 620 over the F1 interface 640.

The DU 624 of the IAB node 620 may communicate with the MT 632 of the child IAB node 630 over a Uu air interface 650. The Uu air interface 650 may support transferring RRC messages received from the CU 612 of the IAB donor 610 to the MT 632 of the child IAB node 630, and may support the DU 624 of the IAB node 620 dynamically scheduling the MT 632 of the child IAB node 630. In some aspects, the IAB node 620 may dynamically control some resources of the DU 634 of the child IAB node 630 over the Uu air interface 650.

Figure 7:
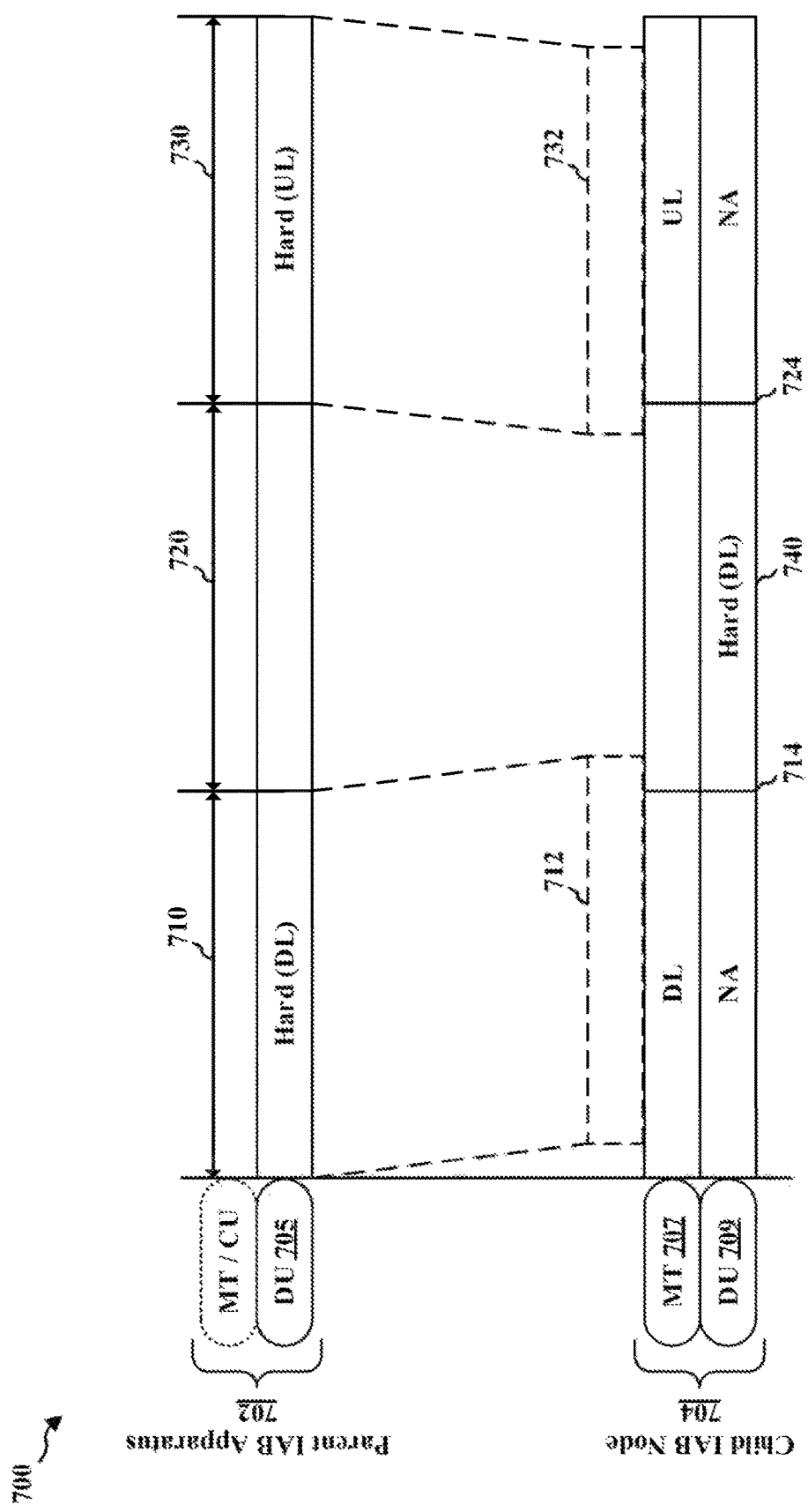
FIG. 7 is a diagram illustrating example resource configurations for resources on which at least one of a parent IAB apparatus and/or a child IAB node may communicate, in accordance with various aspects of the present disclosure.

Turning now to FIG. 7, a diagram illustrates example resource configurations 700 for resources on which at least one of a parent IAB apparatus 702 and/or a child IAB node 704 may communicate, in accordance with various aspects of the present disclosure. According to various aspects, the parent IAB apparatus 702 may be implemented as either an IAB donor or an IAB node. The parent IAB apparatus 702 may include an MT function and a DU function 705 when implemented as the latter, whereas the parent IAB apparatus 702 may include a CU function and the DU function 705 when implemented as the former. The child IAB node 704 may be implemented as an IAB node having an MT function 707 and a DU function 709. The child IAB node 704 may be configured to operate in a TDD mode, e.g., as described with respect to FIGS. 2A through 2D, supra.

In the context of the relationship between the parent IAB apparatus 702 and the child IAB node 704, the DU function 705 may be operate as a parent responsible for some configuration and scheduling of the MT function 707 of the child IAB node 704 (as well as for some configuration and scheduling of other child IAB nodes and/or UEs connected thereto). Correspondingly, the child IAB node 704 may use the MT function 707 for communication with the DU function 705 of the parent IAB apparatus 702.

Therefore, the DU function 705 of the parent IAB apparatus 702 may be referred to as a "parent DU" and the MT function 707 of the child IAB node 704 may be referred to as a "child MT." Because the child IAB node 704 may share resources between the child MT 707 and the DU function 709 as a child of the parent IAB apparatus 702, the DU function 709 may also be referred to as a "child DU."

Potentially, the child IAB node 704 may be connected with hierarchically lower child IAB nodes (e.g., "grandchild" IAB nodes of the parent IAB apparatus 702) and/or UEs. The DU function 709 of the child IAB node 704 may schedule and/or communicate with respective DU functions of such child IAB nodes and/or UEs.

In IAB networks, the same resources may be shared between access links and backhaul links—for example, communication in some IAB networks may be in-band, and so the same carrier frequencies are used for both the MT and DU functions of an IAB node. As viewed by the MT function of the IAB node, resources on which MT communication may be scheduled may be referred to as "MT resources." Similarly, resources on which DU communication may be scheduled may be referred to as "DU resources," as viewed by the DU function of the IAB node.

For both MT and DU resources (e.g., in the time domain), resources may be assigned to a direction of communication as one of DL, UL, or flexible (F). Logically, then, resources configured as DL may be scheduled for DL communication, resources configured as UL may be scheduled for UL communication, and resources configured as F may be scheduled for either DL or UL communication (e.g., as described with respect to FIG. 2A, supra). In some aspects, in accordance with the half-duplex constraint, a specific resource configuration does not necessarily imply that the resource is available for communication in the configuration communication direction. For example, a DL/UL/F resource configuration for MT resources may conflict in the time domain with another DL/UL/F resource configuration for DU resources.

In some instances, MT resources and DU resources may overlap, e.g., at least in the time domain. However, an IAB node typically may be unable to simultaneously communicate from both the MT and DU functions, which may introduce a half-duplex constraint. For coordination of MT and DU (and address the half-duplex constraint, to the extent possible), DU resources may be further configured as one of "hard," "soft," or "not available" (also referred to as "NA").

Specifically, a hard resource is available for use in the configured direction(s) by the DU of an IAB node without the IAB node having to consider the impact on the corresponding MT resources. In effect, the MT function of the IAB node cannot use MT resources corresponding to the hard DU resources because such resources have the potential to be unavailable or occupied. If resources configured as hard were to be allocated to the MT function, the DU function may ignore the allocation of the MT function and nonetheless use such hard resources. In some aspects, however, the IAB node (e.g., the DU function) may determine that the MT function should be prioritized over the DU function, and so the DU function may refrain from using some hard resources and allow the MT function to allocate those resources.

Further, a soft resource is available for use in the configured direction(s) by the DU of an IAB node if such use by the DU does not impact the configuration and scheduling of the MT on those resources. In some instances, soft resources may be explicitly or implicitly available; that is, soft resources may be explicitly indicated as available or implicitly indicated as available. A soft resource may be explicitly available when a parent IAB AN (e.g., a parent DU function) indicates to the (child) IAB node that the soft resource will be available (e.g., the parent DU has not scheduled the MT function of the IAB node to communicate on the soft resource). A soft resource may be implicitly available when the IAB node (e.g., the DU function) determines that the DU function is able to use the soft resource without interfering with transmission or reception by the MT function (e.g., absent any information indicating the availability or unavailability of the soft resource from the parent IAB AN).

In some other instances, soft resources may be unavailable. In such other instances, soft resources that are unavailable may be explicitly unavailable; that is, soft resources may be explicitly indicated as unavailable. A soft resource may be explicitly unavailable when a parent IAB AN (e.g., a parent DU function) indicates to the (child) IAB node that the soft resource will be unavailable, such as when the parent DU schedules and/or configures the MT function of the (child) IAB node to communicate on the soft resource.

Separately from hard or soft, some resources may be configured as NA for the DU of the IAB node. An NA resource is unavailable for use by the DU of the IAB node, regardless of any impact on the configuration and scheduling of the MT function on those resources.

Still with reference to FIG. 7, the DU function 709 of the child IAB node 704 may transmit DL data and/or control information to at least one grandchild IAB node (e.g., an MT function of an IAB node that is a child of the child IAB node 704) and/or at least one UE on resources that are configured as DL. In the other communication direction, the DU function 709 of the child IAB node 704 may receive UL data and/or control information from at least one grandchild IAB node (e.g., an MT function of an IAB node that is a child of the child IAB node 704) and/or at least one UE on resources that are configured as UL.

Some resources on which the child IAB node 704 may communicate may be configured as F at some point in time, rather than DL or UL. The MT function 707 of the child IAB node 704 may determine whether resources configured as F will be used as DL or UL at a later time, such as based on receiving an information indicating whether such resources configured as F are to be used as DL or UL. For example, an information indication whether resources configured as F are to be used as DL or UL may be received by the child IAB node 704 from the parent IAB apparatus 702 and/or from an IAB donor that configures the IAB network including the IAB apparatus 702 and IAB node 704.

As shown by the example resource configuration 700, the parent IAB apparatus 702 may communicate with the child IAB node 704 on a first set of time domain resources 710, a second set of time domain resources 720, and a third set of time domain resources 730. In terms of perspective, the example resource configuration 700 may illustrate the configuration between the parent DU 705, child MT 707, and child DU 709.

The parent IAB apparatus 702 may transmit downlink data to the child IAB node 704 on the first set of resources 710. In some aspects, the first set of resources 710 may be configured as hard for the parent DU 705 to allow the parent DU 705 to decide whether to use the resources 710 to transmit DL data to the child IAB node 704, e.g., regardless of operation of the MT of the parent IAB apparatus 702. Viewed from the child MT perspective, the first set of resources 710 may be configured as DL for the child MT 707 to receive the DL data from the parent DU 705. From the child DU perspective, the first set of resources 710 may be configured as NA for the child DU 709 to prevent the child DU 709 from interfering with the child MT 707 receiving the DL data from the parent DU 705.

The child IAB node 704 may transmit DL data to a hierarchically lower child IAB node or child UE on the second set of resources 720. For the child DU 709, the second set of resources 720 may be configured as hard, while the second set of resources 720 may be configured as NA for the parent DU 705, e.g., thereby preventing the parent DU 705 from communicating (or scheduling communication) with the child MT 707 on the second set of resources 720.

Referring to the third set of resources 730, the child IAB node 704 may transmit UL data to the parent IAB apparatus 702 on the third set of resources 730. Therefore, the third set of resources 730 may be configured as UL for the child MT 707 to transmit such UL data to the parent DU 705. However, the third set of resources 730 may be configured as NA for the child DU 709 to prevent the child DU 709 from interfering with the child MT 707 transmitting the UL data to the parent DU 705. At the parent IAB apparatus 702, the third set of resources 730 may be configured as hard for the parent DU 705 so that the parent DU 705 can decide whether to use some or all of the third set of resources 730 to receive UL data from the child MT 707 regardless of operation of the MT of the parent IAB apparatus 702.

As the child IAB node 704 may communicate utilizing the child MT 707 on the first set of resources 710 and may communicate utilizing the child DU 709 on the second set of resources 720, the child IAB node 704 may perform a transition between the child MT 707 and the child DU 709 at a transition time 714 between the first and second sets of resources 720, 730. Similarly, as the child IAB node 704 may communicate utilizing the child DU 709 on the second set of resources 720 and may communicate utilizing the child MT 707 on the third set of resources 730, the child IAB node 704 may perform another transition between the child DU 709 and the child MT 707 at another transition time 724, which occurs between the second and third sets of resources 720, 730.

Such transitions between DU and MT functions may incur some overhead at a transitioning IAB apparatus, and therefore, guard periods may be provided in order to protect the transitioning IAB apparatus, e.g., from failing to receive or transmit, from losing synchronization, etc. In the context of the present disclosure, guard periods may be described as a number of symbols, e.g., on which no transmissions or receptions may be scheduled; however, other timing structures may be used to implement guard periods (e.g., slots, subframes, other transmission time intervals, etc.) without departing from the scope of the present disclosure.

The parent IAB apparatus 702 and the child IAB node 704 may utilize guard symbols at transition times (e.g., at transition time 714, at transition time 724, etc.). A guard symbol may be a resource on which nothing is transmitted (and/or on which nothing is scheduled). An child IAB node, such as the child IAB node 704, may utilize one or more different components (e.g., different transmitters, different receivers, different antennas, different TX and/or RX chains, etc.), different analog beams, and/or other different circuitry for an MT function and for a DU function. The guard symbols may provide time for the child IAB node to switch between at least one component, analog beam, and/or other circuitry used for the MT function and at least one component, analog beam, and/or other circuitry used for the DU function. The guard symbols may also reduce or prevent some other conflicts, e.g., in which the MT function and the DU function are both supposed to be operating at the same time, which may occur due to propagation delays, timing advances, and so forth.

As illustrated in FIG. 7, for example, although the parent DU 705 transmits DL data on the first set of resources 710, the transmission may actually be received at the child IAB node 704 on resources 712, which are slightly delayed from the first set of resources 710. Some of the resources 712 overlap with the second set of resources 720 on which the child DU 709 is configured to transmit DL data to another IAB node or UE. Thus, guard symbols at the end of the resources 710 provided by the parent DU 705 and/or at the beginning of the resources 740 provided by the child DU 709 may allow the child IAB node 704 to transition from use of the child MT 707 to receive DL data to use of the child DU 709 to transmit DL data without conflict.

Similarly, UL data transmitted on resources 732 from the child IAB node 704 to the parent DU 705 may also experience some delay from point of transmission to point of reception. Accordingly, guard symbols at the end of resources 740 provided by the child DU 709 and/or at the beginning of resources 730 provided by the parent DU 705 may allow the child IAB node 704 to transition from use of the child DU 709 to transmit DL data to use of the child MT 707 to transmit UL data without conflict.

FIG. 8 shows an example table 800 illustrating some types of transitions by an IAB node, in accordance with various aspects of the present disclosure. For example, the IAB node may have an MT function and a DU function, and may be a child of a parent IAB apparatus (e.g., a hierarchically higher IAB node or an IAB donor), and therefore, the MT function may communicate with and/or be scheduled by the parent IAB apparatus (e.g., by a DU function of the parent IAB apparatus). Potentially, the IAB node may also have a child, such as a UE and/or a hierarchically lower child IAB node that is a grandchild of the parent IAB apparatus, which may in turn communicate with and/or be scheduled by the IAB apparatus.

While the IAB node may be configured to transition between the MT and DU functions, such transitions may be of different types, e.g., with some transition types being associated with different parameters and/or characteristics than some other transition types. In some instances, differences between different transition types may affect the durations of different transition types.

In some aspects, a transition type may be based on a resource configuration associated with resources immediately before a transition and/or based on a resource configuration associated with resources immediately after the transition. (For example, "immediately before" and "immediately after" may imply there are no other time resources or other timing structures intervening between the resources and the transition time.) Resources may be configured for use by an MT function or for use by a DU function.

Resources configured for use by the MT function may be configured for receiving DL data from a parent (e.g., referred to as "DL RX") or for transmitting UL data to the parent (e.g., referred to as "UL TX"). Resources configured for the DU function may be configured for transmitting DL data to a child (e.g., referred to as "DL TX") or for receiving UL data from the child (e.g., referred to as "UL RX").

In some aspects, the configuration of resources may be associated with a state of the IAB node. That is, an IAB node may be in a transmit state or a receive state, and further, may be in an UL state or a DL state. For example, the MT function of the IAB node may be in a DL RX state, and accordingly, the resources configured for use by the MT function may be configured as DL RX. In another example, For example, the DU function of the IAB node may be in a UL RX state, and accordingly, the resources configured for use by the DU function may be configured as UL RX.

In some instances, the IAB node may transition from the MT function to the DU function, and as illustrated in the example table 800, such a transition may be one of multiple different types (e.g., four different types of transitions from MT to DU functions). A transition from using an MT function to receive DL data (e.g., DL RX) to using a DU function to transmit DL data (DL TX) may be referred to as a Type 1 transition. A transition from using an MT function to receive DL data (DL RX) to using a DU function to receive UL data (UL RX) may be referred to as a Type 2 transition. A transition from using an MT function to transmit UL data (UL TX) to using a DU function to transmit DL data (DL TX) may be referred to as a Type 3 transition. A transition from using an MT function to transmit UL data (UL TX) to using a DU function to receive UL data (UL RX) may be referred to as a Type 4 transition.

In some other instances, the IAB node may transition from the DU function to the DU function, and as illustrated in the example table 800, such a transition may be one of multiple different types (e.g., four different types of transitions from MT to DU functions). A transition from using a DU function to transmit DL data (DL TX) to using an MT function to receive DL data (DL RX) may be referred to as a Type 5 transition. A transition from using a DU function to transmit DL data (DL TX) to using an MT function to transmit UL data (UL TX) may be referred to as a Type 6 transition. A transition from using a DU function to receive UL data (UL RX) to using an MT function to receive DL data (DL RX) may be referred to as a Type 7 transition. A transition from using a DU function to receive UL data (UL RX) to using an MT function to transmit uplink data (UL TX) may be referred to as a Type 8 transition.

The number of guard symbols provided at a transition time may be based on the transition type of the transition. The number of guard symbols provided for a given transition type may be based on parameters and/or characteristics associated with the transition, such as parameters and/or characteristics associated with at least one of switching, signal propagation, timing advance, and/or other factor(s) that may affect transitions and/or contemporaneous signaling. For example, in some aspects, transitions of Type 1, 4, 5, and 8 may be provided guard symbols for switching from a transmitter (e.g., including a TX chain and/or other transmit circuitry) to the receiver (e.g., including an RX chain and/or other receive circuitry). In some aspects, transitions of Type 1 and 2 may be provided guard symbols for propagation delay based on the distance from a parent IAB apparatus.

In some other aspects, transitions of Type 7 and 8 may be provided guard symbols for propagation delay based on the distance from the child IAB node or UE. In some aspects, transitions of Types 1 through 8 may be provided guard symbols for switching antennas. The number of guard symbols provided for a given transition type may be based on a requested number of guard symbols transmitted from the IAB node to the parent IAB apparatus (e.g., such as a MAC CE or other message field associated with a label indicating GuardSymbolsDesired) and/or based on information indicating a number of guard symbols to be provided transmitted from the parent IAB apparatus to the IAB node (e.g., such as information included in a MAC CE or other message field associated with a label indicating GuardSymbolsProvided), e.g., as further discussed by various aspects and details, infra.

Figure 9:
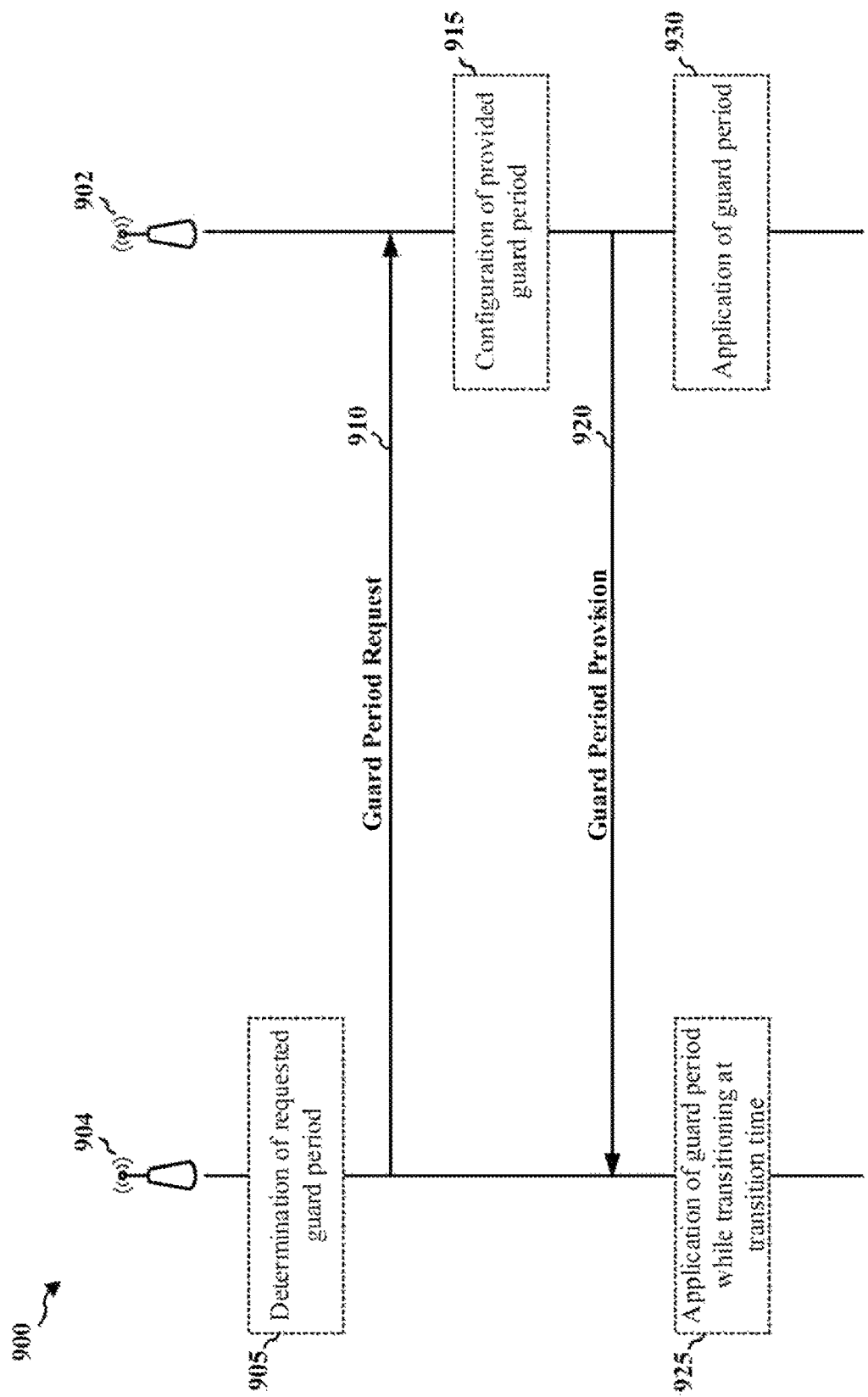
FIG. 9 is a call flow diagram illustrating an example communication flow between a parent IAB apparatus and a child IAB node for configuration of a guard period associated with a transition between a mobile termination (MT) function and a distributed unit (DU) function of the child IAB node, in accordance with various aspects of the present disclosure.

Turning to FIG. 9, a call flow diagram illustrates an example communication flow 900 between a parent IAB apparatus 902 and a child IAB node 904 for configuration of a guard period associated with a transition between an MT function and a DU function of the child IAB node 904, in accordance with various aspects of the present disclosure. According to the aspects described in FIG. 9, the guard period is described as being implemented as one or more guard symbols; however, the guard period may be implemented using another timing structure (e.g., slot, subframe, etc.) and/or unit(s) (e.g., ms, µs, etc.).

A guard period may include at least one of a position (e.g., a time at which the guard period is to be applied) and/or a length (e.g., a duration for which the guard period is to be applied). A guard period for a transition by the child IAB node 904, such as a set of guard symbols, may be positioned at one or more resources immediately before the transition, one or more resources immediately after the transition, or may be split between both the resources immediately before and immediately after the transition. The child IAB node 904 and the parent IAB apparatus 902 may communicate to determine a position of the guard symbols and/or a number of the guard symbols to be provided by the child IAB node 904 and the guard symbols and/or a number of the guard symbols to be provided by the parent IAB apparatus 902.

In some aspects, a guard period may vary according to the type of transition between MT and DU functions at the child IAB node 904. The child IAB node 904 may make a determination 905 of the guard period (e.g., guard period length and/or position) to request in order to allow the child IAB node 904 to transition between MT and DU functions, e.g., allowing both the MT and DU functions to adhere to respective schedules, such that conflicts between resources on which the MT and DU functions communicate are avoided. Thus, in some aspects, the child IAB node 904 may make a determination 905 of the guard period to request based on the type of transition at the child IAB node 904.

For example, the child IAB node 904 may have information stored therein indicating a respective guard period corresponding to one or more of the Types 1 through 8 of transitions described with respect to FIG. 8, supra. Thus, in order for the child IAB node 904 to make a determination 905 of the guard period to request, the child IAB node 904 may determine the transition type (e.g., as one of Types 1 through 8) that is to be performed by the child IAB node 904, and then the child IAB node 904 may identify the respective guard period that corresponds to the determined transition type by accessing the table or other data structure and identifying the entry for the determined transition type.

For example, the table or other data structure may include a set of entries that respectively indicate, for each of transition type of Types 1 through 8, a respective corresponding guard period to be requested. Such entries, or other similar information indicating correspondence between transition types and guard periods, may be stored in the child IAB node 904, such as in a table (e.g., a lookup table) or other data structure, and may be preconfigured by the child IAB node 904, populated based on calculations and/or computations by the child IAB node 904, and/or populated based on information received from the parent IAB apparatus 902.

The child IAB node 904 may transmit a guard period request 910 to the parent IAB apparatus 902, with the guard period request 910 indicating the requested guard period, according to the determination 905 by the child IAB node 904. For example, the guard period request 910 may include information indicating a position of guard symbols and/or a number of guard symbols requested by the child IAB node 904 for the child IAB node 904 to perform one of Types 1 through 8 of transitions, e.g., that the child IAB node 904 may have determined to perform.

In some aspects, the guard period request 910 may be included in a MAC CE or other field of a message or message header. For example, the guard period request 910 may correspond to a label or other similar indicator of GuardSymbolsDesired that is associated with the MAC CE or other field carrying the guard period request 910. In some other aspects, the child IAB node 904 may indicate that no guard period is requested by refraining from including a value in, or by assigning null to, the MAC CE or other field associated with the label or other similar indicator of GuardSymbolsDesired.

In connection with transmission by the child IAB node 904, the parent IAB apparatus 902 may receive the guard period request 910, and may identify the guard period requested by the child IAB node 904 therefrom. For example, the parent IAB apparatus 902 may identify a position of guard symbols and/or a number of guard symbols requested by the child IAB node 904 for a transition of one of Types 1 through 8, described with respect to FIG. 8, supra. In some aspects, the guard period request 910 may explicitly indicate the requested guard period—e.g., the guard period request 910 may include a value (e.g., an integer or other number) and/or other information indicating the requested guard period length and/or requested guard period position.

Potentially, the guard period request 910 may implicitly indicate the requested guard period, such as by indicating a transition of one of the Types 1 through 8 to be performed by the child IAB node 904. The parent IAB apparatus 902 then may determine the requested guard period by determining a guard period that corresponds to the indicated type of transition type, e.g., using a lookup table, other table, or other data structure in which information defining correspondence between guard period length and one or more of Types 1 through 8 of transition.

The parent IAB apparatus 902 may perform configuration 915 of the guard period to be provided to the child IAB node 904. The parent IAB apparatus 902 may perform configuration 915 of the guard period to be provided to the child IAB node 904 by configuring a position of guard symbols and/or a number of guard symbols to be provided for the child IAB node 904. In some aspects, the parent IAB apparatus 902 may perform the configuration 915 of the guard period to be provided to the child IAB node 904 based on at least the guard period request 910. For example, the configuration 915 may be based on the requested position and/or length of the guard period identified by the parent IAB apparatus 902 from the guard period request 910. Potentially, the configuration 915 of the provided guard period may include configuring the provided guard period length to be equal to the requested guard period length and/or configuring the provided guard period position to occur at the requested guard period position.

In some other aspects, however, the parent IAB apparatus 902 may perform the configuration 915 of the provided guard period based on some other information, in addition or alternative to basing the configuration 915 of the provided guard period on the guard period request 910. Illustratively, the configuration 915 may be based on some resource utilization and/or performance impact. Additionally or alternatively, the parent IAB apparatus 902 may take into account, for the configuration 915 of the guard period, some allocation(s) and/or scheduling(s) of resources by the DU function and/or by the relevant one of the MT or CU functions of the parent IAB apparatus 902.

For example, the parent IAB apparatus 902 may base the configuration 915 on communication scheduled with one or more UEs and/or other child IAB nodes (e.g., other child IAB nodes also having the parent IAB apparatus 902 as a parent, and so are hierarchically equal to the child IAB node 904) by the DU function of the parent IAB apparatus 902. In another example, when the parent IAB apparatus 902 is implemented as an IAB node (e.g., an IAB node hierarchically higher than the child IAB node 904 but a child of a higher IAB apparatus), the configuration 915 may be based on communication scheduled for the MT function of the parent IAB apparatus 902. In a further example, when the parent IAB apparatus 902 is implemented as an IAB donor, the configuration 915 may be based on communication associated with configuring the IAB network by the CU function of the parent IAB apparatus 902.

Additionally or alternatively, the parent IAB apparatus 902 may take into account, for the configuration 915 of the guard period, some allocation(s) and/or scheduling(s) of resources by the DU function of the child IAB node 904. For example, the parent IAB apparatus 902 may receive, from the child IAB node 904, information indicating a schedule and/or allocation of resources proximate to the time at which the child IAB node 904 is to transition, such as information indicating a schedule and/or allocation configured by the DU function of the child IAB node 904 for resources immediately before the transition time and/or immediately after the transition. Configuration 915 of the guard period may then be based on such information received from the child IAB node 904.

In effect, the parent IAB apparatus 902 may determine whether the requested guard period is able to be provided to the child IAB node 904, e.g., at the requested position and/or for the requested length. For example, the parent IAB apparatus 902 may determine that the parent IAB apparatus 902 is able to provide the requested guard period length when the parent IAB apparatus 902 determines that the length of time that the DU function of the parent IAB apparatus 902 is able to refrain from communication with the MT function of child IAB node 904 is greater than or equal to the requested guard period length. If the parent IAB apparatus 902 determines that the requested guard period length is able to be provided to the child IAB node 904, then the configuration 915 may be equal to the requested guard period length, as indicated by the guard period request 910.

In some instances, however, the parent IAB apparatus 902 may determine that the parent IAB apparatus 902 is unable to provide the requested guard period, e.g., due to conflict(s) associated with the DU function and the applicable one of the MT or CU function of the parent IAB apparatus 902, associated with the MT function of the child IAB node 904 and some resource allocation/scheduling by the DU function of the parent IAB apparatus 902, associated with some resource allocation/scheduling by the DU function of the child IAB node 904, and so forth. For example, the parent IAB apparatus 902 may determine that the parent IAB apparatus 902 is able to provide a guard period of a shorter length than that requested by the child IAB node 904 or the parent IAB apparatus 902 may determine that no guard period is able to be provided. Accordingly, the parent IAB apparatus 902 may perform configuration 915 of the length of the guard period to be provided, which may be less than the requested guard period length.

The parent IAB apparatus 902 may transmit a guard period provision 920 to the child IAB node 904, with the guard period provision 920 indicating the provided guard period, according to the configuration 915 by the parent IAB apparatus 902. For example, the guard period provision 920 may include information indicating a position of guard symbols and/or a number of guard symbols provided by the parent IAB apparatus 902 for the child IAB node 904 to perform at least one of Types 1 through 8 of transitions, e.g., that the child IAB node 904 may have determined to perform. Thus, the guard period provision 920 potentially may indicate that the provided guard period (e.g., provided guard symbols) corresponds to at least one of the Types 1 through 8 of transitions that the child IAB node 904 may perform.

In some aspects, the guard period provision 920 may be included in a MAC CE or other field of a message or message header. For example, the guard period provision 920 may correspond to a label or other similar indicator of GuardSymbolsProvided that is associated with the MAC CE or other field carrying the guard period provision 920. In some other aspects, the parent IAB apparatus 902 may indicate that no guard period is provided by refraining from including a value in, or by assigning null to, the MAC CE or other field associated with the label or other similar indicator of GuardSymbolsProvided.

The child IAB node 904 may receive the guard period provision 920 from the parent IAB apparatus 902, and based thereon, the child IAB node 904 may perform application 925 of the guard period while transitioning at a transition time. For example, the child IAB node 904 may apply a number of guard symbols at a position of guard symbols indicated by the guard period provision 920, e.g., proximate to at the time at which the child IAB node 904 is transitioning from one of the MT or DU functions to the other of the MT or DU functions of the child IAB node 904. In so doing, the child IAB node 904 may refrain from communicating (e.g., refrain from transmission and/or reception) on the provided guard symbols.

In some aspects, the MT function of the child IAB node 904 may refrain from communicating on symbols allocated to the MT function of the child IAB node 904 adjacent to the transition time according to the provided number of guard symbols indicated by the guard period provision 920. The DU function of the child IAB node 904, however, may refrain from communicating on symbols allocated to the DU function of the child IAB node 904 adjacent to the transition time according to a difference between the requested number of guard symbols, e.g., as indicated in the guard period request 910, and the provided number of guard symbols, e.g., as indicated by the guard period provision 920.

Similarly, the parent IAB apparatus 902 may perform application 930 of the guard period for the configured length, e.g., such that the application 930 of the guard period at the parent IAB apparatus 902 at least partially overlaps and/or is contemporaneous with (e.g., occurs at the same time, occurs immediately before, and/or occurs immediately after) the application 925 of the guard period at the child IAB node 904. For example, the parent IAB apparatus 902 may apply a number of guard symbols according to the configuration 915 at the time at which the child IAB node 904 is transitioning from one of the MT or DU functions to the other of the MT or DU functions of the child IAB node 904. In so doing, the parent IAB apparatus 902 may refrain from communicating (e.g., refrain from transmission and/or reception) with the MT function of the child IAB node 904 using the DU function of the parent IAB apparatus 902 for the provided guard symbols, e.g., with the child IAB node 904 transitioning at some point during the provided guard symbols. Specifically, the DU function of the parent IAB apparatus 902 may refrain from communicating on symbols allocated to the MT function of the child IAB node 904 adjacent to the transition time according to the provided number of guard symbols indicated by the guard period provision 920.

As illustrated by the foregoing example communication flow 900, the parent IAB apparatus 902 may provide a guard period using a guard period provision 920 (e.g., GuardSymbolsProvided MAC CE or other message field indicating a provided number of guard symbols) based on a guard period request 910 (e.g., GuardSymbolsDesired MAC CE or other message field indicating a requested number of guard symbols) in order for the child IAB node 904 to perform a transition between use the MT and DU functions of the child IAB node 904. As a transition is between use of the DU and MT functions of the child IAB node 904, the transition may be adjacent to a first set of resources allocated to the MT function for communication between the child IAB node 904 and the parent IAB apparatus 902, and a second set of resources allocated to the DU function of the child IAB node 904 for communication between the child IAB node 904 and at least one child entity of the child IAB node 904 (e.g., at least one UE and/or at least one other child IAB node).

Figure 10A:
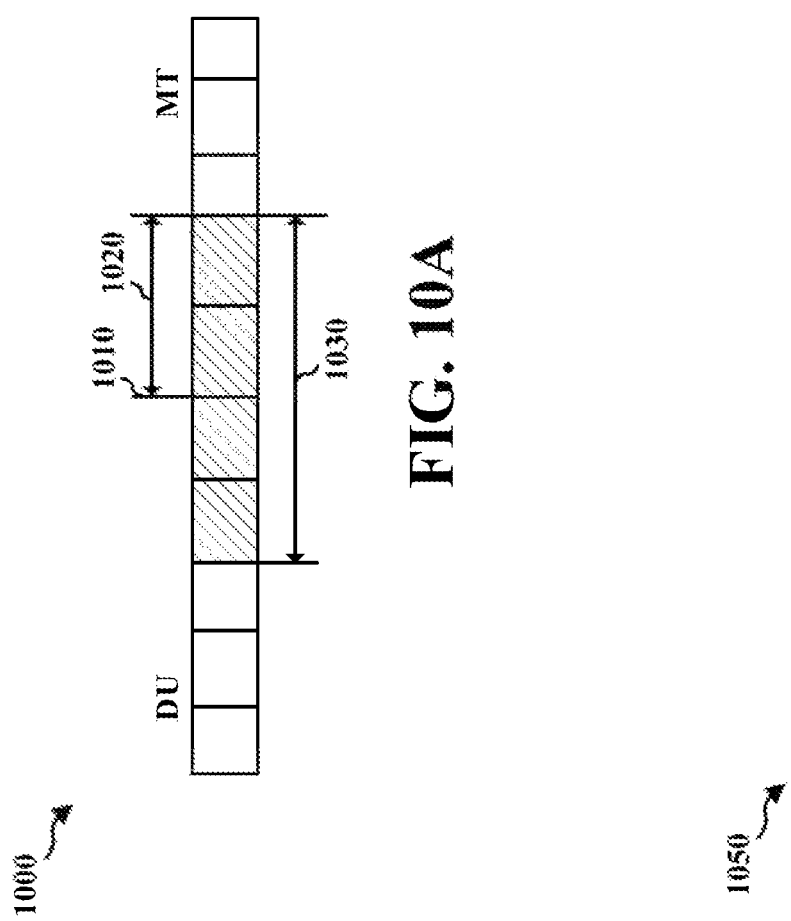
FIG. 10A is a block diagram illustrating an example resource configuration with guard symbols for a transition from a DU function to an MT function of a child IAB node, in accordance with various aspects of the present disclosure.

Referring to FIG. 10A, a block diagram illustrates an example resource configuration 1000 with guard symbols for a transition from a DU function to an MT function of a child IAB node, in accordance with various aspects of the present disclosure. The child IAB node may transition from the DU function to the MT function of the child IAB node at a transition time 1010. In the illustrated example configuration 1000, the guard period request (e.g., guard symbols indicated by GuardSymbolsDesired MAC CE or other message field) may indicate a request for four (4) guard symbols for a type of transition contemporaneous with the transition time 1010 (e.g., at least partially overlapping with the transition time 1010, occurring immediately before the transition time 1010, or occurring immediately after the transition time 1010).

Further, the guard period provision (e.g., guard symbols indicated by GuardSymbolsProvided MAC CE or other message field) may indicate a provision of two (2) guard symbols for the type of transition contemporaneous with the transition time 1010. Because the guard period provision indicates two guard symbols are provided for the transition time 1010, neither the parent IAB apparatus nor the child IAB node may transmit on the two symbols 1020 following the transition time 1010.

Because the guard period request indicates four guard symbols are requested, and the guard period provision indicates that two guard symbols are provided on the resources after the transition time 1010, the child IAB node may not transmit or receive on the two symbols before the transition time 1010, resulting in four guard symbols 1030 for the transition contemporaneous with the transition time 1010. The child IAB node may switch from operation of the DU function to operation of the MT function of the child IAB node during the time associated with the four guard symbols 1030.

Figure 10B:
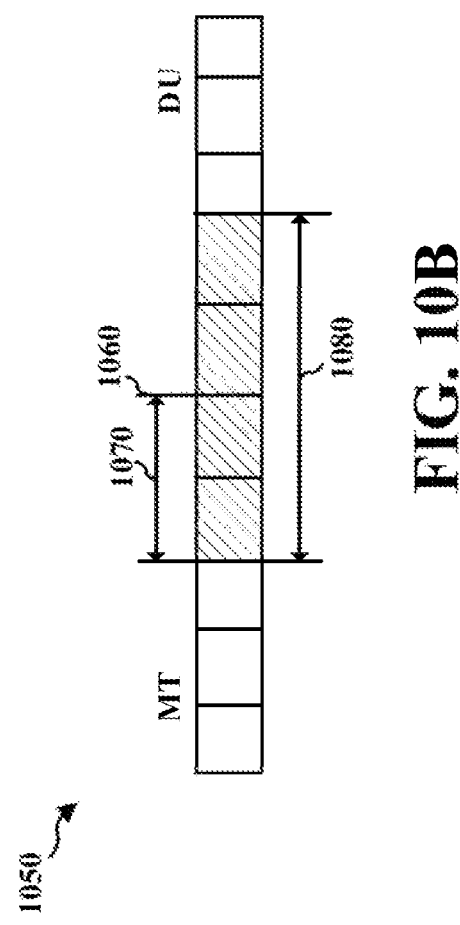
FIG. 10B is a block diagram illustrating another example resource configuration with guard symbols for a transition from an MT function to a DU function of a child IAB node, in accordance with various aspects of the present disclosure.

In another example shown by FIG. 10B, a block diagram illustrates another example resource configuration 1050 with guard symbols for a transition from an MT function to a DU function of a child IAB node, in accordance with various aspects of the present disclosure. The child IAB node may transition from the MT function to the DU function of the child IAB node at a transition time 1060. In the illustrated example configuration 1050, the guard period request (e.g., guard symbols indicated by GuardSymbolsDesired MAC CE or other message field) may indicate a request for four (4) guard symbols for a type of transition contemporaneous with the transition time 1060 (e.g., at least partially overlapping with the transition time 1060, occurring immediately before the transition time 1060, or occurring immediately after the transition time 1060).

Further, the guard period provision (e.g., guard symbols indicated by GuardSymbolsProvided MAC CE or other message field) may indicate a provision of two (2) guard symbols for the type of transition contemporaneous with the transition time 1060. Because the guard period provision indicates two guard symbols are provided for the transition time 1060, neither the parent IAB apparatus nor the child IAB node may transmit on the two symbols 1070 before the transition time 1060.

Because the guard period request indicates four guard symbols are requested, and the guard period provision indicates that two guard symbols are provided on the resources before the transition time 1060, the child IAB node may not transmit or receive on the two symbols after the transition time 1060, resulting in four guard symbols 1080 for the transition contemporaneous with the transition time 1060. The child IAB node may switch from operation of the MT function to operation of the DU function of the child IAB node during the time associated with the four guard symbols 1080.

In some further aspects, the parent IAB apparatus (e.g., the parent DU function) may schedule some communication with the child IAB node (e.g., the child MT function) on a PDSCH (e.g., for downlink reception by the child IAB node) or on a PUSCH (e.g., for uplink transmission by the child IAB node).

Potentially, such scheduling may conflict with a guard period provided by the parent IAB apparatus. For example, the parent IAB apparatus may provide a guard period including two guard symbols 1070 to be applied while the child MT function is active at the child IAB node, and some uplink data transmission on a PUSCH and/or downlink data reception on a PDSCH may be simultaneously scheduled by the parent DU function on at least one of the two guard symbols 1070.

Such simultaneous scheduling may be handled at the child IAB node according to one of potentially multiple different implementations of the child IAB node. In one such implementation, the child IAB node (e.g., the child MT function) may determine that (at least a portion) of the guard period should be ignored when in conflict with scheduling by the parent IAB apparatus (e.g., by the parent DU function).

Instead of refraining from communicating on the (at least a portion) of the guard period then, one or more resources corresponding to the provided guard period may be punctured with the scheduled uplink or downlink data on the PUSCH or PDSCH, respectively. For example, the child IAB node (e.g., child MT function) may puncture at least one of the two symbols 1070 according to scheduling by the parent IAB apparatus that conflicts with the at least one of the two symbols. The child IAB node may therefore transmit uplink data on a PUSCH or receive downlink data on a PDSCH on the punctured at least one of the two symbols 1070, which had otherwise been provided as a guard period.

Figure 11:
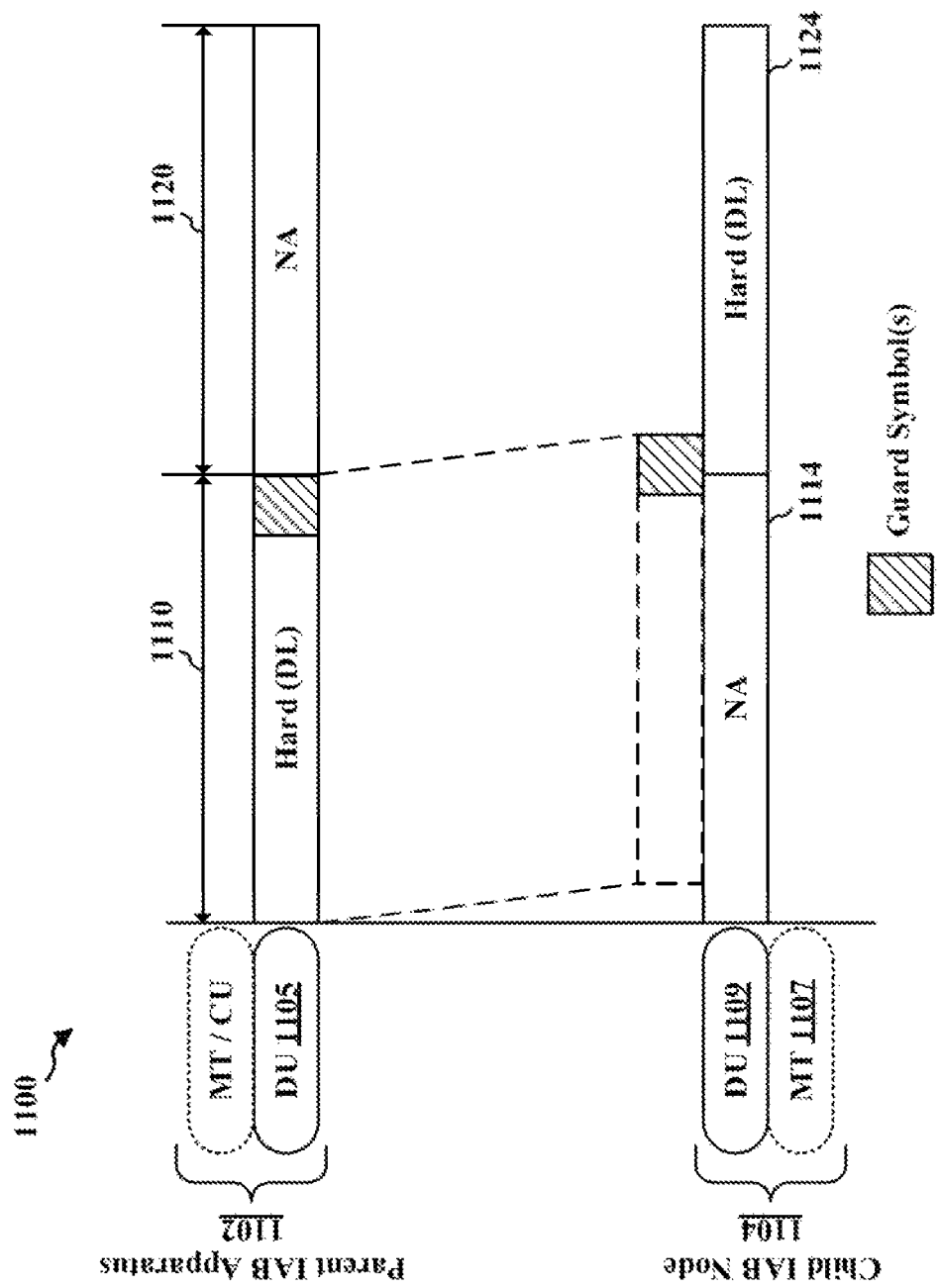
FIG. 11 is a block diagram illustrating example resource configurations for resources on which at least one of a parent IAB apparatus and/or a child IAB node 1104 may communicate, in accordance with various aspects of the present disclosure.

FIG. 11 is a block diagram illustrating example resource configurations 1100 for resources on which at least one of a parent IAB apparatus 1102 and/or a child IAB node 1104 may communicate, in accordance with various aspects of the present disclosure. The parent IAB apparatus 1102 may include a DU function that acts as a parent to an MT function of the child IAB node 1104, and is referred to as a parent DU 1105.

Correspondingly, the child IAB node 1104 may include the child MT 1107 that is configured and/or scheduled by the parent DU 1105. In addition, the child IAB node 1104 may include a DU function, which may be referred to in this context as a child DU 1109, e.g., as a complement of the child MT 1107. Separately, the parent IAB apparatus 1102 may include a respective MT function if implemented as an IAB node or a respective CU function if implemented as an IAB donor.

As described, supra, e.g., with respect to FIGS. 9, 10A, and 10B, the parent IAB apparatus 1102 may provide a guard period (e.g., guard symbols) to allow the child IAB node 1104 to transition between use of the child MT and the child DU 1109. The child IAB node 1104 may request a guard period (e.g., as described with respect to GuardSymbolsDesired) at each transition instance, which may be one of Types 1 through 8. The parent IAB apparatus 1102 may provide a guard period (e.g., as described with respect to GuardSymbolsProvided), for example, according to one of the Types 1 through 8 of transitions that the child IAB node 1104 may perform at each given transition instance.

For each transition instance, the parent IAB apparatus 1102 and the child IAB node 1104 may make the same determination regarding both when a transition instance occurs and the one of Types 1 through 8 of the transition at that instance. For example, the time and/or type of a transition instance may be negotiated between the parent IAB apparatus 1102 and the child IAB node 1104, the child IAB node 1104 may signal the time and/or type of a transition instance for acknowledgement by the parent IAB apparatus 1102, etc. Thus, the parent IAB apparatus and the child IAB node may use the same information to determine transition instances and/or transition types. Accordingly, the parent IAB apparatus 1102 may provide a suitable guard period (to the extent the parent IAB apparatus 1102 is able), and the child IAB node 1104 is able to apply the provided guard period.

A transition type may be associated with the state of the child IAB node 1104. For example, as described with respect to Types 1 through 8 as described with respect to FIG. 8, supra, a transition type may be based on a DL RX state or UL TX state of the child MT 1107 and/or an UL RX state or DL TX state of the child DU 1109. As the child MT 1107 is scheduled by the parent IAB apparatus 1102 (e.g., by the parent DU 1105), and therefore, the state of the child MT 1107 may be known by both the parent IAB apparatus 1102 and the child IAB node 1104.

The state of the child DU 1109 may be based on determinations (e.g., scheduling, allocation, configuration, etc.) by the child IAB node 1104, independently of the parent IAB apparatus 1102. As such, configurations, allocations, scheduling, and the like for resources potentially used by the child DU 1109 may not be known by the parent IAB apparatus 1102, and thus, the state of the child DU 1109 may not be known to the parent IAB apparatus 1102.

For example, during a first time period 1110, a first set of resources 1114 may be configured as hard for the parent DU 1105, and so, the parent DU 1105 may communicate with the child MT 1107, such as by transmitting downlink data to or receiving uplink data from the child MT 1107. With respect to the child DU 1109, however, the first set of resources 1114 may be configured as NA in order to prevent interference to the child MT 1109 when communicating with the parent DU 1105. That is, the child DU 1109 may be prohibited from communicating on the first set of resources 1114 during the first time period 1110.

During a second time period 1120, a second set of resources 1124 may be configured as NA for the parent DU 1105, thereby prohibiting the parent DU 1105 from communicating with the child MT 1107 on the second set of resources 1124 during the second time period 1120. The second set of resources 1124 may also be configured as hard with respect to the child DU 1109, which may allow the child DU 1109 to communicate with a child of the child IAB node 1104, such as by transmitting downlink data to or receiving uplink data from a UE or hierarchically lower child IAB node.

During the first time period 1110, the parent IAB apparatus 1102 knows that the child IAB node 1104 is utilizing the child MT 1107, e.g., because the parent DU 1105 is responsible for scheduling communication on resources by the child MT 1107. During the second time period 1120, the child IAB node 1104 utilizes the child DU 1109 to communicate (or refrain from communicating) on the second set of resources 1124.

In some instances, the child IAB node 1104 may transition from the child MT 1107 at the first time period 1110 to the child DU 1109 at the second time period 1120 when the child DU 1109 is to communicate on the second set of resources 1124. In some other instances, the child IAB node 1104 may refrain from transitioning from the child MT 1107 to the child DU 1109 at the point at which the first time period 1110 ends and the second time period 1120 begins when the child DU 1109 refrains from communicating on the second set of resources 1124.

In either instance, however, the parent IAB apparatus 1102 may be unaware of whether the child DU 1109 intends to communicate on the second set of resources 1124, e.g., as scheduling and/or configuration of resources by the child DU 1109 may be opaque to the parent IAB apparatus 1102. Therefore, the parent IAB apparatus 1102 may be unable to determine whether the child IAB node 1104 will transition between use of the child MT 1107 and the child DU 1109.

Potentially, some opacity of scheduling and/or configuration of resources by the child DU 1109 may be mitigated at the parent IAB apparatus 1102, e.g., by the child IAB node 1104 informing the parent IAB apparatus 1102 of various scheduling and/or configuration of resources by the child DU 1109. For example, the parent IAB apparatus 1102 may be informed by the child IAB node 1104 of a resource configuration (e.g., one of hard, soft, or NA, and one of DL, UL, or F) of the child DU 1109.

In some instances, the child IAB node 1104 may transmit, to the parent IAB apparatus 1102, information indicating a set of signals that the child DU 1109 may configure and/or schedule for transmission on a set of resources. Additionally or alternatively, the parent IAB apparatus 1102 may detect the set of signals on a set of resources communicated with (e.g., transmitted or received by) the child DU 1109, and the parent IAB apparatus 1102 may determine (e.g., estimate or infer) resource configuration and/or scheduling by the child DU 1109 based on detection of those signals on the set of resources.

Such signals may include one or more cell-specific signals, e.g., as such signals may be transmitted in (and specific to) a cell provided by the child IAB node 1104 and configured and/or scheduled by the child DU 1109. Cell-specific signals may include SSs, RSs, and/or pilot signals, such as at least one of SSBs, CSI-RSs, signals associated with a random access channel (RACH) including physical RACH (PRACH), SRs, and/or other similar signals. In some aspects, the parent IAB apparatus 1102 may consider, or handle, certain resources as if those certain resources were configured as hard even though those certain resources are configured as NA or soft if those certain resources carry cell-specific signals for the child DU 1109.

In some aspects, the parent IAB apparatus 1102 may determine (e.g., estimate or predict) a potential transition instance based on a resource configuration of the child DU 1109 and may apply guard symbols based on the identified potential transition instance. For example, the parent IAB apparatus 1102 may infer a potential transition instance from cell-specific signals scheduled and/or transmitted by the child DU 1109. However, as the parent IAB apparatus 1102 may be estimating and/or inferring configuration and/or scheduling of resources by the child DU 1109, the parent IAB apparatus 1102 may be unaware of the actual state of the child DU 1109 (e.g., DL TX or UL RX). In addition, while the parent IAB apparatus 1102 may be able to estimate and/or infer some configuration and/or scheduling of resources by the child DU 1109 based on some (cell-specific) signals communicated by the child DU 1109, the parent IAB apparatus 1102 may be unable to accurately determine each transition instance, e.g., including each of the Types 1 through 8 of transitions based on such estimations and/or inferences.

In some aspects, the parent IAB apparatus 1102 may determine whether to provide a guard period based on whether the configuration and/or scheduling of resources at the child DU 1109 indicates (e.g., suggests, implies, etc.) that the resources will be used with the child MT 1107 or indicates (e.g., suggests, implies, etc.) that the resources will be used by the child DU 1109. For example, the parent IAB apparatus 1102 may determine that a guard period is to be provided at a transition time when the child IAB node 1104 will transition between resources associated with use of the child MT 1107 and resources associated with the use of child DU 1109 contemporaneous with the transition time.

In some aspects, a resource may be associated with use of the child MT 1107 if the resource is configured as: (1) NA; or (2) soft, and not explicitly available for the child DU 1109—e.g., a soft resource may be configured as not explicitly available for the child DU 1109 when the soft resource is allocated for communication between the child MT 1107 and the parent IAB apparatus 1102. In some other aspects, a resource may be associated with use of the child DU 1109 if the resource is configured as: (1) hard; or (2) soft, and explicitly available for the child DU 1109—e.g., a soft resource may be configured as explicitly available for the child DU 1109 when the soft resource is not allocated for communication between the child MT 1107 and the parent IAB apparatus 1102.

In some aspects, transitions by the child IAB node 1104 between the child MT 1107 and the child DU 1109 may be associated with transitions (e.g., changes) between configurations of resources, such as transitions between resources being configured for use by the child MT 1107 and resources being configured for use by the child DU 1109. For example, a transition between resource configurations may be contemporaneous with a transition between the child MT 1107 and the child DU 1109. Each transition between resource configurations may be associated with a respective one of a plurality of different cases, such as four different cases. By way of illustration, a first case, referred to as Case 1, may include a transition between (1) resources of the child DU 1109 being configured as NA, so that the resources are not available to the child DU 1109 (e.g., the resources may be allocated for communication by the parent DU 1105 and the child MT 1107), and (2) resources being configured as hard, so that the child DU 1109 is free to configure and/or schedule on the resources. A second case, referred to as Case 2, may include a transition between (1) resources of the child DU 1109 being configured as NA, so that the resources are not available to the child DU 1109 (e.g., the resources may be allocated for communication by the parent DU 1105 and the child MT 1107), and (2) resources being configured as soft and explicitly available, so that the resources are available to the child DU 1109 (e.g., the resources are not allocated by the parent DU 1105 for the child MT 1107).

Further, a third case, referred to as Case 3, may include a transition between (1) resources of the child DU 1109 being configured as soft and not explicitly available, so that the resources are unavailable to the child DU 1109 (e.g., the resources may be allocated for communication between the parent DU 1105 for the child MT 1107), and (2) resources being configured as hard, so that the child DU 1109 may configure and/or schedule communication on the resources. Finally, a fourth case, referred to as Case 4, may include a transition between (1) resources of the child DU 1109 being configured as soft and not explicitly available, so that the child DU 1109 is prohibited from configuring and/or scheduling communication on the resources (e.g., the resources may be allocated for communication between the parent IAB apparatus 1102 and the child MT 1107), and (2) resources being configured as soft and explicitly available, so that the resources are available for configuration and scheduling by child DU 1109 (e.g., the resources are not allocated by the parent DU 1105 for the child MT 1107).

In some aspects, the parent IAB apparatus 1102 may identify potential transition instances between the child MT 1107 and the child DU 1109 by the child IAB node 1104 based on transitions between resource configurations, each of which may fall into a respective one of the abovementioned Cases 1 through 4. Thus, the parent IAB apparatus 1102 may provide guard symbols based on whether a change to a configuration of resources, e.g., at the child DU 1109, satisfies one of Cases 1 through 4. That is, the parent IAB apparatus 1102 may determine (e.g., detect) a change or transition of a resource configuration, and the parent IAB apparatus 1102 may determine which case of Cases 1 through 4 the change or transition satisfies. Based on the determined case, the parent IAB apparatus 1102 may determine a respective guard period that corresponds to that determined case, and the parent IAB apparatus 1102 may provide that respective guard period for the child IAB node 1104 to be applied contemporaneous with the transition by the child IAB node 1104.

In some other aspects, the parent IAB apparatus 1102 may determine (e.g., detect) a change or transition of a resource configuration that satisfies any of Cases 1 through 4. The parent IAB apparatus 1102 may provide a guard period for the child IAB node 1104 to be applied contemporaneous with the transition by the child IAB node 1104 that is associated with the resource configuration that satisfies any of the Cases 1 through 4. In other words, the parent IAB apparatus 1102 may provide a guard period that is common across some (or all) of the transitions between the child MT 1107 and the child DU 1109 that are associated with the resource configuration changes of Cases 1 through 4.

In some further aspects, the parent IAB apparatus 1102 may determine (e.g., detect) a change or transition of a resource configuration that satisfies one of a first subset of cases of the set of Cases 1 through 4, such as a first subset of Cases 2 through 4. The parent IAB apparatus 1102 may provide a respective (or common) guard period for the child IAB node 1104 to be applied contemporaneous with the transition by the child IAB node 1104 that is associated with the resource configuration that satisfies one of the first subset of cases of the set of Cases 1 through 4 (e.g., the resource configuration may satisfy one of a first subset of Cases 2 through 4); potentially, the parent IAB apparatus 1102 may refrain from providing a guard period for a resource configuration that does not satisfy the first subset of the set of Cases 1 through 4 (e.g., no guard period may be provided for resource configurations failing to satisfy one of Cases 2 through 4, such as resource configurations satisfying Case 1).

Illustratively, the parent IAB apparatus 1102 may determine (e.g., detect) a potential transition instance of the child IAB node 1104 based on a resource configuration that satisfies one of the subset of Cases 2 through 4, which may each include a set of resources configured as soft. The parent IAB apparatus 1102 may then provide a respective (or common) guard period for the transition instance of the child IAB node 1104 that is associated with the resource configuration satisfying a respective one of Cases 2 through 4 (e.g., a resource configuration including soft resources). Potentially, the parent IAB apparatus 1102 may refrain from determining a transition instance of the child IAB node 1104 when the resource configuration does not satisfy one of Cases 2 through 4, such as when the resource configuration satisfies Case 1.

In a similar illustration, the parent IAB apparatus 1102 may determine (e.g., detect) a potential transition instance of the child IAB node 1104 based on a resource configuration that satisfies only one of the Cases 1 through 4 (e.g., the subset of the set of Cases 1 through 4 may be a subset of one case, such as Case 1). The parent IAB apparatus 1102 may then provide a guard period for the transition instance of the child IAB node 1104 that is associated with the resource configuration satisfying Case 1. Potentially, the parent IAB apparatus 1102 may refrain from determining a transition instance of the child IAB node 1104 when the resource configuration does not satisfy Case 1, such as when the resource configuration satisfies one of Cases 2 through 4.

Figure 12:
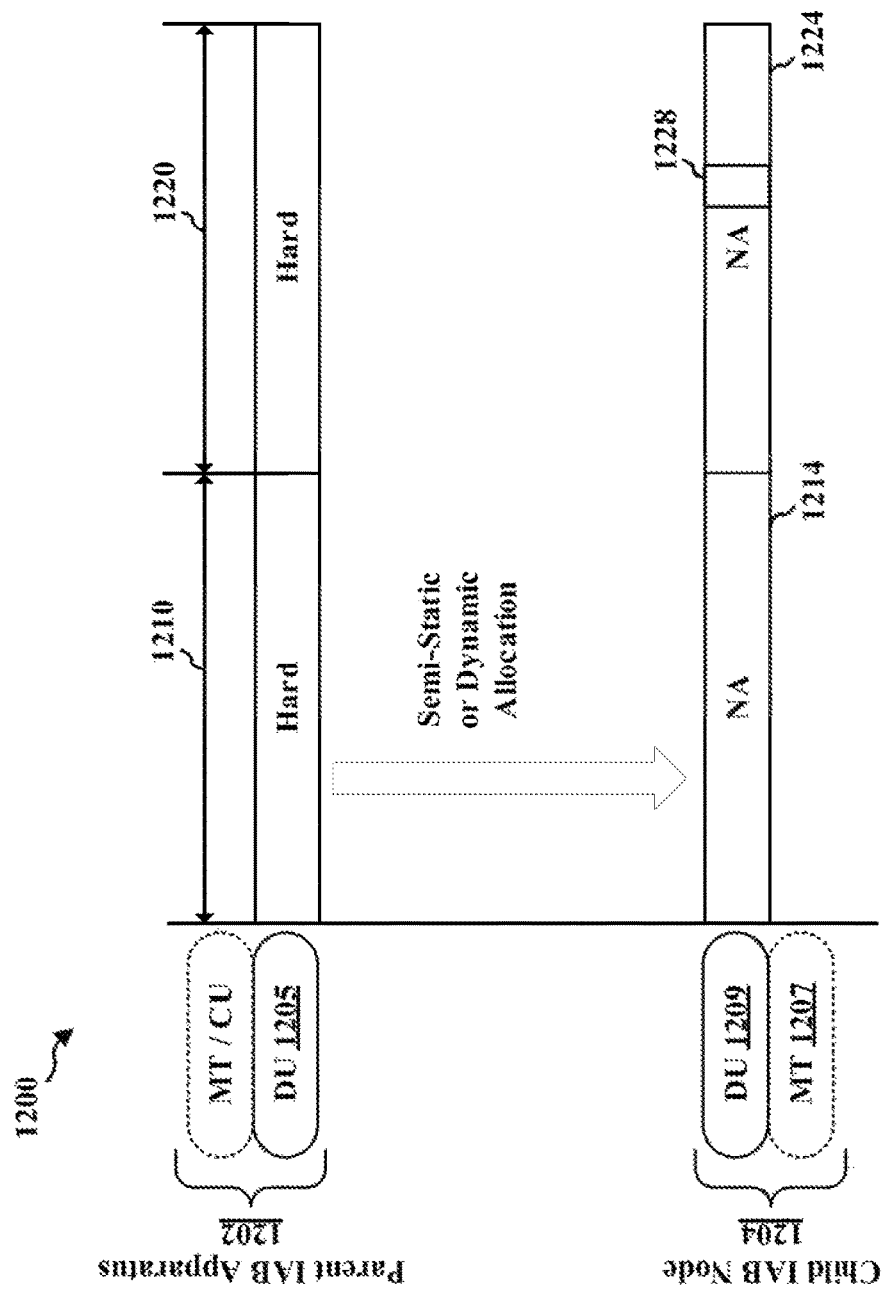
FIG. 12 is a block diagram illustrating other example resource configurations for resources on which at least one of a parent IAB apparatus and/or a child IAB node may communicate, in accordance with various aspects of the present disclosure.

Turning now to FIG. 12, a block diagram illustrates example resource configurations 1200 for resources on which at least one of a parent IAB apparatus 1202 and/or a child IAB node 1204 may communicate, in accordance with various aspects of the present disclosure. The parent IAB apparatus 1202 may include a DU function that acts as a parent to an MT function of the child IAB node 1204, and is referred to as a parent DU 1205.

Correspondingly, the child IAB node 1204 may include the child MT 1207 that is configured and/or scheduled by the parent DU 1205. In addition, the child IAB node 1204 may include a DU function, which may be referred to in this context as a child DU 1209, e.g., as a complement of the child MT 1207. Separately, the parent IAB apparatus 1202 may include a respective MT function if implemented as an IAB node or a respective CU function if implemented as an IAB donor.

The child DU 1209 may schedule and/or communicate certain signals on various resources—e.g., the child DU 1209 may transmit and/or receive certain cell-specific signals to and/or from a child of the child IAB node 1204, such as a UE and/or a hierarchically lower child IAB node. In some aspects, when a set of resources is allocated for at least one of the cell-specific signals associated with the child DU 1209, the set of resources may be considered as associated with the child DU 1209 and/or considered as hard resources with respect to the child DU 1209, even if the set of resources were otherwise configured as NA or soft.

In some aspects, the parent IAB apparatus 1202 may be informed of a resource configuration and/or allocation of the child DU 1209. For example, the child IAB node 1204 may transmit, to the parent IAB apparatus 1202, information indicating configuration and/or scheduling of cell-specific signals associated with the child DU 1209 on sets of resources. Where a set of resources is configured as NA or soft for the child DU 1209, the set of resources may nonetheless be considered as associated with the child DU 1209 if cell-specific signals associated with the child DU 1209 are scheduled and/or communicated thereon. The parent IAB apparatus 1202 may be configured to provide a guard period accordingly (e.g., according to a set of resources being considered as hard and/or associated with the child DU 1209 based on cell-specific signals, even where the set of resources had been configured as NA or soft).

Illustratively, during a first time period 1210, a first set of resources 1214 may be configured as hard with respect to the parent DU 1205, and may be configured as NA with respect to the child DU 1209. The parent DU 1205 may communicate with the child MT 1207 on the first set of resources 1214, while the first set of resources 1214 may be semi-statically or dynamically allocated for the child DU 1209 as NA. The first set of resources 1214 may be associated with the child MT 1207 because the first set of resources 1214 is configured as NA for the child DU 1209, thereby allowing the first set of resources to be allocated to communication between the child MT 1207 and the parent DU 1205.

During a second time period 1220, a second set of resources 1224 may be configured as hard for the parent DU 1205, while being configured as NA for the child DU 1209. At least one cell-specific signal may be scheduled on at least one resource 1228 of the second set of resources 1224. Thus, even though the second set of resources 1224 is configured as NA for the child DU 1209, the second set of resources 1224 may be considered to be associated with the child DU 1209 because at least one resource 1228 is allocated to a cell-specific signal for the child DU 1209.

As the first set of resources 1214 are associated with the child MT 1207 while the second set of resources are associated with the child DU 1209, the parent IAB apparatus 1202 may determine that a guard period is to be provided between the first time period 1210 and the second time period 1220. Accordingly, the parent IAB apparatus 1202 may transmit information indicating the guard period to the child IAB node 1204. The child IAB node 1204 may apply the guard period to transition from the child MT 1207 to the child DU 1209. Further, the parent IAB apparatus 1202 may apply at least a portion of the guard period to prevent the parent DU 1205 from communicating with the child MT 1207 during the guard period.

Figure 13:
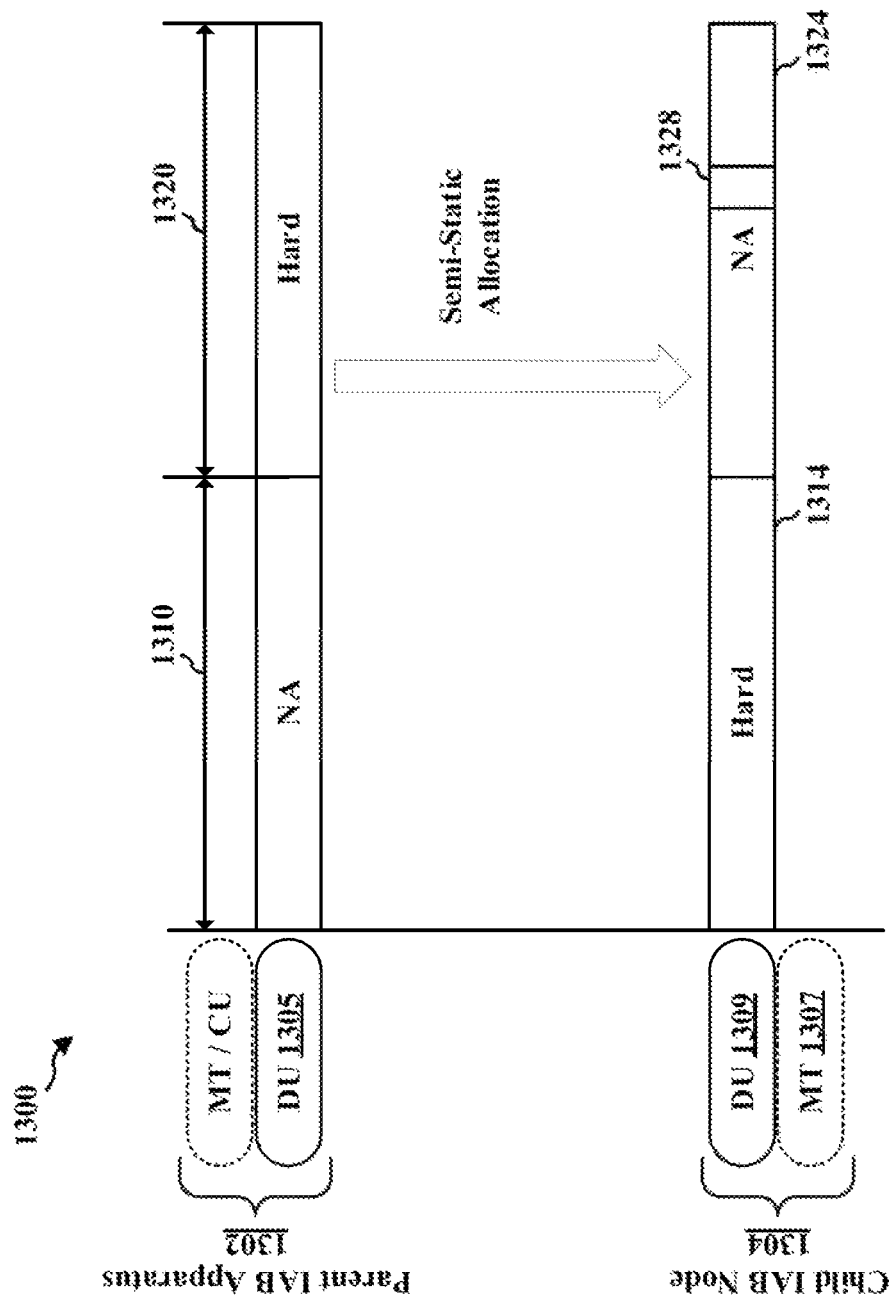
FIG. 13 a block diagram illustrating further example resource configurations for resources on which at least one of a parent IAB apparatus and/or a child IAB node may communicate, in accordance with various aspects of the present disclosure.

FIG. 13 is a block diagram illustrating example resource configurations 1300 for resources on which at least one of a parent IAB apparatus 1302 and/or a child IAB node 1304 may communicate, in accordance with various aspects of the present disclosure. The parent IAB apparatus 1302 may include a DU function that acts as a parent to an MT function of the child IAB node 1304, and is referred to as a parent DU 1305.

Correspondingly, the child IAB node 1304 may include the child MT 1307 that is configured and/or scheduled by the parent DU 1305. In addition, the child IAB node 1304 may include a DU function, which may be referred to in this context as a child DU 1309, e.g., as a complement of the child MT 1307. Separately, the parent IAB apparatus 1302 may include a respective MT function if implemented as an IAB node or a respective CU function if implemented as an IAB donor.

The child DU 1309 may schedule and/or communicate certain signals on various resources—e.g., the child DU 1309 may transmit and/or receive certain cell-specific signals to and/or from a child of the child IAB node 1304, such as a UE and/or a hierarchically lower child IAB node. In some aspects, when a set of resources is allocated for at least one of the cell-specific signals associated with the child DU 1309, the set of resources may be considered as associated with the child DU 1309 and/or considered as hard resources with respect to the child DU 1309, even if the set of resources were otherwise configured as NA or soft.

In some aspects, the parent IAB apparatus 1302 may be informed of a resource configuration and/or allocation of the child DU 1309. For example, the child IAB node 1304 may transmit, to the parent IAB apparatus 1302, information indicating configuration and/or scheduling of cell-specific signals associated with the child DU 1309 on sets of resources. Where a set of resources is configured as NA for the child DU 1309, the set of resources may nonetheless be considered as associated with the child DU 1309 if cell-specific signals associated with the child DU 1309 are scheduled and/or communicated thereon. The parent IAB apparatus 1302 may refrain from providing a guard period accordingly (e.g., according to a set of resources being considered as hard and/or associated with the child DU 1309 based on cell-specific signals, even where the set of resources had been configured as NA).

Illustratively, during a first time period 1310, a first set of resources 1314 may be configured as NA with respect to the parent DU 1305, and may be configured as hard with respect to the child DU 1309. The parent DU 1305 may refrain from communicating with the child MT 1307 on the first set of resources 1314. The first set of resources 1314 may be associated with the child DU 1309 because the first set of resources 1314 is configured as hard for the child DU 1309, thereby allowing the first set of resources to be allocated to communication by the child DU 1309.

During a second time period 1320, a second set of resources 1324 may be configured as hard for the parent DU 1305, while being configured as NA for the child DU 1309. However, at least one cell-specific signal may be scheduled on at least one resource 1328 of the second set of resources 1324, e.g., as the second set of resources 1324 may be semi-statically allocated as NA for the child DU 1309. Thus, even though the second set of resources 1324 is (semi-statically) configured as NA for the child DU 1309, the second set of resources 1324 may be considered to be associated with the child DU 1309 because at least one resource 1328 is allocated to a cell-specific signal for the child DU 1309.

As both the first set of resources 1314 and the second set of resources 1324 are associated with the child DU 1309, the parent IAB apparatus 1302 may determine that a guard period is not to be provided between the first time period 1310 and the second time period 1320 (e.g., as no transition is determined to occur at the child IAB node 1304). Accordingly, the parent IAB apparatus 1302 may refrain from providing a guard period to the child IAB node 1304 for the first set of resources 1314 of the first time period 1310 and the second set of resources 1324 of the second time period 1320.

Figure 14:
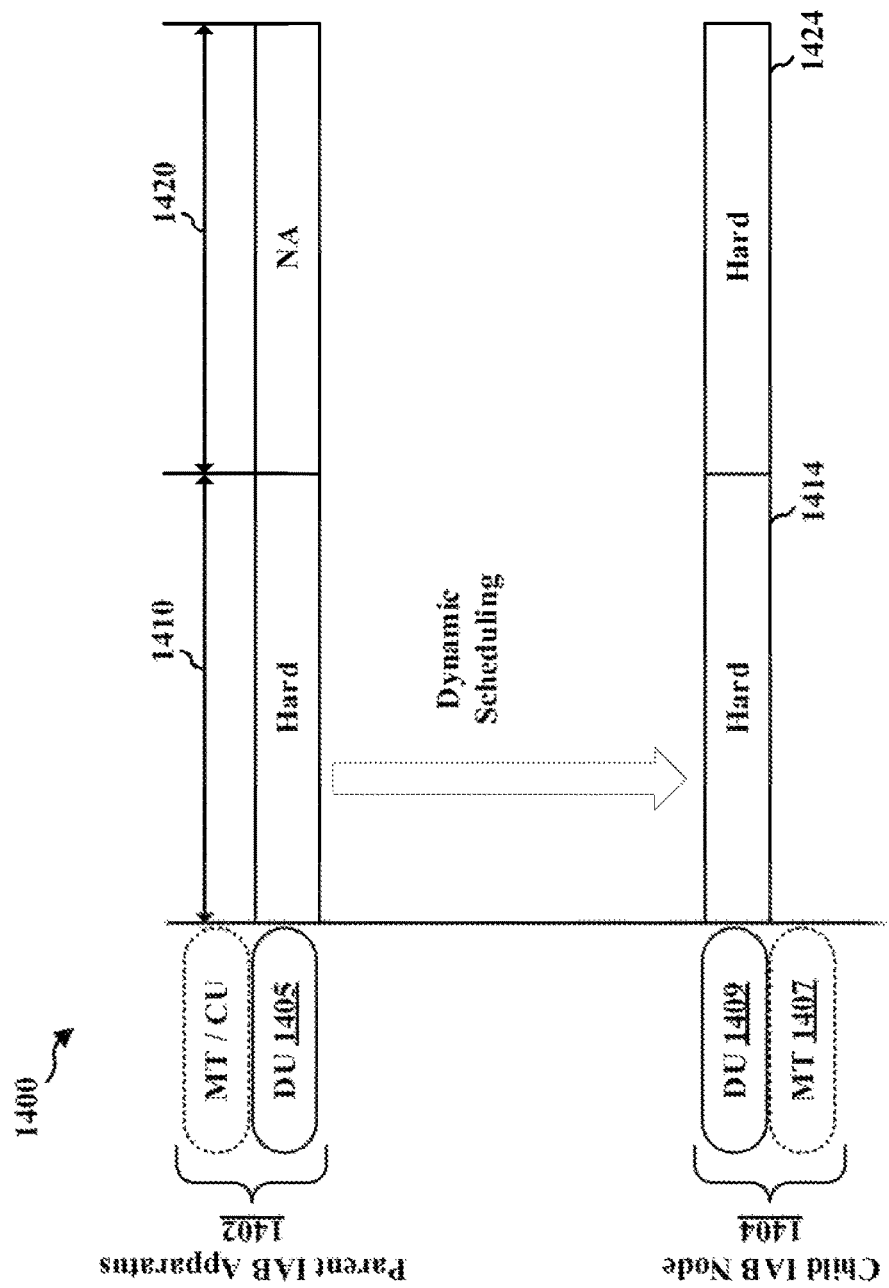
FIG. 14 is a block diagram illustrating yet other example resource configurations for resources on which at least one of a parent IAB apparatus and/or a child IAB node may communicate, in accordance with various aspects of the present disclosure.

FIG. 14 is a block diagram illustrating example resource configurations 1400 for resources on which at least one of a parent IAB apparatus 1402 and/or a child IAB node 1404 may communicate, in accordance with various aspects of the present disclosure. The parent IAB apparatus 1402 may include a DU function that acts as a parent to an MT function of the child IAB node 1404, and is referred to as a parent DU 1405.

Correspondingly, the child IAB node 1404 may include the child MT 1407 that is configured and/or scheduled by the parent DU 1405. In addition, the child IAB node 1404 may include a DU function, which may be referred to in this context as a child DU 1409, e.g., as a complement of the child MT 1407. Separately, the parent IAB apparatus 1402 may include a respective MT function if implemented as an IAB node or a respective CU function if implemented as an IAB donor.

In some aspects, the child MT 1407 may be dynamically scheduled by the parent IAB apparatus 1402 for communication with the parent DU 1405. However, conflicts may occur between resource allocations by the parent DU 1405 and the child DU 1409. For example, a set of resources may be configured as hard for both the parent DU 1405 and the child DU 1409. In some aspects in which a set of resources is configured as hard for both the parent DU 1405 and the child DU 1409, the child DU 1409 may determine whether to prioritize the child MT 1407 over the child DU 1409 or prioritize the child DU 1409 over the child MT 1407. In some other aspects in which a set of resources is configured as hard for both the parent DU 1405 and the child DU 1409, the set of resources may be associated with the child MT 1407 if there are no cell-specific signals associated with the child DU 1209 allocated on the set of resources.

Illustratively, in a first time period 1410, a first set of resources 1414 may be configured as hard for both the parent DU 1405 and the child DU 1409. The parent DU 1405 may dynamically schedule some uplink and/or downlink signaling with the child MT 1407 on the first set of resources 1414 during the first time period 1410, as the first set of resources 1414 may be configured as hard for the parent DU 1405. Even though the first set of resources 1414 may also be configured as hard for the child DU 1409, no cell-specific signals associated with the child DU 1409 may be allocated to the first set of resources 1414. Thus, the first set of resources 1414 may be considered to be associated with the child MT 1407 based on at least one of the dynamically scheduling of signaling by the parent DU 1405 for the child MT 1407 on the first set of resources 1414 and/or the absence of any cell-specific signals associated with the child DU 1409 on the first set of resources 1414.

During a second time period 1420, a second set of resources 1424 may be configured as NA for the parent DU 1405, while being configured as hard for the child DU 1409 (e.g., regardless of any cell-specific signaling associated with the child DU 1409). Therefore, the second set of resources 1424 may be considered to be associated with the child DU 1409 during the second time period 1420.

As the first set of resources 1414 during the first time period 1410 may be considered to be associated with the child MT 1407 and the second set of resources 1424 during the second time period 1420 may be considered to be associated with the child DU 1409, the child IAB node 1404 may be configured to transition from the child MT 1407 to the child DU 1409 between the first time period 1410 and the second time period 1420. Accordingly, the parent IAB apparatus 1402 may determine that a guard period is to be provided between the first time period 1410 and the second time period 1420. The parent IAB apparatus 1402 may transmit information indicating the guard period to the child IAB node 1404. The child IAB node 1404 may apply the guard period to transition from the child MT 1407 to the child DU 1409. Further, the parent IAB apparatus 1402 may apply at least a portion of the guard period to prevent the parent DU 1405 from communicating with the child MT 1407 during the guard period.

In some further aspects, the parent IAB apparatus 1402 (e.g., the parent DU 1405) may dynamically schedule some communication with the child IAB node 1404 (e.g., with the child MT 1407), such as by transmitting a dynamic scheduling grant to the child MT 1407. Potentially, the dynamic scheduling grant may conflict with the guard period—e.g., the grant may dynamically schedule some communication on a set of resources (at least partially) overlapping with a guard period.

By way of illustration, the parent IAB apparatus 1402 (e.g., the parent DU 1405) may be configured for slot-based allocation, and so may dynamically schedule communication with the child MT 1407 on a set of resources that begins on one or more of the first three or four symbols starting one slot. Potentially, the parent IAB apparatus 1402 may also provide a guard period (e.g., between zero and four guard symbols) at the start of the one slot, which includes resources associated with the child MT 1405, while the consecutively previous slot may be associated with the child DU 1409.

In one aspect in which the parent IAB apparatus 1402 provides a guard period in the one slot in which the parent IAB apparatus 1402 also dynamically schedules communication with the child MT 1407, the parent IAB apparatus 1402 may determine that the guard period to be provided should include a number of guard symbols that is less than or equal to another number of guard symbols determined by the parent IAB apparatus 1402 prior to dynamically scheduling communication with the child MT 1407. For example, the parent IAB apparatus 1402 may reduce the duration of the guard period determined to be provided to the child IAB node 1404 in response to dynamically scheduling communication in the same slot (and potentially on some or all of the same symbols) as the guard period.

In another aspect in which the parent IAB apparatus 1402 provides a guard period in the one slot in which the parent IAB apparatus 1402 also dynamically schedules communication with the child MT 1407, the parent IAB apparatus 1402 may determine that the guard period to be provided should be canceled if the guard period partially or entirely overlaps with the resources on which the parent IAB apparatus 1402 dynamically schedules communication with the child MT 1407. For example, the parent IAB apparatus 1402 may cancel the duration of the guard period determined to be provided to the child IAB node 1404 in response to dynamically scheduling communication in the same slot on some or all of the same symbols as the guard period.

In still another aspect in which the parent IAB apparatus 1402 provides a guard period in the one slot in which the parent IAB apparatus 1402 also dynamically schedules communication with the child MT 1407, the child IAB node 1404 may determine that the guard period is still to be applied in order for the child IAB node 1404 to transition, and therefore, the child IAB node 1404 may discard the dynamic scheduling grant received from the parent IAB apparatus 1402. For example, the child IAB node 1404 may discard the dynamic scheduling grant received from the parent IAB apparatus 1402 in response to determining that the dynamic scheduling grant schedules communication on some or all of the same symbols as a guard period provided by the parent IAB apparatus 1402. Therefore, the child IAB node 1404 may refrain from transmitting or receiving the communication scheduled by the grant on resources included in the provided guard period, and the child IAB node 1404 may transition between the child MT 1407 and the child DU 1409.

Figure 15:
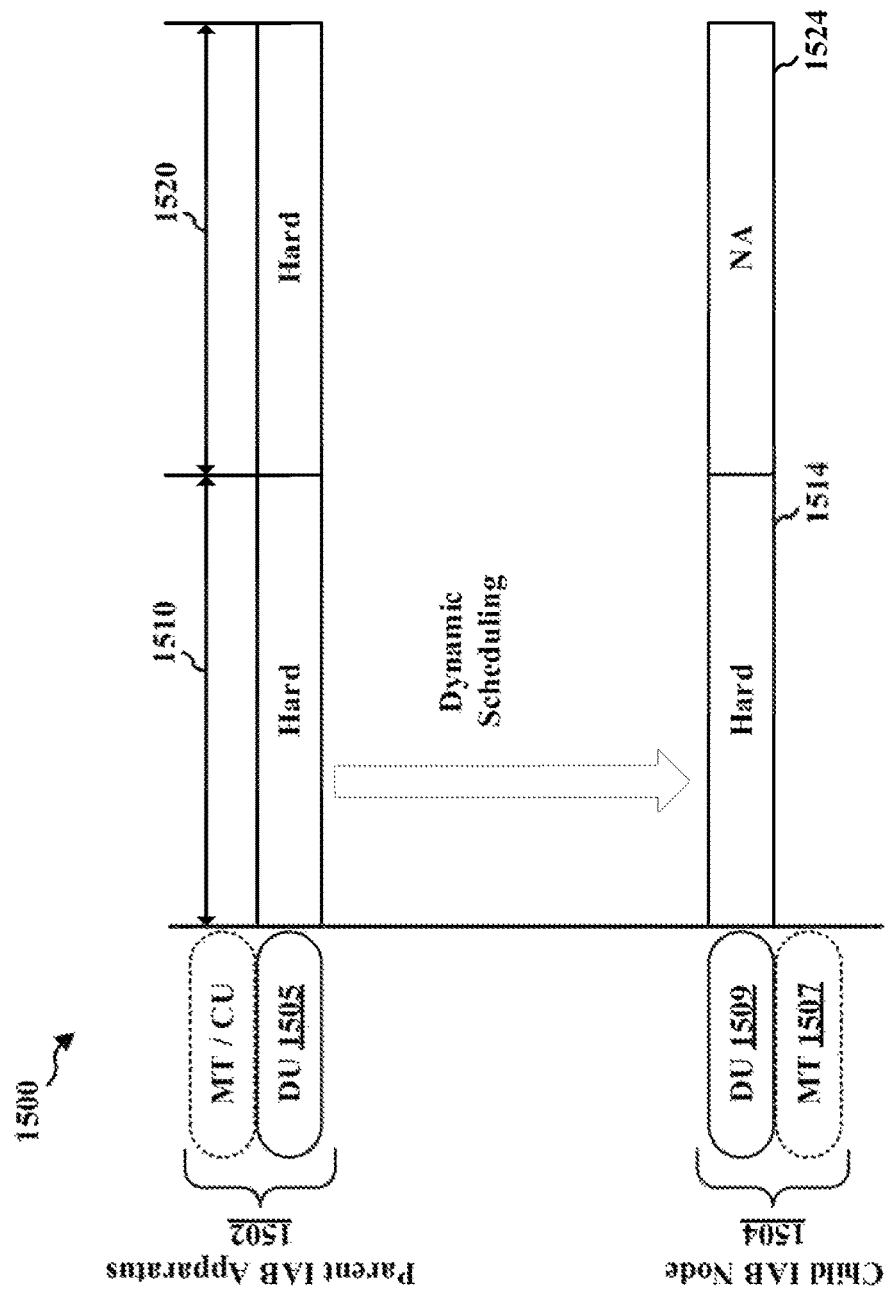
FIG. 15 is a block diagram illustrating still further example resource configurations for resources on which at least one of a parent IAB apparatus and/or a child IAB node may communicate, in accordance with various aspects of the present disclosure.

FIG. 15 is a block diagram illustrating example resource configurations 1500 for resources on which at least one of a parent IAB apparatus 1502 and/or a child IAB node 1504 may communicate, in accordance with various aspects of the present disclosure. The parent IAB apparatus 1502 may include a DU function that acts as a parent to an MT function of the child IAB node 1504, and is referred to as a parent DU 1505.

Correspondingly, the child IAB node 1504 may include the child MT 1507 that is configured and/or scheduled by the parent DU 1505. In addition, the child IAB node 1504 may include a DU function, which may be referred to in this context as a child DU 1509, e.g., as a complement of the child MT 1507. Separately, the parent IAB apparatus 1502 may include a respective MT function if implemented as an IAB node or a respective CU function if implemented as an IAB donor.

According to the illustrative resource configurations 1500, during a first time period 1510, the parent DU 1505 may dynamically schedule some communication (e.g., uplink and/or downlink communication) with the child MT 1507 on a first set of resources 1514. The parent DU 1505 may perform such dynamic scheduling because the parent IAB apparatus 1502 considers the first set of resources 1514 as hard resources with regard to the parent DU 1505.

At the same first time period 1510, the first set of resources 1514 may be configured as hard for the child DU 1509, in addition to being configured as hard for the parent DU 1505. However, the child DU 1509 may not have any cell-specific signals that are to be scheduled and/or communicated on the first set of resources 1514 during the first time period 1510. For example, despite such overlapping hard resource configurations between the parent DU 1505 and the child DU 1509, the child DU 1509 may not use the first set of resources 1514, e.g., because the child DU 1509 may not have any communication with a child UE and/or other child IAB node during the first time period 1510.

Therefore, as the parent DU 1505 dynamically schedules communication with the child MT 1507 on the first set of resources 1514 while the child DU 1509 does not communicate any cell-specific signals on the first set of resources 1514, the first set of resources may be considered to be associated with the child MT 1507.

Consecutively following the first set of resources 1514 during the first time period 1510, a second set of resources 1524 may occur during a second time period 1520. The second set of resources 1524 may be configured as hard for the parent DU 1505, allowing the parent DU 1509 to schedule communication with the child MT 1507 during the second time period 1520, e.g., even if the parent DU 1505 does not dynamically schedule communication with the child MT 1507 on the second set of resources 1524.

Contemporaneously, the second set of resources 1524 may be configured as NA for the child DU 1509. Therefore, the child DU 1509 may be prohibited from communicating and/or scheduling communication during the second time period 1520. As with the first set of resources 1514 then, the second set of resources 1524 may be considered to be associated with the child MT 1507, as the second set of resources 1524 may be available for communication with the child MT 1507 and unavailable for communication with the child DU 1509.

As both the first set of resources 1514 and the second set of resources 1524 may be considered to be associated with the child MT 1507, the child IAB node 1504 may remain in a configuration for the child MT 1507 as the first time period 1510 ends and the second time period 1520 begins. The parent IAB apparatus 1502 may determine (e.g., infer) that the child IAB node 1504 will not transition, e.g., because the parent DU 1509 dynamically schedules the child MT 1507 on the first set of resources 1514 and because the second set of resources 1524 is configured as hard for the parent DU 1505 and NA for the child DU 1509.

A guard period may be unnecessary between the first time period 1510 and the second time period 1520 because the child IAB node 1504 may refrain from transitioning by continuing to use the child MT 1507. Thus, the parent IAB apparatus 1502 may determine that a guard period is not to be provided between the first time period 1510 and the second time period 1520 (e.g., as no transition is determined to occur at the child IAB node 1504). Accordingly, the parent IAB apparatus 1502 may refrain from providing a guard period to the child IAB node 1504 for the first set of resources 1514 of the first time period 1510 and the second set of resources 1524 of the second time period 1520.

In some further aspects of the present disclosure, a parent IAB apparatus may be configured for ultra-reliable low-latency communications (URLLC) use cases. In connection with being so configured, the parent IAB apparatus may be configured to communicate traffic having data and reference signals associated with URLLC-type services with a child IAB node. In practice, the parent DU of the parent IAB apparatus may schedule such traffic for communication with the child MT of the child IAB node.

For URLLC use cases, the parent IAB apparatus may adhere to some relatively strict parameters when communicating with the child IAB node. One example of such reliability parameters for URLLC may include target parameters for a block error rate (BLER) of $10^{-9}$ to $10^{-5}$, e.g., depending upon the use case in which URLLC is implemented. One example of such latency parameters for URLLC may include transmission deadlines of 0.5 ms to 1 ms, e.g., depending upon the use case in which URLLC is implemented.

Potentially, the latency parameters for URLLC may cause the parent IAB apparatus to schedule some URLLC traffic on a set of resources that the parent IAB apparatus may also provide as a guard period to the child IAB node. When such a conflict arises, the parent IAB apparatus may be configured to cancel the guard period, or cancel provision of the guard period, in order to adhere to the URLLC transmission deadline. Thus, the parent IAB apparatus may communicate (e.g., transmit or receive) the scheduled URLLC traffic on the set of resources, as the (at least partially) simultaneous guard period is canceled, and therefore, is applied neither by the parent IAB apparatus nor the child IAB node. Correspondingly, the child IAB node may communicate (e.g., transmit or receive) the URLLC traffic scheduled by the parent IAB apparatus on the set of resources, as the guard period on that set of resources is either canceled or not provided by the parent IAB apparatus.

Figure 16:
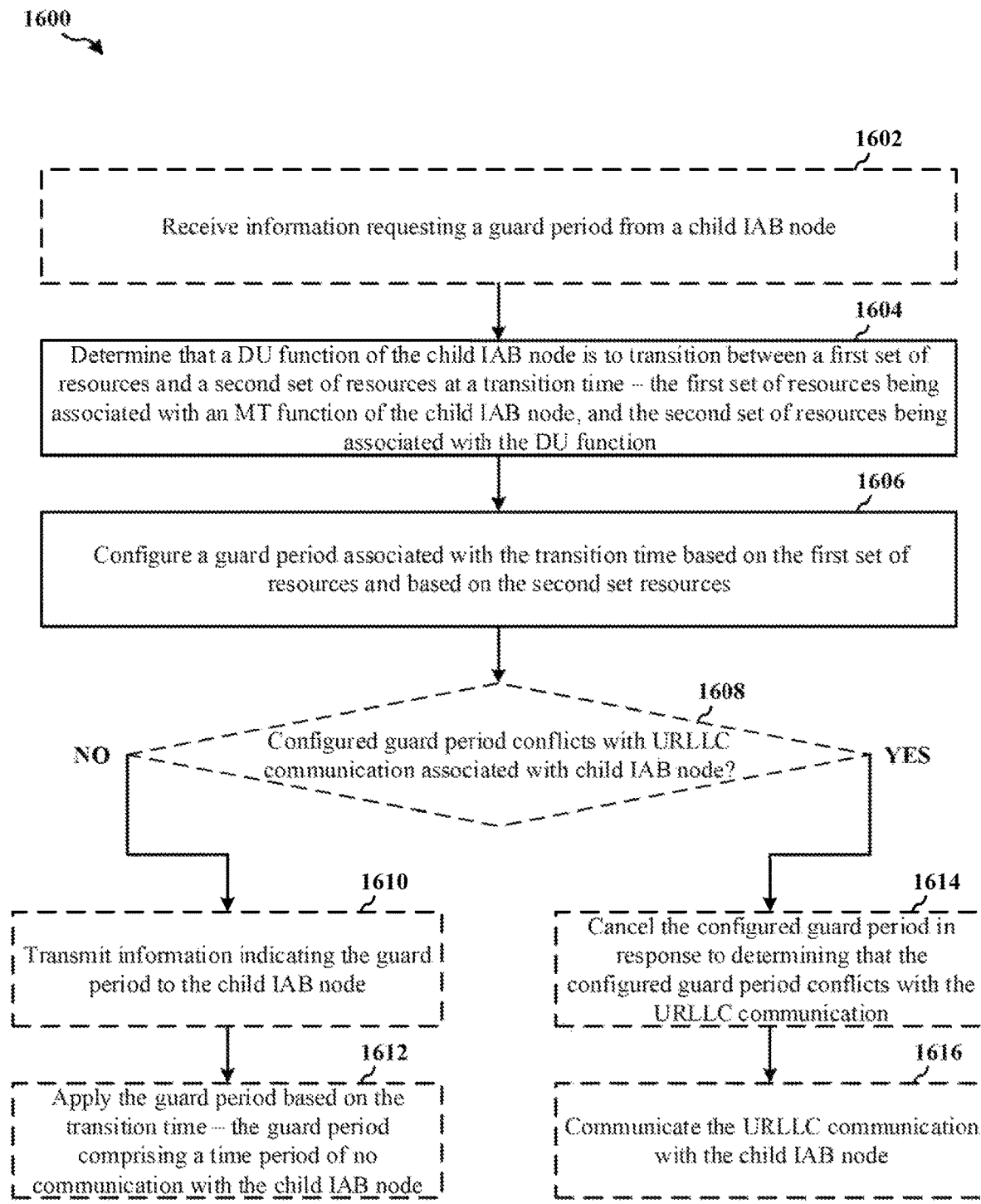
FIG. 16 is a flowchart of an example method of wireless communication by a parent IAB apparatus, in accordance with various aspects of the present disclosure.

FIG. 16 is a flowchart of a method 1600 of wireless communication by a parent IAB apparatus, in accordance with various aspects of the present disclosure. The method 1600 may be performed by a base station (e.g., a base station 102/180, 310), IAB apparatus (e.g., an IAB donor 410, 510, 610; an IAB node 420, 520a, 620; a parent IAB apparatus 702, 902, 1102, 1202, 1302, 1402, 1502), and/or apparatus (e.g., the apparatus 1802). According to various different aspects of the method 1600, one or more of the illustrated operations may be omitted, transposed, and/or contemporaneously performed.

At 1602, an IAB apparatus may receive information requesting a guard period from an IAB node. The IAB apparatus (e.g., referred to as a "parent IAB apparatus"), which may be an IAB donor or another IAB node, may be a parent of the IAB node (e.g., referred to as a "child IAB node"). For example, a DU function of the parent IAB apparatus (e.g., referred to as a "parent DU") may be a parent of an MT function of the child IAB node (e.g., referred to as a "child MT"), and the child IAB node may additionally include a DU function (e.g., referred to as a "child DU").

In some aspects, the information requesting the guard period may include information requesting guard symbols, such as a number and/or location of guard symbols. The information requesting the guard period may be received in a MAC CE or other message field or header. For example, the information requesting the guard period may be included in a field or header as GuardSymbolsDesired.

For example, referring to FIG. 9, the parent IAB apparatus 902 may receive the guard period request 910 from the child IAB node 904.

Referring to FIG. 10A, a parent IAB apparatus may receive a request for four (4) guard symbols 1030 to be applied contemporaneous with the transition time 1010. Referring to FIG. 10B, a parent IAB apparatus may receive a request for four (4) guard symbols 1080 to be applied contemporaneous with the transition time 1060.

At 1604, the parent IAB apparatus may determine that the child DU of the child IAB node is to transition between a first set of resources and a second set of resources at a transition time. The first set of resources may associated with a child MT of the child IAB node, and the second set of resources may associated with the child DU.

For example, the parent IAB apparatus may determine that the first set of resources is associated with the child MT, and the parent IAB apparatus may determine that the second set of resources is associated with the child DU. The parent IAB apparatus may determine that the first set of resources is associated with the child MT based on determining that the first set of resources is configured as one of NA or soft resources unavailable for use by the child DU, and the parent IAB apparatus may determine that the second set of resources is associated with the child DU based on determining that the second set of resources is configured as one of hard resources or soft resources available for use by the child DU. The parent IAB apparatus may then determine that the child IAB node is to transition between the child MT and the child DU based on the determining that the first set of resources is associated with the child MT and the second set of resources is associated with the child DU.

For example, referring to FIG. 9, the parent IAB apparatus 902 may determine that a child DU of the child IAB node 904 is to transition between a first set of resources and a second set of resources at a transition time. The first set of resources may associated with a child MT of the child IAB node 904, and the second set of resources may associated with the child DU.

Referring to FIG. 10A, a parent IAB apparatus may determine that a child DU of a child IAB node is to transition from a first set of resources associated with the child DU to a second set of resources associated with a child MT of the child IAB node at a transition time 1010. Referring to FIG. 10B, a parent IAB apparatus may determine that a child DU of a child IAB node is to transition from a first set of resources associated with a child MT of the child IAB node to a second set of resources associated with the child DU at a transition time 1060.

Referring to FIG. 11, the parent IAB apparatus 1102 may determine that the child DU 1109 of the child IAB node 1104 is to transition between the first set of resources 1114 associated with the child MT 1107 to the second set of resources 1124 associated with the child DU 1109 contemporaneous with the transition time between the first time period 1110 and the second time period 1120. That is, the parent IAB apparatus 1102 may determine that the child IAB node 1104 is to transition from the child MT 1107 to the child DU 1109 contemporaneous with the transition time between the first time period 1110 and the second time period 1120.

In some aspects, the first set of resources occur immediately before the transition time and the second set of resources occur immediately after the transition time. The parent IAB apparatus may determine that the child IAB node is to transition from the child MT to the child DU when the first set of resources occur immediately before the transition time and the second set of resources occur immediately after the transition time.

For example, referring to FIG. 7, the parent IAB apparatus 702 may determine that the child DU 709 of the child IAB node 704 is to transition from the first set of resources 710 associated with the child MT 707 to the second set of resources 720 associated with the child DU 709 at the first transition time 714. That is, the parent IAB apparatus 702 may determine that the child IAB node 704 is to transition from the child MT 707 to the child DU 709 at the first transition time 714.

In some other aspects, the first set of resources occur immediately after the transition time and the second set of resources occur immediately before the transition time. The parent IAB apparatus may determine that the child IAB node is to transition from the child DU to the child MT when the first set of resources occur immediately after the transition time and the second set of resources occur immediately before the transition time.

For example, referring to FIG. 7, the parent IAB apparatus 702 may determine that the child DU 709 of the child IAB node 704 is to transition from the second set of resources 720 associated with the child DU 709 to the third set of resources 730 associated with the child MT 707 at the second transition time 724. That is, the parent IAB apparatus 702 may determine that the child IAB node 704 is to transition from the child DU 709 to the child MT 707 at the second transition time 724.

In some aspects, the parent IAB apparatus may determine that the first set of resources is associated with the child MT when the parent IAB apparatus (e.g., the parent DU of the parent IAB apparatus) semi-statically or dynamically allocates the first set of resources for communication with the child MT. Additionally or alternatively, the parent IAB apparatus may determine that the second set of resources is associated with the child DU when the child DU schedules at least one cell-specific signal on the second set of resources.

Referring to FIG. 12, the parent IAB apparatus 1202 may determine that the child DU 1209 of the child IAB node 1204 is to transition from the first set of resources 1214 associated with the child MT 1207 to the second set of resources 1224 associated with the child DU 1209 contemporaneous with the transition time between the first time period 1210 and the second time period 1220 when the parent IAB apparatus 1202 (e.g., parent DU 1205) semi-statically or dynamically allocates communication with the child MT 1207 on the first set of resources 1214 and when the parent IAB apparatus 1202 determines that the child DU 1209 schedules cell-specific signaling on at least one resource 1228 of the second set of resources 1224. That is, the parent IAB apparatus 1202 may determine that the child IAB node 1204 is to transition from the child MT 1207 to the child DU 1209 contemporaneous with the transition time between the first time period 1210 and the second time period 1220 when the parent IAB apparatus 1202 (e.g., parent DU 1205) semi-statically or dynamically allocates communication with the child MT 1207 on the first set of resources 1214 and when the parent IAB apparatus 1202 determines that the child DU 1209 schedules cell-specific signaling on at least one resource 1228 of the second set of resources 1224.

Additionally or alternatively, the parent IAB apparatus may determine that the first set of resources is associated with the child MT when the child DU does not schedule at least one cell-specific signal on the first set of resources.

Further, the parent IAB apparatus may determine that the second set of resources is associated with the child DU when the second set of resources is configured as NA for the parent DU of the parent IAB apparatus, and, in some further aspects, when the second set of resources is configured as hard for the child DU of the child IAB node.

Referring to FIG. 14, the parent IAB apparatus 1402 determines that the child DU 1409 of the child IAB node 1404 is to transition from the first set of resources 1414 associated with the child MT 1407 to the second set of resources 1424 associated with the child DU 1409 contemporaneous with the transition time between the first time period 1410 and the second time period 1420 when the parent IAB apparatus 1402 (e.g., parent DU 1405) dynamically schedules signaling with the child MT 1407 on the first set of resources 1414 and when the parent IAB apparatus 1402 determines that the second set of resources 1424 are configured as NA for the parent DU 1405, and in some aspects, are further configured as hard for the child DU 1409. That is, the parent IAB apparatus 1402 may determine that the child IAB node 1404 is to transition from the child MT 1407 to the child DU 1409 contemporaneous with the transition time between the first time period 1410 and the second time period 1420 when the parent IAB apparatus 1402 (e.g., parent DU 1405) dynamically schedules with the child MT 1407 on the first set of resources 1414 and when the parent IAB apparatus 1402 determines that the second set of resources 1424 are configured as NA for the parent DU 1405, and in some aspects, are further configured as hard for the child DU 1409.

At 1606, the parent IAB apparatus configures a guard period associated with the transition time based on the first set of resources and based on the second set of resources. In some aspects, the parent IAB apparatus may configure the guard period based on the first set of resources being associated with the child MT and based on the second set of resources being associated with the child DU.

For example, referring to FIG. 9, the parent IAB apparatus 902 may perform the configuration 915 of the guard period based on the first set of resources and based on the second set of resources. The configuration 915 of the guard period may be based on the guard period request 910 received from the child IAB node 904.

For example, the parent IAB apparatus may determine that the first set of resources is associated with the child MT, and the parent IAB apparatus may determine that the second set of resources is associated with the child DU. The parent IAB apparatus may determine that the first set of resources is associated with the child MT based on determining that the first set of resources is configured as one of NA or soft resources unavailable for use by the child DU, and the parent IAB apparatus may determine that the second set of resources is associated with the child DU based on determining that the second set of resources is configured as one of hard resources or soft resources available for use by the child DU. The parent IAB apparatus may then configure the guard period based on the determining that the first set of resources is associated with the child MT and the second set of resources is associated with the child DU.

For example, the parent IAB apparatus may determine the guard period based on the last symbol of the first set of resources associated with the child MT and the first symbol of the second set of resources associated with the child DU (e.g., when the first set of resources occurs immediately before the transition time and the second set of resources occurs immediately after the transition time, as when the child IAB node is determined to transition from the child MT to the child DU).

For example, referring to FIG. 10A, a parent IAB apparatus may configure a guard period of two (2) guard symbols 1020 to be applied after the transition time 1010, e.g., on the resources associated with the child MT.

In another example, the parent IAB apparatus may determine the guard period based on the last symbol of the second set of resources associated with the child DU and the first symbol of the first set of resources associated with the child MT (e.g., when the second set of resources occurs immediately before the transition time and the first set of resources occurs immediately after the transition time, as when the child IAB node is determined to transition from the child DU to the child MT).

For example, referring to FIG. 10B, a parent IAB apparatus may configure a guard period of two (2) guard symbols 1070 to be applied before the transition time 1060, e.g., on the resources associated with the child MT.

In some aspects, the parent IAB apparatus may configure the guard period based on the information requesting the guard period received from the child IAB node. For example, the parent IAB apparatus may determine a number of guard symbols that the parent IAB apparatus is able to provide to the child IAB node, and the parent IAB apparatus may compare the determined number of guard symbols to a requested number of guard symbols received from the child IAB node. If the parent IAB apparatus determines, based on the comparison, that the determined number of guard symbols is greater than or equal to the requested number of guard symbols, then the parent IAB apparatus may configure the guard period to be equal to the requested number of guard symbols. If, however, the parent IAB apparatus determines, based on the comparison, that the determined number of guard symbols is less than the requested number of guard symbols, then the parent IAB apparatus may configure the guard period to be equal to the determined number of guard symbols.

At 1608, the parent IAB apparatus may determine whether the configured guard period conflicts with URLLC communication associated with the child IAB node. According to various aspects, the parent IAB apparatus may compare the configured guard period with a schedule for URLLC communication with the child IAB node. Based on such a comparison, the parent IAB apparatus may determine whether the configured guard period overlaps with the scheduled URLLC communication with the child IAB node. For example, the parent IAB apparatus may determine whether at least one guard symbol of the configured guard period overlaps with at least one symbol scheduled to carry at least a portion of URLLC communication associated with the child IAB node.

For example, referring to FIG. 9, the parent IAB apparatus 902 may determine whether the configuration 915 of the guard period conflicts with URLLC communication associated with the child IAB node 904. Referring to FIG. 10A, a parent IAB apparatus may determine whether a configured guard period of two (2) guard symbols 1020 to be applied after the transition time 1010, e.g., on the resources associated with the child MT, conflicts with URLLC communication associated with a child IAB node. Referring to FIG. 10B, a parent IAB apparatus may determine whether a configured guard period of two (2) guard symbols 1020 to be applied after the transition time 1060, e.g., on the resources associated with the child MT, conflicts with URLLC communication associated with a child IAB node.

The parent IAB apparatus may then determine that the configured guard period conflicts with the URLLC communication associated with the child IAB node if the parent IAB apparatus determines that the configured guard period at least partially overlaps with the scheduled URLLC communication with the child IAB node. For example, the parent IAB apparatus may determine that the configured guard period conflicts with URLLC communication associated with the child IAB node if the parent IAB apparatus determines that at least one guard symbol of the configured guard period overlaps with at least one symbol scheduled to carry at least a portion of URLLC communication associated with the child IAB node.

However, the parent IAB apparatus may determine that the configured guard period does not conflict with the URLLC communication associated with the child IAB node if the parent IAB apparatus determines that the configured guard period does not at least partially overlap with the scheduled URLLC communication with the child IAB node. For example, the parent IAB apparatus may determine that the configured guard period does not conflict with URLLC communication associated with the child IAB node if the parent IAB apparatus determines that no guard symbols of the configured guard period overlap with any symbols scheduled to carry at least a portion of URLLC communication associated with the child IAB node.

If, at 1608, the parent IAB apparatus determines that the configured guard period does not conflict with URLLC communication associated with the child IAB node, then as shown at 1610 and 1612:

At 1610, the parent IAB apparatus may transmit information indicating the guard period to the child IAB node. In some aspects, the information indicating the guard period may include information providing guard symbols, such as a number and/or location of guard symbols provided by the parent IAB apparatus to the child IAB node. The information indicating the guard period may be provided (e.g., transmitted) in a MAC CE or other message field or header. For example, the information indicating the guard period may be included in a field or header as GuardSymbolsProvided.

For example, referring to FIG. 9, the parent IAB apparatus 902 may transmit the guard period provision 920 to the child IAB node 904. The guard period provision 920 may be based on the configuration 915 of the guard period. Referring to FIG. 10A, a parent IAB apparatus may transmit information providing a configuration of a guard period of two (2) guard symbols 1020 to be applied after the transition time 1010, e.g., on the resources associated with the child MT. Referring to FIG. 10B, a parent IAB apparatus may transmit information providing a configuration of a guard period of two (2) guard symbols 1070 to be applied before the transition time 1060, e.g., on the resources associated with the child MT.

At 1612, the parent IAB apparatus may apply the guard period based on the transition time. The guard period may include a time period of no communication with the child IAB node that at least one of partially overlaps with the transition time, occurs immediately before the transition time, and/or occurs immediately after the transition time. For example, the guard period may include a set of symbols during which time the parent DU of the parent IAB apparatus refrains some scheduling communication with the child MT of the child IAB node.

Accordingly, the parent IAB apparatus may apply the guard period based on the transition time by, first, determining that the configured guard period conflicts with (uplink and/or downlink) communication to be scheduled with the child IAB node contemporaneous with (e.g., overlapping with, occurring immediately before, and/or occurring immediately after) the time at which the child IAB node is to transition between the child MT and the child DU, and second, canceling and/or refraining from scheduling any communication to be scheduled with the child IAB node contemporaneous with that transition time. For example, the parent IAB apparatus may apply the guard period based on the transition time by determining that parent DU is to schedule (uplink and/or downlink) communication with the child MT on a set of symbols that is contemporaneous with a set of guard symbols to be applied based on the transition time, and the parent DU may cancel or refrain from scheduling that communication with the child MT on that set of symbols that is contemporaneous with the set of guard symbols to be applied based on the transition time.

For example, referring to FIG. 9, the parent IAB apparatus 902 may perform application 930 of the configured guard period based on the transition time, which may be indicated by the child IAB node 904 to the parent IAB apparatus 902 in the guard period request 910. The application 930 of the configured guard period may be based on the configuration 915 of the guard period.

Referring to FIG. 10A, a parent DU of a parent IAB apparatus may apply a guard period of two (2) guard symbols 1020 after the transition time 1010, e.g., so that the parent DU refrains from communicating with a child MT of a child IAB node on the four (4) guard symbols 1030 to be applied at the transition time 1010. As the other two (2) guard symbols of the four (4) guard symbols 1030 occurring immediately before the transition time 1010 are already associated with a child DU of the child IAB node, the parent IAB apparatus (e.g., the parent DU) may already be refraining from communicating with the child IAB node (e.g., with the child MT).

Referring to FIG. 10B, a parent DU of a parent IAB apparatus may apply a guard period of two (2) guard symbols 1070 before the transition time 1060, e.g., so that the parent DU refrains from communicating with a child MT of a child IAB node on the four (4) guard symbols 1080 to be applied at the transition time 1060. As the other two (2) guard symbols of the four (4) guard symbols 1080 occurring immediately after the transition time 1060 are already associated with a child DU of the child IAB node, the parent IAB apparatus (e.g., the parent DU) may already be refraining from communicating with the child IAB node (e.g., with the child MT).

If, at 1608, the parent IAB apparatus determines that the configured guard period conflicts with URLLC communication associated with the child IAB node, then as shown at 1614 and 1616:

At 1614, the parent IAB apparatus may cancel the configured guard period in response to determining that the configured guard period conflicts with the URLLC communication. URLLC use cases may expect certain reliability and latency parameters to be enforced, and application of a guard period may cause such parameters to be violated. Accordingly, the parent IAB apparatus may determine that URLLC communication associated with the child IAB node is to be prioritized over a guard period for the child IAB node to transition between the child MT and the child DU. Therefore, the parent IAB apparatus may determine that a guard period should be canceled when the parent IAB apparatus determines that a guard period conflicts with URLLC communication.

In some aspects, the parent IAB apparatus may determine that a guard period requested by the child IAB node conflicts with scheduling of URLLC communication to be transmitted to or received from the child IAB node. In response to such a determination, the parent IAB apparatus may refrain from providing a guard period to the child IAB node, such as by refraining to transmit information indicating a guard period to the child IAB node or by transmitting information indicating a zero or null guard period to the child IAB node.

For example, referring to FIG. 9, the parent IAB apparatus 902 may cancel configuration 915 of the guard period or may perform configuration 915 of the guard period to be zero or null in response to determining that the configured guard period conflicts with the URLLC communication associated with the child IAB node 904. In some aspects, the parent IAB apparatus 902 may refrain from transmitting a guard period provision 920 to the child IAB node 904 or may transmit a guard period provision 920 indicating a zero or null guard period to the child IAB node 904 when the parent IAB apparatus cancels configuration 915 of the guard period or performs configuration 915 of the guard period to be zero or null.

Referring to FIG. 10A, a parent DU of a parent IAB apparatus may cancel the guard period of two (2) guard symbols 1020 after the transition time 1010, e.g., so that the parent DU is able to transmit or receive URLLC communication with a child MT of a child IAB node on at least two (2) guard symbols 1020 after the transition time 1010 of the four (4) guard symbols 1030 to be applied.

Referring to FIG. 10B, a parent DU of a parent IAB apparatus may cancel the guard period of two (2) guard symbols 1070 before the transition time 1060, e.g., so that the parent DU is able to transmit or receive URLLC communication with a child MT of a child IAB node on at least two (2) guard symbols 1070 of the four (4) guard symbols 1080 to be applied.

In some other aspects, the parent IAB apparatus may determine that a guard period configured by the parent IAB apparatus for the child IAB node conflicts with scheduling of URLLC communication to be transmitted to or received from the child IAB node. In response to such a determination, the parent IAB apparatus may transmit information canceling the guard period to the child IAB node and/or by transmitting, to the child IAB node, information indicating a guard period is reconfigured to a zero or null guard period.

For example, referring to FIG. 9, the parent IAB apparatus 902 may cancel application 930 of the configured guard period, which may be indicated by the child IAB node 904 to the parent IAB apparatus 902 in the guard period request 910, in response to determining that the configured guard period conflicts with the URLLC communication associated with the child IAB node 904. In some aspects, cancellation of the application 930 of the configured guard period may include transmitting other information (e.g., in addition or alternative to the guard period provision 920) to the child IAB node 904 that indicates that the child IAB node 904 is to cancel application 925 of at least a portion of the guard period contemporaneous with the transition time. For example, the parent IAB apparatus 902 may transmit information indicating that the child IAB node 904 is to cancel application 925 of the guard period on symbols that are associated with the child MT of the child IAB node 904, e.g., so that the parent DU of the parent IAB apparatus 902 may transmit or receive URLLC communication with the child MT on those symbols otherwise configured for the guard period.

At 1616, the parent IAB apparatus may communicate the URLLC communication with the child IAB node. In some aspects, the parent IAB apparatus may schedule the URLLC communication with the child IAB node on at least some of the symbols otherwise included in the canceled guard period. The parent IAB apparatus may then transmit and/or receive the URLLC communication to and/or from, respectively, the child IAB node based on the scheduling of the URLLC communication.

For example, referring to FIG. 9, the parent IAB apparatus 902 may transmit and/or receive URLLC communication to and/or from, respectively, the child IAB node 904 when the parent IAB apparatus cancels application 925 of the guard period by the child IAB node 904 and cancels application 930 of the guard period by the parent IAB apparatus 902.

Referring to FIG. 10A, a parent DU of a parent IAB apparatus may transmit and/or receive URLLC communication to and/or from, respectively, a child MT of a child IAB node on at least one of the guard period of two (2) guard symbols 1020 after the transition time 1010, e.g., so that the parent DU is able to communicate the URLLC communication with the child MT on at least two (2) guard symbols 1020 of the four (4) guard symbols 1030 to be applied.

Referring to FIG. 10B, a parent DU of a parent IAB apparatus may transmit and/or receive URLLC communication to and/or from, respectively, a child MT of a child IAB node on at least one of two (2) guard symbols 1070 before the transition time 1060, e.g., so that the parent DU is able to communicate URLLC communication with the child MT on at least two (2) guard symbols 1070 of the four (4) guard symbols 1080 to be applied.

Figure 17:
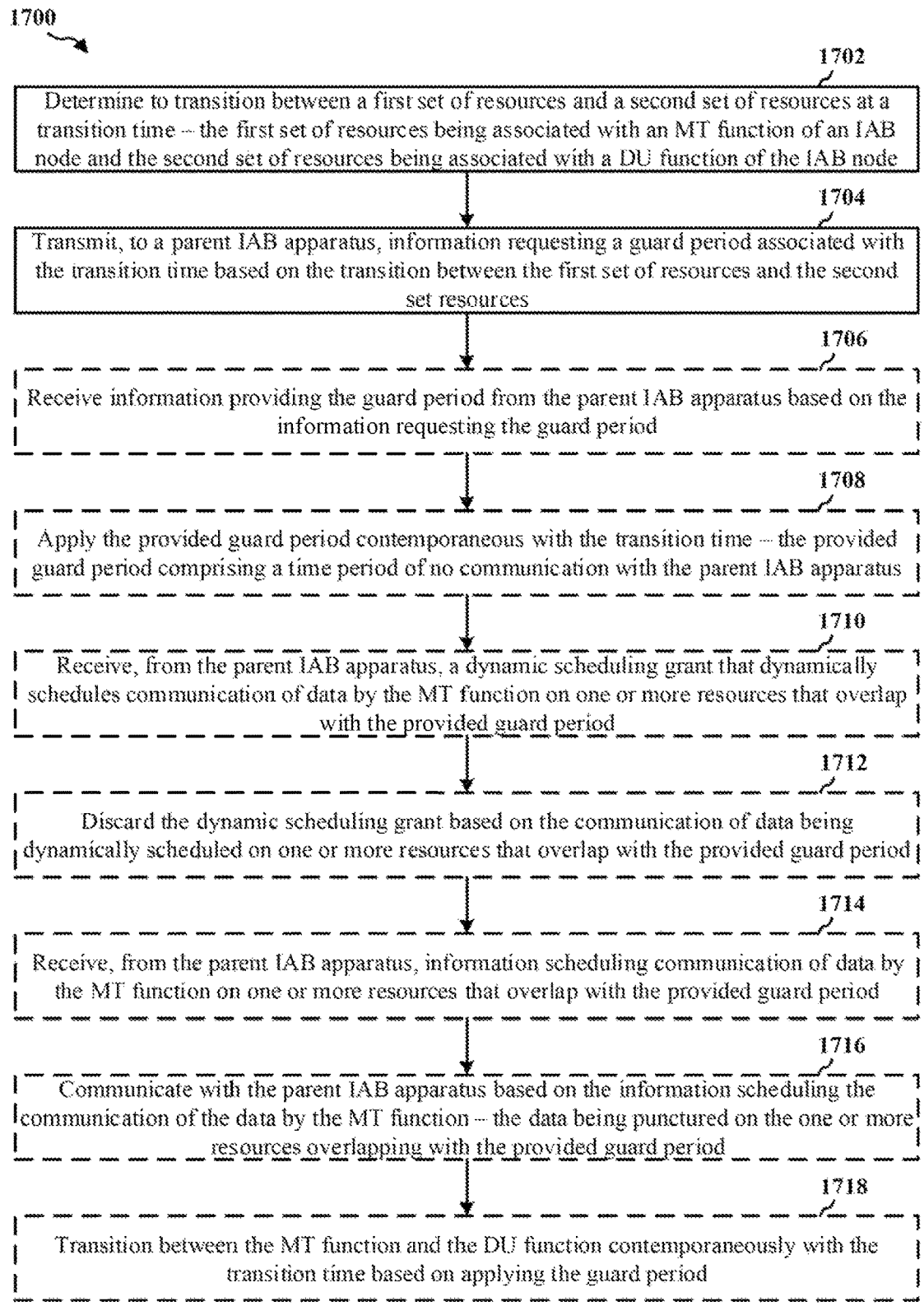
FIG. 17 is a flowchart of an example method of wireless communication by a child IAB node, in accordance with various aspects of the present disclosure.

FIG. 17 is a flowchart of a method 1700 of wireless communication by a child IAB node, in accordance with various aspects of the present disclosure. The method 1700 may be performed by a base station (e.g., a base station 102/180', 310), IAB node (e.g., an IAB node 420, 520a, 520b, 620; a child IAB node 630, 704, 904, 1104, 1204, 1304, 1404, 1504), and/or apparatus (e.g., the apparatus 1902). According to various different aspects of the method 1700, one or more of the illustrated operations may be omitted, transposed, and/or contemporaneously performed.

At 1702, an IAB node determines to transition between a first set of resources and a second set of resources at a transition time. The first set of resources may be associated with an MT function of the IAB node (e.g., referred to as a "child MT"), and the second set of resources may be associated with a DU function of the IAB node (e.g., referred to as a "child DU"). The IAB node may be a child of an IAB apparatus (e.g., referred to as a "parent IAB apparatus"), which may be an IAB donor or another IAB node. For example, the child MT may be a child of a DU function of the parent IAB apparatus (e.g., referred to as a "parent DU").

For example, the child IAB node may determine that the first set of resources is associated with the child MT, and the child IAB node may determine that the second set of resources is associated with the child DU. The child IAB node may determine that the first set of resources is associated with the child MT based on determining that the first set of resources is configured as one of NA or soft resources unavailable for use by the child DU, and the child IAB node may determine that the second set of resources is associated with the child DU based on determining that the second set of resources is configured as one of hard resources or soft resources available for use by the child DU. The child IAB node may then determine that the child IAB node is to transition between the child MT and the child DU based on the determining that the first set of resources is associated with the child MT and the second set of resources is associated with the child DU.

For example, referring to FIG. 9, the child IAB node 904 may determine to transition between a first set of resources and a second set of resources at a transition time. The first set of resources may associated with the child MT of the child IAB node 904, and the second set of resources may associated with the child DU of the child IAB node 904.

Referring to FIG. 10A, a child IAB node may determine to transition from a first set of resources associated with a child DU of the child IAB node to a second set of resources associated with a child MT of the child IAB node at a transition time 1010. Referring to FIG. 10B, a child IAB node may determine to transition from a first set of resources associated with a child MT of the child IAB node to a second set of resources associated with a child DU of the child IAB node at a transition time 1060.

Referring to FIG. 11, the child IAB node 1104 may determine to transition between the first set of resources 1114 associated with the child MT 1107 to the second set of resources 1124 associated with the child DU 1109 contemporaneous with the transition time between the first time period 1110 and the second time period 1120. That is, the child IAB node 1104 may determine that the child IAB node 1104 is to transition from the child MT 1107 to the child DU 1109 contemporaneous with the transition time between the first time period 1110 and the second time period 1120.

In some aspects, the first set of resources occur immediately before the transition time and the second set of resources occur immediately after the transition time. The child IAB node may determine to transition from the child MT to the child DU when the first set of resources occur immediately before the transition time and the second set of resources occur immediately after the transition time.

For example, referring to FIG. 7, the child IAB node 704 may determine to transition from the first set of resources 710 associated with the child MT 707 to the second set of resources 720 associated with the child DU 709 at the first transition time 714. That is, the child IAB node 704 may determine to transition from the child MT 707 to the child DU 709 at the first transition time 714.

In some other aspects, the first set of resources occur immediately after the transition time and the second set of resources occur immediately before the transition time. The child IAB node may determine to transition from the child DU to the child MT when the first set of resources occur immediately after the transition time and the second set of resources occur immediately before the transition time.

For example, referring to FIG. 7, the child IAB node 704 may determine to transition from the second set of resources 720 associated with the child DU 709 to the third set of resources 730 associated with the child MT 707 at the second transition time 724. That is, the child IAB node 704 may determine to transition from the child DU 709 to the child MT 707 at the second transition time 724.

In some aspects, the child IAB node may determine that the first set of resources is associated with the child MT when the parent IAB apparatus (e.g., the parent DU of the parent IAB apparatus) semi-statically or dynamically allocates the first set of resources for communication with the child MT. Additionally or alternatively, the child IAB node may determine that the second set of resources is associated with the child DU when the child DU schedules at least one cell-specific signal on the second set of resources.

Referring to FIG. 12, the child IAB node 1204 may determine to transition from the first set of resources 1214 associated with the child MT 1207 to the second set of resources 1224 associated with the child DU 1209 contemporaneous with the transition time between the first time period 1210 and the second time period 1220 when the parent IAB apparatus 1202 (e.g., parent DU 1205) semi-statically or dynamically allocates communication with the child MT 1207 on the first set of resources 1214 and when the child DU 1209 schedules cell-specific signaling on at least one resource 1228 of the second set of resources 1224. That is, the child IAB node 1204 may determine to transition from the child MT 1207 to the child DU 1209 contemporaneous with the transition time between the first time period 1210 and the second time period 1220 when the parent IAB apparatus 1202 (e.g., parent DU 1205) semi-statically or dynamically allocates communication with the child MT 1207 on the first set of resources 1214 and the child DU 1209 schedules cell-specific signaling on at least one resource 1228 of the second set of resources 1224.

Additionally or alternatively, the child IAB node may determine that the first set of resources is associated with the child MT when the child DU does not schedule at least one cell-specific signal on the first set of resources. Further, the child IAB node may determine that the second set of resources is associated with the child DU when the second set of resources is configured as hard for the child DU of the child IAB node.

Referring to FIG. 14, the child IAB node 1404 may determine to transition between the first set of resources 1414 associated with the child MT 1407 to the second set of resources 1424 associated with the child DU 1409 contemporaneous with the transition time between the first time period 1410 and the second time period 1420 when the parent IAB apparatus 1402 (e.g., parent DU 1405) dynamically schedules signaling with the child MT 1407 on the first set of resources 1414 and, in some aspects, when the child IAB node 1404 determines that the second set of resources 1424 is configured as hard for the child DU 1409. That is, the child IAB node 1404 may determine to transition from the child MT 1407 to the child DU 1409 contemporaneous with the transition time between the first time period 1410 and the second time period 1420 when the parent IAB apparatus 1402 (e.g., parent DU 1405) dynamically schedules with the child MT 1407 on the first set of resources 1414, and in some aspects, when the child IAB node 1404 determines that the second set of resources 1424 are configured as hard for the child DU 1409.

At 1704, the child IAB node transmits, to the parent IAB apparatus, information requesting a guard period associated with the transition time based on the transition between the first set of resources and the second set of resources. In some aspects, the information requesting the guard period may include information requesting guard symbols, such as a number and/or location of guard symbols. The information requesting the guard period may be transmitted in a MAC CE or other message field or header. For example, the information requesting the guard period may be included in a field or header as GuardSymbolsDesired.

For example, referring to FIG. 9, the child IAB node 904 may make a determination 905 of a guard period to request from the parent IAB apparatus 902. The child IAB node 904 may then transmit the guard period request 910 to the parent IAB apparatus 902.

Referring to FIG. 10A, a child IAB node may transmit, to a parent IAB apparatus, a request for four (4) guard symbols 1030 to be applied contemporaneous with the transition time 1010. Referring to FIG. 10B, a child IAB node may transmit, to a parent IAB apparatus, a request for four (4) guard symbols 1080 to be applied contemporaneous with the transition time 1060.

At 1706, the child IAB node may receive information providing the guard period associated with the transition time from the parent IAB apparatus based on the information requesting the guard period. In some aspects, the information providing the guard period may include information providing guard symbols, such as a number and/or location of guard symbols provided by the parent IAB apparatus to the child IAB node. The information providing the guard period may be provided (e.g., received) in a MAC CE or other message field or header. For example, the information providing the guard period may be included in a field or header as GuardSymbolsProvided.

For example, referring to FIG. 9, the child IAB node 904 may receive the guard period provision 920 from the parent IAB apparatus 902. The guard period provision 920 may be based on the guard period request 910. Referring to FIG. 10A, a child IAB node may receive, from a parent IAB apparatus, information providing a configuration of a guard period of two (2) guard symbols 1020 to be applied after the transition time 1010, e.g., on the resources associated with a child MT of the child IAB node. Referring to FIG. 10B, a child IAB node may receive, from a parent IAB apparatus, information providing a configuration of a guard period of two (2) guard symbols 1070 to be applied before the transition time 1060, e.g., on the resources associated with a child MT of the child IAB node.

At 1708, the child IAB node may apply the provided guard period contemporaneous with the transition time. That is, the child IAB node may apply the provided guard period at a time that at least one of overlaps with, occurs before, and/or occurs after the transition time at which the child IAB node transitions between the first set of resources associated with the child MT and the second set of resources associated with the child DU.

According to various aspects, the provided guard period may include a time period of no communication with the parent IAB apparatus. For example, the child IAB node (e.g., the child MT) may determine that communication is scheduled with the parent IAB apparatus (e.g., the parent DU) on one or more symbols at least partially overlapping with the provided guard period, and the child IAB node may cancel communication with the parent IAB apparatus on those one or more symbols at least partially overlapping with the provided guard period. In another example, the child IAB node (e.g., the child MT) may determine that no communication is scheduled with the parent IAB apparatus (e.g., the parent DU) on the provided guard period, and the child IAB node may not communicate with the parent IAB apparatus on the provided guard period as no communication is scheduled. In other words, the child IAB node may refrain from communicating with the parent IAB node during the provided guard period. In some aspects, the child IAB node (e.g., the child DU) may also refrain from communicating and/or scheduling communication with any child entities (e.g., UEs and/or other IAB nodes) during the guard period contemporaneous with the transition between the first and second sets of resources (e.g., contemporaneous with the transition between the child MT and the child DU).

For example, referring to FIG. 9, the child IAB node 904 may perform application 925 of the configured guard period based on the received guard period provision 920.

Referring to FIG. 10A, a child MT of a child IAB node may apply a guard period of two (2) guard symbols 1020 after the transition time 1010 and a child DU of the child IAB node may apply a guard period of two (2) guard symbols before the transition time 1010, e.g., so that the child IAB node refrains from communicating on the four (4) guard symbols 1030 to be applied at the transition time 1010.

Referring to FIG. 10B, a child MT of a child IAB node may apply a guard period of two (2) guard symbols 1070 before the transition time 1060 and a child DU of the child IAB node may apply a guard period of two (2) guard symbols after the transition time, e.g., so that the child IAB node refrains from communicating on the four (4) guard symbols 1080 to be applied at the transition time 1060.

At 1710, the child IAB node may receive, from the parent IAB apparatus, a dynamic scheduling grant that dynamically schedules communication of data by the child MT on one or more resources that overlap with the provided guard period.

For example, referring to FIG. 9, the child IAB node 904 may receive, from the parent IAB apparatus 902, a dynamic scheduling grant that dynamically schedules communication of data by the child MT on one or more resources that overlap with the received guard period provision 920.

Referring to FIG. 10A, a child MT of a child IAB node may receive, from a parent IAB apparatus, a dynamic scheduling grant that dynamically schedules communication of data by the child MT on one or more resources that overlap with a guard period of two (2) guard symbols 1020 after the transition time 1010.

Referring to FIG. 10B, a child MT of a child IAB node may receive, from a parent IAB apparatus, a dynamic scheduling grant that dynamically schedules communication of data by the child MT on one or more resources that overlap with a guard period of two (2) guard symbols 1070 before the transition time 1060.

At 1712, the child IAB node may discard the dynamic scheduling grant based on the communication of data being dynamically scheduled on one or more resources that overlap with the provided guard period. For example, first, the child IAB node may determine that the dynamic scheduling grant schedules communication on one or more resources (e.g., symbols) that overlap with the guard period (e.g., one or more guard symbols), and second, the child IAB node may refrain from applying the dynamic scheduling grant based on the determination and the dynamic scheduling grant at least partially overlaps with the guard period. That is, the child IAB node may ignore the dynamic scheduling grant, and the child IAB node may not communicate based on the dynamic scheduling grant.

For example, referring to FIG. 9, the child IAB node 904 may discard a dynamic scheduling grant, received from the parent IAB apparatus 902, that dynamically schedules communication of data by the child MT on one or more resources that overlap with the received guard period provision 920. Instead, the child IAB node 904 may perform application 925 of the provided guard period, e.g., according to the guard period provision 920.

Referring to FIG. 10A, a child MT of a child IAB node may discard a dynamic scheduling grant received from a parent IAB apparatus that dynamically schedules communication of data by the child MT on one or more resources that overlap with a guard period of two (2) guard symbols 1020 after the transition time 1010. Instead, the child IAB node may refrain from communicating on the guard period of four (4) guard symbols 1030.

Referring to FIG. 10B, a child MT of a child IAB node may discard a dynamic scheduling grant received from a parent IAB apparatus that dynamically schedules communication of data by the child MT on one or more resources that overlap with a guard period of two (2) guard symbols 1070 before the transition time 1060. Instead, the child IAB node may refrain from communicating on the guard period of four (4) guard symbols 1080.

At 1714, the child IAB node may receive, from the parent IAB apparatus, information scheduling communication of data by the child MT on one or more resources that overlap with the provided guard period. For example, the child IAB node, may receive, from the parent IAB apparatus, information scheduling URLLC data communication by the child MT on one or more resources that overlap with the provided guard period.

For example, referring to FIG. 9, the child IAB node 904 may receive, from the parent IAB apparatus 902, information scheduling communication of data by the child MT on one or more resources that overlap with the received guard period provision 920.

Referring to FIG. 10A, a child MT of a child IAB node may receive, from a parent IAB apparatus, information scheduling communication of data by the child MT on one or more resources that overlap with a guard period of two (2) guard symbols 1020 after the transition time 1010.

Referring to FIG. 10B, a child MT of a child IAB node may receive, from a parent IAB apparatus, information scheduling communication of data by the child MT on one or more resources that overlap with a guard period of two (2) guard symbols 1070 before the transition time 1060.

At 1716, the child IAB node may communicate with the parent IAB apparatus based on the information scheduling communication of data. For example, first, the child IAB node may determine that the information scheduling communication of data schedules communication of data on one or more resources (e.g., symbols) that overlap with the guard period (e.g., one or more guard symbols), and second, the child IAB node may determine that the information should be prioritized over the guard period (e.g., based on the type of data being URLLC or another relatively high priority type of data). The child MT may communicate with the parent IAB apparatus based on the information scheduling data, such as by puncturing the data on one or more symbols that overlap with the provided guard period.

For example, referring to FIG. 9, the child IAB node 904 may communicate the data with parent IAB apparatus 902 based on the information scheduling the data. For example, the child IAB node 904 may puncture the data on one or more resources that overlap with the received guard period provision 920.

Referring to FIG. 10A, a child MT of a child IAB node may communicate data with a parent IAB apparatus based on the information scheduling the communication of the data by the child MT, e.g., by puncturing the data on one or more symbols that overlap with a guard period of two (2) guard symbols 1020 after the transition time 1010.

Referring to FIG. 10B, a child MT of a child IAB node may communicate data with a parent IAB apparatus based on the information scheduling the communication of the data by the child MT, e.g., by puncturing the data on one or more symbols that overlap with a guard period of two (2) guard symbols 1070 before the transition time 1060.

At 1718, the child IAB apparatus may transition between the child MT and the child DU contemporaneous with the transition time based on applying the guard period. For example, first, the child IAB apparatus may determine that the guard period is applied so that communication is neither transmitted nor received by the child IAB apparatus, and second, the child IAB apparatus may transition between the child MT and the child DU. According to various aspects, to transition between the child MT and the child DU, the child IAB node may switch between one of transmit or receive circuitry to the other of transmit or receive circuitry, perform (analog) beam switching, and/or perform other component switching commensurate with transitioning between DU and MT configurations.

For example, referring to FIG. 9, the child IAB node 904 may transition between the child MT and the child DU contemporaneous with the transition time based on application 925 of the provided guard period 920.

Referring to FIG. 10A, a child IAB node may transition from a child DU of the child IAB node to a child MT of the child IAB node contemporaneous with the transition time 1010 based on applying a guard period of four (4) guard symbols 1030 contemporaneous with the transition time 1010.

Referring to FIG. 10B, a child IAB node may transition from a child MT of the child IAB node to a child DU of the child IAB node contemporaneous with the transition time 1060 based on applying a guard period of four (4) guard symbols 1080 contemporaneous with the transition time 1060.

Figure 18:
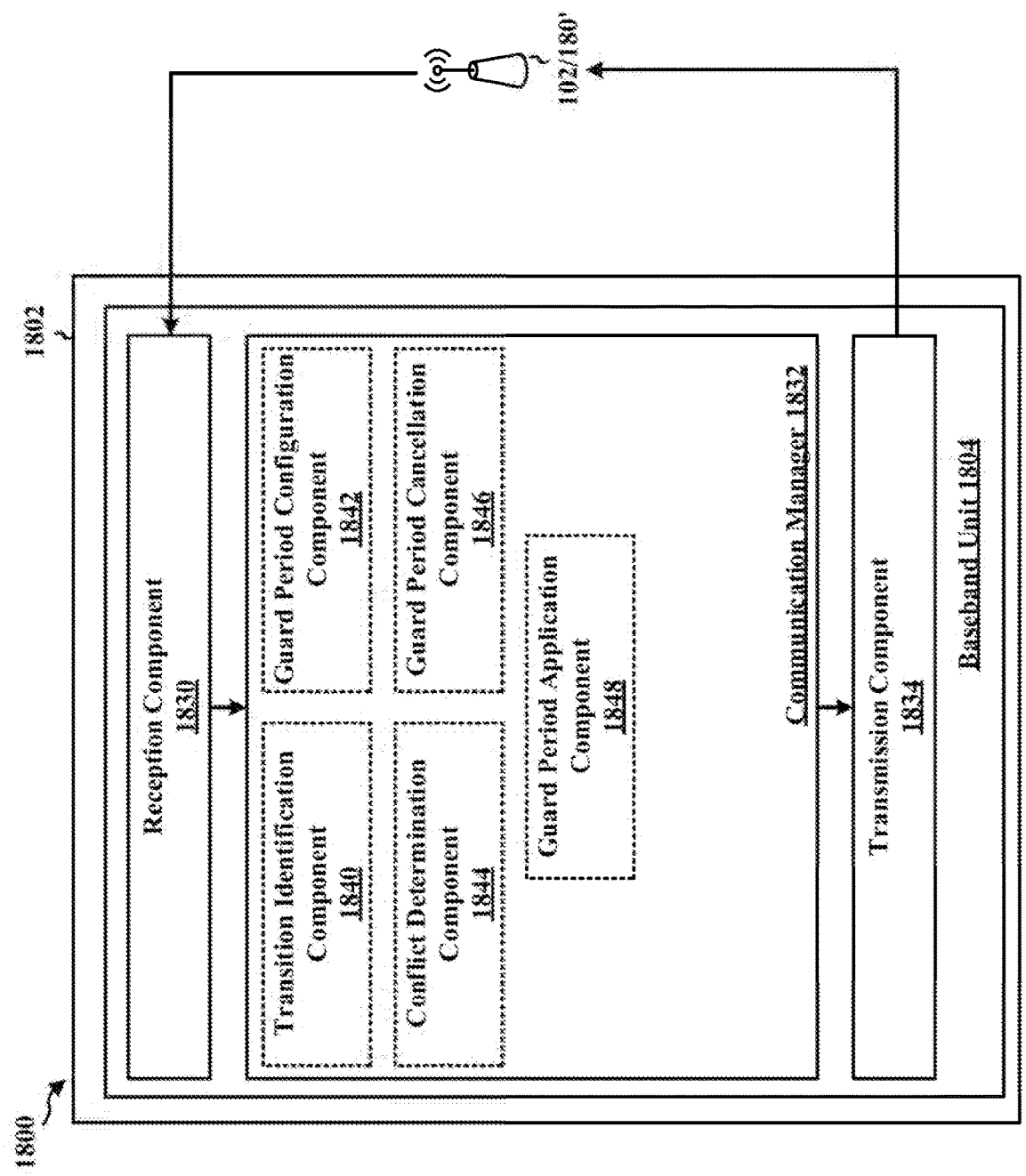
FIG. 18 is a diagram illustrating an example of a hardware implementation for an example apparatus.

FIG. 18 is a diagram 1800 illustrating an example of a hardware implementation for an apparatus 1802. The apparatus 1802 may be an IAB apparatus (e.g., an IAB donor, an IAB node, a base station, etc.) that includes a baseband unit 1804. The baseband unit 1804 may communicate, e.g., through a cellular RF transceiver, with the second base station 102/180'. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

In some aspects, the reception component 1830 may receive information request a guard period from the second base station 102/180', e.g., as described in connection with 1602 of FIG. 16.

The communication manager 1832 may include a transition identification component 1840 that is configured to determine that a child DU function of the second base station 102/180' is to transition between a first set of resources and a second set of resources at a transition time, e.g., as described in connection with 1604 of FIG. 16. The first set of resources may be associated with a child MT function of the second base station 102/180', and the second set of resources may be associated with the child DU.

The communication manager 1832 may further include a guard period configuration component 1842 that may receive input(s) of the information requesting the guard period from the reception component 1830 and/or of the determination that the child DU of the second base station 102/180' is to transition between a first set of resources associated with the child MT and a second set of resources associated with the child DU from the transition identification component 1840. The guard period configuration component 1842 may be configured to configure a guard period associated with the transition time based on the first set of resources and based on the second set resources, e.g., as described in connection with 1606 of FIG. 16.

The communication manager 1832 may further include a conflict determination component 1844 that may receive input(s) of the configured guard period from the guard period configuration component 1842. The conflict determination component 1844 may be configured to determine whether the configured guard period conflicts with URLLC communication associated with the second base station 102/180', e.g., as described in connection with 1608 of FIG. 16.

If the conflict determination component 1844 determines that the configured guard period does not conflict with URLLC communication associated with the second base station 102/180', then the transmission component 1834 may transmit information indicating the configured guard period to the second base station 102/180', e.g., as described in connection with 1610 of FIG. 16.

In some aspects, the communication manager 1832 may further include a guard period application component 1848 that receives input(s) of the configured guard period from the guard period configuration component 1842. If the conflict determination component 1844 determines that the configured guard period does not conflict with URLLC communication associated with the second base station 102/180', then the guard period application component 1848 may apply the guard period based on the transition time, e.g., as described in connection with 1612 of FIG. 16. The guard period may include a time period of no communication with the second base station 102/180'.

In some other aspects, the communication manager 1832 may further include a guard period cancellation component 1846 that receives input(s) of the configured guard period from the guard period configuration component 1842 and/or of the determined conflict between the configured guard period and the URLLC communication associated with the second base station 102/180'. If the conflict determination component 1844 determines that the configured guard period does conflict with URLLC communication associated with the second base station 102/180', then the guard period cancellation component 1846 may cancel the configured guard period in response to the determination that the configured guard period conflicts with the URLLC communication associated with the second base station 102/180', e.g., as described in connection with 1614 of FIG. 16.

Further, if the conflict determination component 1844 determines that the configured guard period does conflict with URLLC communication associated with the second base station 102/180', then at least one of the reception component 1830 and/or the transmission component 1834 may communicate the URLLC communication with the second base station 102/180', e.g., as described in connection with 1616 of FIG. 16.

The apparatus 1802 may include additional components that perform some or all of the blocks, operations, signaling, etc. of the algorithm(s) in the aforementioned call flow diagram of FIG. 9 and flowchart of FIG. 16. As such, some or all of the blocks, operations, signaling, etc. in the aforementioned call flow diagram of FIG. 9 and flowchart of FIG. 16 may be performed by a component and the apparatus 1802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for determining that a DU function of a child IAB node is to transition between a first set of resources and a second set of resources at a transition time, with the first set of resources being associated with a MT function of the child IAB node, and the second set of resources being associated with the DU function; and means for configuring a guard period associated with the transition time based on the first set of resources and based on the second set resources.

In one configuration, the apparatus 1802, and in particular the baseband unit 1804, may further include means for transmitting information indicating the guard period to the child IAB node.

In one configuration, the apparatus 1802, and in particular the baseband unit 1804, may further include means for applying the guard period based on the transition time, with the guard period including a time period of no communication with the child IAB node.

In one configuration, the guard period includes a set of guard symbols that at least one of overlaps with the transition time, occurs immediately before the transition time, or occurs immediately after the transition time.

In one configuration, the first set of resources is configured as at least one of NA or soft resources unavailable for use by the DU function, and the second set of resources is configured as at least one of hard resources or soft resources available for use by the DU function.

In one configuration, the first set of resources occur immediately before the transition time and the second set of resources occur immediately after the transition time.

In one configuration, the second set of resources occur immediately before the transition time and the first set of resources occur immediately after the transition time.

In one configuration, at least one cell-specific signal associated with the DU function of the child IAB node is scheduled on at least one of the second set of resources, and the second set of resources is associated with the DU function based on the at least one cell-specific signal being scheduled on the at least one of the second set of resources.

In one configuration, cell-specific signals associated with the DU function of the child IAB node are absent from the first set of resources, and the first set of resources is associated with the MT function based on the absence of the cell-specific signals from the first set of resources.

In one configuration, communication with the MT function is dynamically scheduled on the first set of resources, and the first set of resources is associated with the MT function further based on the communication with the MT function being dynamically scheduled on the first set of resources.

In one configuration, the apparatus 1802, and in particular the baseband unit 1804, may further include means for determining that the configured guard period conflicts with URLLC communication associated with the child IAB node; means for canceling the configured guard period in response to determining that the configured guard period conflicts with the URLLC communication; and means for communicating the URLLC communication with the child IAB node.

In one configuration, the apparatus 1802, and in particular the baseband unit 1804, may further include means for receiving information requesting the guard period from the child IAB node, and the guard period is configured based on the information requesting the guard period.

In one configuration, the IAB apparatus includes an IAB donor having a CU function or another IAB node having another MT function.

The aforementioned means may be one or more of the aforementioned components of the apparatus 1802 configured to perform the functions recited by the aforementioned means. As described supra, the apparatus 1802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
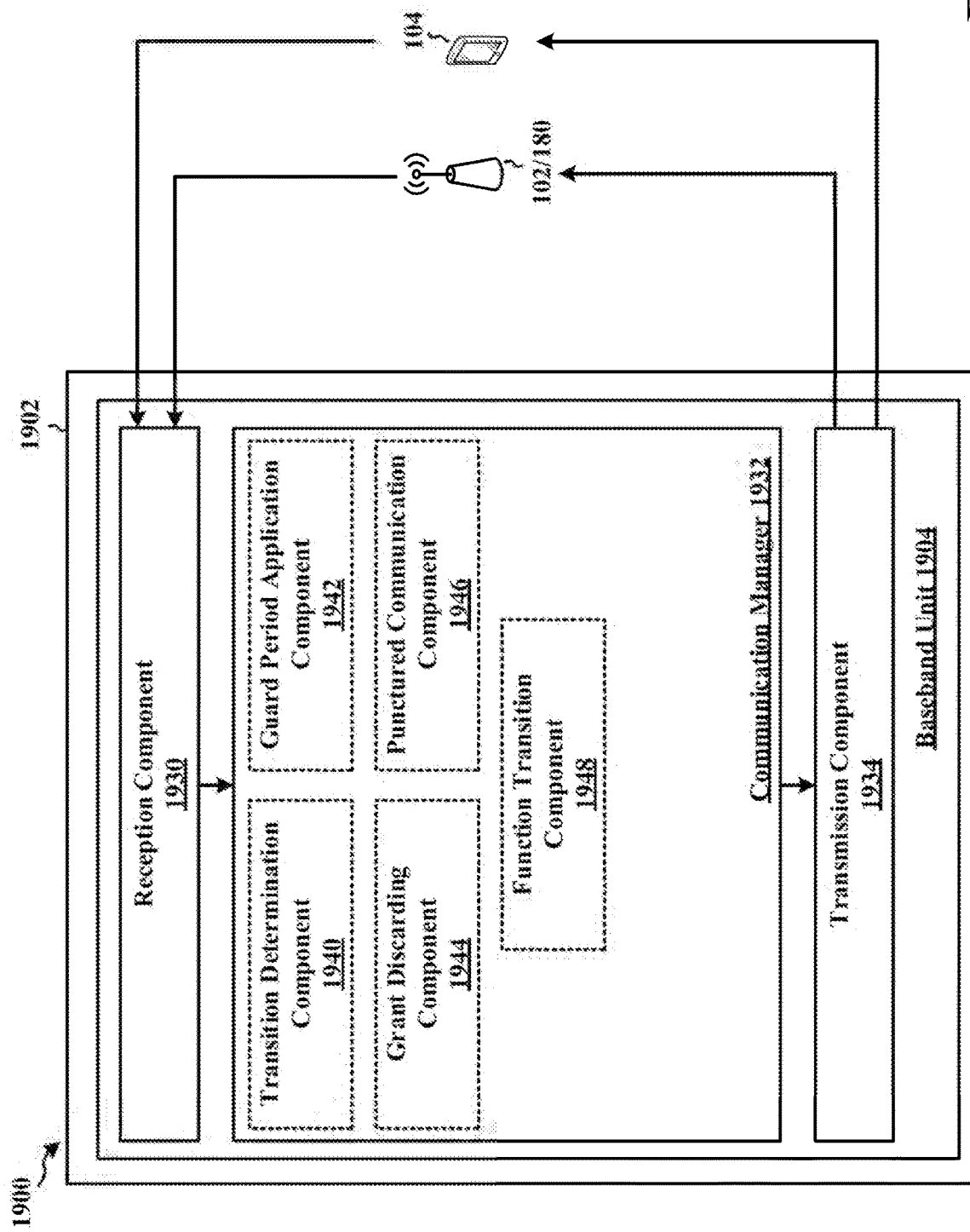
FIG. 19 is a diagram illustrating another example of a hardware implementation for another example apparatus.

FIG. 19 is a diagram 1900 illustrating an example of a hardware implementation for an apparatus 1902. The apparatus 1902 is an IAB node (e.g., a base station) that includes a baseband unit 1904. The baseband unit 1904 may communicate, e.g., through a cellular RF transceiver, with the first base station 102/180. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 may include a transition determination component 1940 that is configured to determine to transition between a first set of resources and a second set of resources at a transition time, with the first set of resources being associated with an MT function of the apparatus 1902 and the second set of resources being associated with a DU function of the apparatus 1902, e.g., as described in connection with 1702 of FIG. 17.

In some aspects, the transmission component 1934 may be configured to transmit, to the first base station 102/180, information requesting a guard period associated with the transition time based on the transition between the first set of resources and the second set resources, e.g., as described in connection with 1704 of FIG. 17.

In some aspects, the reception component 1930 may be configured to receive information providing the guard period from the first base station 102/180 based on the information requesting the guard period, e.g., as described in connection with 1706 of FIG. 17.

The communication manager 1932 may further include a guard period application component 1942 that receives input(s) of the provided guard period from the reception component 1930 and of the transition between the first set of resources associated with the MT function and the second set of resources associated with the DU function from the transition determination component 1940. The guard period application component 1942 may be configured to apply the provided guard period contemporaneous with the transition time, with the provided guard period including a time period of no communication with the first base station 102/180, e.g., as described in connection with 1708 of FIG. 17.

In some aspects, the reception component 1930 may be configured to receive, from the first base station 102/180, a dynamic scheduling grant that dynamically schedules communication of data by the MT function on one or more resources that overlap with the provided guard period, e.g., as described in connection with 1710 of FIG. 17.

The communication manager 1932 may further include a grant discarding application component 1944 that receives input(s) of the dynamic scheduling grant and of the provided guard period from the reception component 1930. The grant discarding component 1944 may be configured to discard the dynamic scheduling grant based on the communication of data being dynamically scheduled on one or more resources that overlap with the provided guard period, e.g., as described in connection with 1712 of FIG. 17.

In some other aspects, the reception component 1930 may be configured to receive, from the first base station 102/180, information scheduling communication of data (e.g., URLLC data or other relatively high priority data) by the MT function on one or more resources that overlap with the provided guard period, e.g., as described in connection with 1714 of FIG. 17.

The communication manager 1932 may further include a punctured communication component 1946 that receives input(s) of the information scheduling communication of data (e.g., URLLC data or other relatively high priority data) by the MT function and of the provided guard period from the reception component 1930. The punctured communication component 1946 may be configured to communicate with the first base station 102/180 based on the information scheduling the communication of the data by the MT function, with the data being punctured on the one or more resources overlapping with the provided guard period, e.g., as described in connection with 1716 of FIG. 17.

The communication manager 1932 may further include a function transition component 1948 that receives input(s) of the provided guard period from the reception component 1930 and of the transition between the first set of resources associated with the MT function and the second set of resources associated with the DU function from the transition determination component 1940. The function transition component 1948 may be configured to transition between the MT function and the DU function contemporaneously with the transition time based on applying the guard period, e.g., as described in connection with 1718 of FIG. 17.

The apparatus 1902 may include additional components that perform some or all of the blocks, operations, signaling, etc. of the algorithm(s) in the aforementioned call flow diagram of FIG. 9 and/or flowchart of FIG. 17. As such, some or all of the blocks, operations, signaling, etc. in the aforementioned call flow diagram of FIG. 9 and/or flowchart of FIG. 17 may be performed by a component and the apparatus 1902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for determining to transition between a first set of resources and a second set of resources at a transition time, with the first set of resources being associated with a MT function of the apparatus 1902, and the second set of resources being associated with a DU function of the apparatus 1902; and means for transmitting, to a parent IAB apparatus, information requesting a guard period associated with the transition time based on the transition between the first set of resources and the second set resources.

In one configuration, the apparatus 1902, and in particular the baseband unit 1904, may further include means for receiving information providing the guard period from the parent IAB apparatus based on the information requesting the guard period.

In one configuration, the apparatus 1902, and in particular the baseband unit 1904, may further include means for applying the provided guard period based on the transition time, and the provided guard period includes a time period of no communication with the parent IAB apparatus; and means for transitioning between the MT function and the DU function contemporaneously with the transition time.

In one configuration, the apparatus 1902, and in particular the baseband unit 1904, may further include means for receiving, from the parent IAB apparatus, a dynamic scheduling grant that dynamically schedules communication of data by the MT function on one or more resources that at least partially overlap with the provided guard period; and means for discarding the dynamic scheduling grant based on the communication of data being dynamically scheduled on one or more resources that at least partially overlap with the provided guard period.

In one configuration, the apparatus 1902, and in particular the baseband unit 1904, may further include means for receiving, from the parent IAB apparatus, information scheduling communication of data by the MT function on one or more resources that at least partially overlap with the provided guard period; and means for communicating, with the parent IAB apparatus based on the information scheduling the communication, the data by the MT function on the one or more resources at least partially overlapping with the provided guard period, with the data being punctured on the one or more resources at least partially overlapping with the provided guard period.

In one configuration, the provided guard period includes a set of guard symbols at least one of overlaps with the transition time, occurs immediately before the transition time, or occurs immediately after the transition time.

In one configuration, the first set of resources is configured as at least one of NA or soft resources unavailable for use by the DU function, and the second set of resources is configured as at least one of hard resources or soft resources available for use by the DU function.

In one configuration, the first set of resources occur immediately before the transition time and the second set of resources occur immediately after the transition time.

In one configuration, the second set of resources occur immediately before the transition time and the first set of resources occur immediately after the transition time.

In one configuration, at least one cell-specific signal associated with the DU function is scheduled on at least one of the second set of resources, and the second set of resources is associated with the DU function based on the at least one cell-specific signal being scheduled on the at least one of the second set of resources.

In one configuration, cell-specific signals associated with the DU function are absent from the first set of resources, and the first set of resources is associated with the MT function based on the absence of the cell-specific signals from the first set of resources.

In one configuration, communication with the MT function is dynamically scheduled on the first set of resources by the parent IAB apparatus, and the first set of resources is associated with the MT function further based on the communication with the MT function being dynamically scheduled on the first set of resources by the parent IAB apparatus.

The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at an integrated access and backhaul (IAB) apparatus, comprising:
determining, by the IAB apparatus and based on information received in a field or header as GuardSymbolsDesired, that a distributed unit (DU) function of a child IAB node is to transition between a first set of resources and a second set of resources at a transition time, the first set of resources being associated with a mobile termination (MT) function of the child IAB node, and the second set of resources being associated with the DU function of the child IAB node, wherein the child IAB node is different from the IAB apparatus; and
configuring a guard period associated with the transition time based on the first set of resources and based on the second set resources.

2. The method of claim 1, further comprising:
transmitting information indicating the guard period to the child IAB node.

3. The method of claim 2, further comprising:
applying the guard period based on the transition time, wherein the guard period comprises a time period of no communication with the child IAB node.

4. The method of claim 1, wherein the guard period comprises a set of guard symbols that at least one of overlaps with the transition time, occurs immediately before the transition time, or occurs immediately after the transition time.

5. The method of claim 1, wherein the first set of resources is configured as at least one of not available (NA) or soft resources unavailable for use by the DU function, and the second set of resources is configured as at least one of hard resources or soft resources available for use by the DU function.

6. The method of claim 1, wherein the first set of resources occur immediately before the transition time and the second set of resources occur immediately after the transition time.

7. The method of claim 1, wherein the second set of resources occur immediately before the transition time and the first set of resources occur immediately after the transition time.

8. The method of claim 1, wherein at least one cell-specific signal associated with the DU function of the child IAB node is scheduled on at least one of the second set of resources, and wherein the second set of resources is associated with the DU function based on the at least one cell-specific signal being scheduled on the at least one of the second set of resources.

9. The method of claim 1, wherein cell-specific signals associated with the DU function of the child IAB node are absent from the first set of resources, and wherein the first set of resources is associated with the MT function based on an absence of the cell-specific signals from the first set of resources.

10. The method of claim 9, wherein communication with the MT function is dynamically scheduled on the first set of resources, and wherein the first set of resources is associated with the MT function further based on the communication with the MT function being dynamically scheduled on the first set of resources.

11. The method of claim 1, further comprising:
determining that the configured guard period conflicts with an ultra-reliable low-latency communications (URLLC) communication associated with the child IAB node;
canceling the configured guard period in response to determining that the configured guard period conflicts with the URLLC communication; and
communicating the URLLC communication with the child IAB node.

12. The method of claim 1, further comprising:
receiving information requesting the guard period from the child IAB node, wherein the guard period is configured based on the information requesting the guard period.

13. The method of claim 1, wherein the IAB apparatus comprises an IAB donor having a central unit (CU) function or another IAB node having another MT function.

14. A method of wireless communication at an integrated access and backhaul (IAB) node, comprising:
transitioning between a first set of resources and a second set of resources at a transition time, the first set of resources being associated with a mobile termination (MT) function of the IAB node, and the second set of resources being associated with a distributed unit (DU) function of the IAB node;
transmitting, to a parent IAB apparatus, information requesting a guard period associated with the transition time based on the transition between the first set of resources and the second set resources, wherein the information requesting a guard period is included in a field or header as GuardSymbolsDesired; and
receiving, from the parent IAB apparatus, a scheduling grant that schedules communication of data by the MT function on one or more resources that at least partially overlap with the guard period.

15. The method of claim 14, further comprising:
receiving information providing the guard period from the parent IAB apparatus based on the information requesting the guard period.

16. The method of claim 15, further comprising:
applying the guard period based on the transition time, wherein the guard period comprises a time period of no communication with the parent IAB apparatus; and
transitioning between the MT function and the DU function contemporaneously with the transition time.

17. The method of claim 16, further comprising:
discarding the scheduling grant based on the communication of data being dynamically scheduled on one or more resources that at least partially overlap with the guard period, wherein the scheduling grant is dynamically scheduled.

18. The method of claim 16, further comprising:
receiving, from the parent IAB apparatus, information scheduling communication of data by the MT function on one or more resources that at least partially overlap with the guard period; and
communicating, with the parent IAB apparatus based on the information scheduling the communication, the data by the MT function on the one or more resources at least partially overlapping with the guard period, wherein the data is punctured on the one or more resources at least partially overlapping with the guard period.

19. The method of claim 14, wherein the guard period comprises a set of guard symbols at least one of overlaps with the transition time, occurs immediately before the transition time, or occurs immediately after the transition time.

20. The method of claim 14, wherein the first set of resources is configured as at least one of not available (NA) or soft resources unavailable for use by the DU function, and the second set of resources is configured as at least one of hard resources or soft resources available for use by the DU function.

21. The method of claim 14, wherein the first set of resources occur immediately before the transition time and the second set of resources occur immediately after the transition time.

22. The method of claim 14, wherein the second set of resources occur immediately before the transition time and the first set of resources occur immediately after the transition time.

23. The method of claim 14, wherein at least one cell-specific signal associated with the DU function is scheduled on at least one of the second set of resources, and wherein the second set of resources is associated with the DU function based on the at least one cell-specific signal being scheduled on the at least one of the second set of resources.

24. The method of claim 14, wherein cell-specific signals associated with the DU function are absent from the first set of resources, and wherein the first set of resources is associated with the MT function based on an absence of the cell-specific signals from the first set of resources.

25. The method of claim 24, wherein communication with the MT function is dynamically scheduled on the first set of resources by the parent IAB apparatus, and wherein the first set of resources is associated with the MT function further based on the communication with the MT function being dynamically scheduled on the first set of resources by the parent IAB apparatus.

26. An apparatus for wireless communication by an IAB apparatus, comprising:
a memory; and
at least one processor coupled to the memory and configured to:
determine, by the IAB apparatus and based on information received in a field or header as GuardSymbolsDesired, that a distributed unit (DU) function of a child IAB node is to transition between a first set of resources and a second set of resources at a transition time, the first set of resources being associated with a mobile termination (MT) function of the child IAB node, and the second set of resources being associated with the DU function of the child IAB node, wherein the child IAB node is different from the IAB apparatus; and
configure a guard period associated with the transition time based on the first set of resources and based on the second set resources.

27. The apparatus of claim 26, wherein the at least one processor is further configured to:
transmit information indicating the guard period to the child IAB node.

28. The apparatus of claim 27, wherein the at least one processor is further configured to:
apply the guard period based on the transition time, wherein the guard period comprises a time period of no communication with the child IAB node.

29. An apparatus for wireless communication by an IAB node, comprising:
a memory; and
at least one processor coupled to the memory and configured to:
transition between a first set of resources and a second set of resources at a transition time, the first set of resources being associated with a mobile termination (MT) function of the IAB node, and the second set of resources being associated with a distributed unit (DU) function of the IAB node;
transmit, to a parent IAB apparatus, information requesting a guard period associated with the transition time based on the transition between the first set of resources and the second set resources, wherein the information requesting a guard period is included in a field or header as GuardSymbolsDesired; and
receive, from the parent IAB apparatus, a scheduling grant that schedules communication of data by the MT function on one or more resources that at least partially overlap with the guard period.

30. The apparatus of claim 29, wherein the at least one processor is further configured to:
receive information providing the guard period from the parent IAB apparatus based on the information requesting the guard period.

* * * * *